(12) United States Patent
Yabumoto

(10) Patent No.: US 12,164,092 B2
(45) Date of Patent: Dec. 10, 2024

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventor: Hiroshi Yabumoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 17/636,875

(22) PCT Filed: Aug. 24, 2020

(86) PCT No.: PCT/JP2020/031789
§ 371 (c)(1),
(2) Date: Feb. 19, 2022

(87) PCT Pub. No.: WO2021/039698
PCT Pub. Date: Mar. 4, 2021

(65) Prior Publication Data
US 2022/0342191 A1 Oct. 27, 2022

(30) Foreign Application Priority Data
Aug. 26, 2019 (JP) ................................ 2019-154047

(51) Int. Cl.
*G02B 15/22* (2006.01)
*G02B 15/14* (2006.01)

(52) U.S. Cl.
CPC ......... *G02B 15/1461* (2019.08); *G02B 15/22* (2013.01)

(58) Field of Classification Search
None
See application file for complete search history.

(56) References Cited

U.S. PATENT DOCUMENTS

2011/0228159 A1* 9/2011 Imaoka .................. G03B 17/14
359/683
2014/0009652 A1 1/2014 Sugita
(Continued)

FOREIGN PATENT DOCUMENTS

JP 2014-016464 A 1/2014
JP 2014-153402 A 8/2014
(Continued)

OTHER PUBLICATIONS

Office Action dated Oct. 18, 2022, in Japanese Patent Application No. 2021-542877.
(Continued)

*Primary Examiner* — Darryl J Collins
(74) *Attorney, Agent, or Firm* — Potomac Law Group, PLLC

(57) ABSTRACT

This zoom optical system (ZL(1)) has a plurality of lens groups (G1-G7), wherein when during zooming, distances between adjacent lens groups vary. The plurality of lens groups include: a first focused lens group (G6) that moves during focusing; and a second focused lens group (G7) that is disposed closer to an image plane side than the first focused lens group and moves during focusing along a trajectory that is different from that of the first focused lens group. The first focused lens group (G6) and the second focused lens group (G7) both have a negative refractive power and satisfy the following conditional expression, $0.40 < fF1/fF2 < 6.00$, where fF1: focal length of first focused lens group and fF2: focal length of second focused lens group.

38 Claims, 20 Drawing Sheets

(56) References Cited

U.S. PATENT DOCUMENTS

| | | | |
|---|---|---|---|
| 2014/0132830 A1 | 5/2014 | Izuhara et al. | |
| 2014/0211082 A1 | 7/2014 | Imaoka | |
| 2014/0218808 A1 | 8/2014 | Ogata et al. | |
| 2015/0168697 A1 | 6/2015 | Ogata | |
| 2015/0350558 A1* | 12/2015 | Uchida | G03B 5/00 359/557 |
| 2016/0209632 A1* | 7/2016 | Imaoka | G02B 15/1465 |
| 2017/0038569 A1 | 2/2017 | Sugita | |
| 2019/0196157 A1 | 6/2019 | Kawamura et al. | |
| 2020/0233191 A1* | 7/2020 | Ichimura | G02B 13/18 |
| 2021/0033835 A1 | 2/2021 | Nakahara | |
| 2021/0055531 A1 | 2/2021 | Nakazawa et al. | |
| 2021/0349293 A1* | 11/2021 | Uehara | G02B 15/144113 |
| 2023/0305278 A1 | 9/2023 | Nakazawa et al. | |

FOREIGN PATENT DOCUMENTS

| | | |
|---|---|---|
| JP | 2014-160229 A | 9/2014 |
| JP | 2015-118127 A | 6/2015 |
| JP | 2015-197655 A | 11/2015 |
| JP | 2017-129668 A | 7/2017 |
| JP | 2019-113750 A | 7/2019 |
| JP | 2020-052338 A | 4/2020 |
| JP | 2021-021856 A | 2/2021 |
| JP | 2021-033010 A | 3/2021 |
| WO | 2013/027364 A1 | 2/2013 |

OTHER PUBLICATIONS

International Search Report from International Patent Application No. PCT/JP2020/031789, dated Nov. 2, 2020.

International Preliminary Report on Patentability for International Patent Application No. PCT/JP2020/031789, dated Mar. 10, 2022.

Office Action for Chinese Patent Application No. 202080059840.9 dated Mar. 31, 2023 (includes English language translation).

Office Action dated Aug. 22, 2023, in Japanese Patent Application No. 2023-008156.

Office Action issued Mar. 5, 2024, in Japanese Patent Application No. 2023-008156.

Office Action (Decision of Refusal) issued Oct. 1, 2024, in Japanese Patent Application No. 2023-008156.

Office Action (Decision of Dismissal of Amendment) issued Oct. 1, 2024, in Japanese Patent Application No. 2023-008156.

Office Action issued Sep. 30, 2024, in U.S. Appl. No. 18/437,376.

* cited by examiner

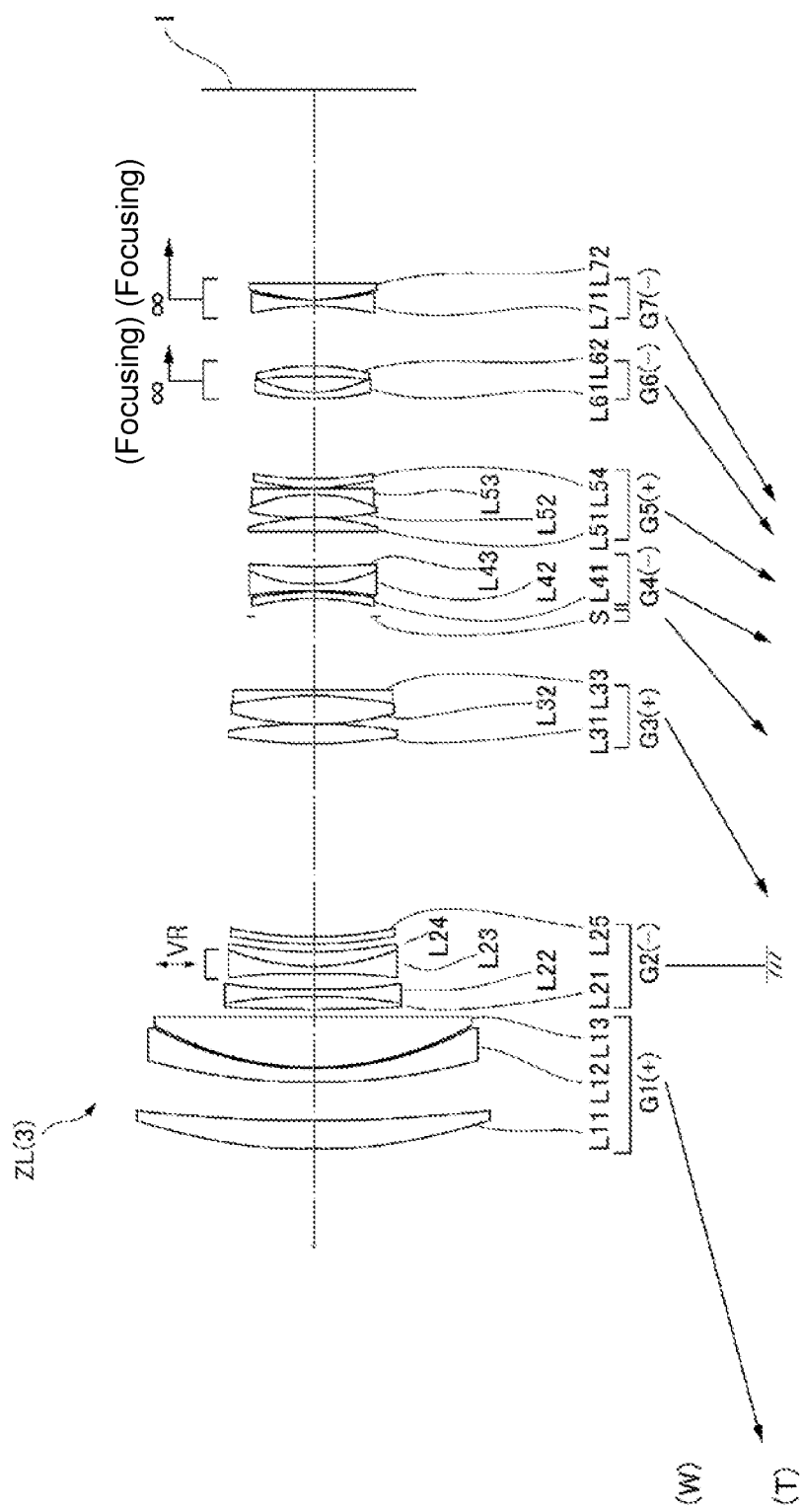

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus, and a method for manufacturing the zoom optical system.

TECHNICAL BACKGROUND

In an optical apparatus such as a digital still camera, a film camera, and a video camera, there has been a demand for suppression of various aberrations of an optical system (for example, see Patent literature 1).

PRIOR ARTS LIST

Patent Document

Patent literature 1: Japanese Laid-Open Patent Publication No. 2014-153402 (A)

SUMMARY OF THE INVENTION

A zoom optical system according to the present invention comprises a plurality of lens groups, in which in the plurality of lens groups, an interval between adjacent lens groups is changed upon zooming. The plurality of lens groups comprise a first focusing lens group that moves upon focusing and a second focusing lens group that is arranged on an image side with respect to the first focusing lens group and moves on a trajectory different from a trajectory of the first focusing lens group upon focusing. Both the first focusing lens group and the second focusing lens group have negative refractive power and satisfy the following conditional expression, $$0.40<fF1/fF2<6.00$$

where
fF1: a focal length of the first focusing lens group, and
fF2: a focal length of the second focusing lens group.

An optical apparatus according to the present invention is configured to be equipped with the zoom optical system.

A method for manufacturing a zoom optical system comprising a plurality of lens groups comprises disposing the plurality of lens groups in a lens barrel so that: intervals between adjacent lens groups in the plurality of lens groups are changed upon zooming; the plurality of lens groups comprise a first focusing lens group that moves upon focusing and a second focusing lens group that is arranged on an image side with respect to the first focusing lens group and moves on a locus different from a locus of the first focusing lens group upon focusing; both the first focusing lens group and the second focusing lens group have negative refractive power; and the following conditional expression is satisfied, $$0.40<fF1/fF2<6.00$$

where
fF1: a focal length of the first focusing lens group, and
fF2: a focal length of the second focusing lens group.

BRIEF DESCRIPTION OF THE DRAWINGS

FIG. 7 is a diagram showing a lens configuration of a zoom optical system according to Example 3;

DESCRIPTION OF THE EMBODIMENTS

Figure 19:
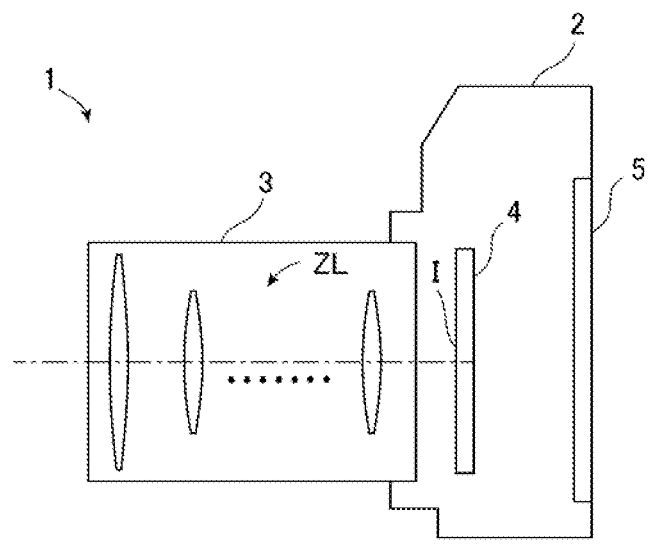
FIG. 19 is a diagram showing a configuration of a digital camera as an embodiment of an optical apparatus.

Hereinafter, a preferred embodiment of the present invention is described. FIG. 19 shows a schematic configuration of a digital camera as an embodiment of the optical apparatus. A digital camera 1 is configured with a main body 2 and an imaging lens 3 attachable and detachable with respect to the main body 2. The main body 2 comprises an imaging element 4, a main body control part (not illustrated) controlling operation of the digital camera, and a liquid crystal screen 5. The imaging lens 3 comprises an optical system (or a zoom optical system) ZL consisting of a plurality of lens groups, and a lens position control mechanism (not illustrated) that controls positions of the respective lens groups. The lens position control mechanism is configured with: a sensor that detects the positions of the lens groups; a motor that moves the lens groups back and force on an optical axis; a control circuit that drives the motor; and the like.

Light from an object is condensed by the optical system ZL of the imaging lens 3, and reaches an image surface I of the imaging element 4. The light from the object having reached the image surface I is photoelectrically converted by the imaging element 4 and recorded as digital image data in memory which is not illustrated. The digital image data recorded in the memory is displayed on the liquid crystal screen 5 in response to an operation by a user. Hereinafter, the optical system ZL is described in detail.

The zoom optical system according to the present embodiment comprises a plurality of lens groups, and in the plurality of lens groups, an interval between adjacent lens groups is changed upon zooming. The plurality of lens groups comprise a first focusing lens group that moves upon focusing and a second focusing lens group that is arranged on an image side with respect to the first focusing lens group and moves on a trajectory different from a trajectory of the first focusing lens group upon focusing. Both the first focusing lens group and the second focusing lens group have negative refractive power and satisfy the following conditional expression, $$0.40 < fF1/fF2 < 6.00 \quad (1)$$

where
fF1: a focal length of the first focusing lens group, and
fF2: a focal length of the second focusing lens group.

The above conditional expression (1) defines a ratio between the focal length of the first focusing lens group and the focal length of the second focusing lens group, indicating an appropriate range of power balance between the two focusing lens groups. When the conditional expression (1) is satisfied, fluctuation of various aberrations such as a spherical aberration and a coma aberration can be suppressed upon focusing from an infinity object focusing state to a short-distance object focusing state. In addition, a moving distance of a focusing group can be suppressed, whereby suppression of aberration fluctuation and reduction in size of the whole optical system are enabled.

When the corresponding value of the conditional expression (1) is greater than the upper limit value 6.00, the refractive power of the second focusing lens group becomes relatively greater, whereby fluctuation of various aberrations such as a spherical aberration is less likely to be suppressed upon focusing from the infinity object focusing state to the short-distance object focusing state. In order to ensure the effect of the present embodiment, it is preferred that the upper limit value of the conditional expression (1) is defined to be a smaller value, for example 5.90, 5.85, 5.80, 5.75, 5.70, 5.65, 5.60, 5.55, 5.50, or 5.45.

On the other hand, when the corresponding value of the conditional expression (1) is smaller than the lower limit value 0.40, the refractive power of the first focusing lens group becomes relatively greater, whereby fluctuation of various aberrations such as a spherical aberration is less likely to be suppressed upon focusing from the infinity object focusing state to the short-distance object focusing state. In order to ensure the effect of the present embodiment, it is preferred that the lower limit value of the conditional expression (1) is defined to be a greater value, for example 0.45, 0.55, 0.60, 0.65, 0.70, 0.75, 0.78, 0.80, or 0.85.

In the zoom optical system having the above configuration, favorable aberration correction is realized by changing an interval between adjacent lens groups upon zooming, and fluctuation of various aberrations such as a spherical aberration upon focusing from the infinity object focusing state to the short-distance object focusing state is suppressed by arranging the plurality of focusing lens groups having refractive power, without an increase in size of the focusing lens groups, whereby high optical performance can be achieved over the entire range.

It is preferred that the zoom optical system further satisfies the following conditional expression (2), $$0.50 < \beta WF1/\beta WF2 < 1.20 \quad (2)$$

where
$\beta WF1$: a lateral magnification of the first focusing lens group in a wide angle end state upon focusing on an object at infinity, and
$\beta WF2$: a lateral magnification of the second focusing lens group in a wide angle end state upon focusing on an object at infinity.

The conditional expression (2) defines a ratio between a lateral magnification of the first focusing lens group in the wide angle end state upon focusing on an object at infinity and a lateral magnification of the second focusing lens group in the wide angle end state upon focusing on an object at infinity. When the conditional expression (2) is satisfied, fluctuation of various aberrations such as a spherical aberration upon focusing from the infinity object focusing state to the short-distance object focusing state in the wide angle end state is suppressed, whereby high optical performance can be achieved over the entire range.

When the corresponding value of the conditional expression (2) is greater than the upper limit value 1.20, the lateral magnification of the first focusing lens group in the wide angle end state upon focusing on an object at infinity becomes relatively greater, whereby fluctuation of various aberrations such as a spherical aberration is less likely to be suppressed upon focusing from the infinity object focusing state to the short-distance object focusing state in the wide angle end state. In order to ensure the effect of the present embodiment, it is preferred that the upper limit value of the conditional expression (2) is defined to be a smaller value, for example 1.18, 1.15, 1.13, 1.10, 1.08, 1.05, or 1.03.

On the other hand, when the corresponding value of the conditional expression (2) is smaller than the lower limit value 0.50, the lateral magnification of the second focusing lens group in the wide angle end state upon focusing on an object at infinity becomes relatively greater, whereby fluctuation of various aberrations such as a spherical aberration is less likely to be suppressed upon focusing from the infinity object focusing state to the short-distance object focusing state in the wide angle end state. In order to ensure the effect of the present embodiment, the lower limit value of the conditional expression (2) can be a greater value, for example 0.53, 0.58, 0.60, 0.63, 0.65, or 0.68.

In addition, it is preferred that the zoom optical system further satisfies the following conditional expression (3), $$0.40 < \beta TF1/\beta TF2 < 1.00 \tag{3}$$

where

βTF1: a lateral magnification of the first focusing lens group in a telephoto end state upon focusing on an object at infinity, and βTF2: a lateral magnification of the second focusing lens group in a telephoto end state upon focusing on an object at infinity.

The conditional expression (3) defines a ratio between a lateral magnification of the first focusing lens group in the telephoto end state upon focusing on an object at infinity and a lateral magnification of the second focusing lens group in the telephoto end state upon focusing on an object at infinity. When the conditional expression (3) is satisfied, fluctuation of various aberrations such as a spherical aberration upon focusing from the infinity object focusing state to the short-distance object focusing state in the telephoto end state is suppressed, whereby high optical performance can be achieved over the entire range.

When the corresponding value of the conditional expression (3) is greater than the upper limit value 1.00, the lateral magnification of the first focusing lens group in the telephoto end state upon focusing on an object at infinity becomes relatively greater, whereby fluctuation of various aberrations such as a spherical aberration is less likely to be suppressed upon focusing from the infinity object focusing state to the short-distance object focusing state in the telephoto end state. In order to ensure the effect of the present embodiment, it is preferred that the upper limit value of the conditional expression (3) is defined to be a smaller value, for example 0.98, 0.96, 0.95, 0.94, 0.93, 0.92, or 0.91.

On the other hand, when the corresponding value of the conditional expression (3) is smaller than the lower limit value 0.40, the lateral magnification of the second focusing lens group in the telephoto end state upon focusing on an object at infinity becomes relatively greater, whereby fluctuation of various aberrations such as a spherical aberration is less likely to be suppressed upon focusing from the infinity object focusing state to the short-distance object focusing state in the telephoto end state. In order to ensure the effect of the present embodiment, defining the lower limit value of the conditional expression (3) to be a greater value, for example 0.42, 0.46, 0.48, 0.50, 0.52, 0.54, or 0.56 further ensures the effect of the present embodiment.

In addition, it is preferred that the zoom optical system further satisfies the following conditional expression (4), $$0.10 < -fFs/ft < 0.50 \tag{4}$$

where fFs: a focal length of any one of the first focusing lens group and the second focusing lens group having greater refractive power, and ft: a focal length of the whole zoom optical system in a telephoto end state.

The conditional expression (4) defines a ratio between a focal length of any one of the first focusing lens group and the second focusing lens group having greater refractive power and a focal length of the zoom optical system in a telephoto end state. When the conditional expression (4) is satisfied, fluctuation of various aberrations such as a spherical aberration upon focusing from the infinity object focusing state to the short-distance object focusing state in the telephoto end state is suppressed without an increase in size of a lens barrel, whereby high optical performance can be achieved over the entire range.

When the corresponding value of the conditional expression (4) is greater than the upper limit value 0.50, the refractive power of the focusing lens group becomes weaker, and a movement amount of the focusing lens group becomes greater upon focusing from the infinity object focusing state to the short-distance object focusing state, leading to an increase in size of the lens barrel. In order to ensure the effect of the present embodiment, it is preferred that the upper limit value of the conditional expression (4) is defined to be a smaller value, for example 0.45, 0.43, 0.40, 0.38, 0.35, 0.33, or 0.30.

On the other hand, when the corresponding value of the conditional expression (4) is smaller than the lower limit value 0.10, the refractive power of the focusing lens group becomes greater, whereby fluctuation of various aberrations such as a spherical aberration is less likely to be suppressed upon focusing from the infinity object focusing state to the short-distance object focusing state in the telephoto end state. In order to ensure the effect of the present embodiment, it is preferred that the lower limit value of the conditional expression (4) is defined to be a greater value, for example, 0.12, 0.15, 0.16, 0.18, or 0.20.

In addition, it is preferred that the zoom optical system further satisfies the following conditional expression (5), $$0.50 < -fFs/fw < 1.50 \tag{5}$$

where fFs: a focal length of any one of the first focusing lens group and the second focusing lens group having greater refractive power, and fw: a focal length of the whole zoom optical system in a wide angle end state.

The conditional expression (5) defines a ratio between a focal length of any one of the first focusing lens group and the second focusing lens group having greater refractive power and a focal length of the zoom optical system in a wide angle end state. When the conditional expression (5) is satisfied, fluctuation of various aberrations such as a spherical aberration upon focusing from the infinity object focusing state to the short-distance object focusing state in the wide angle end state is suppressed without an increase in size of a lens barrel, whereby high optical performance can be achieved over the entire range.

When the corresponding value of the conditional expression (5) is greater than the upper limit value 1.50, the refractive power of the focusing lens group becomes weaker, and a movement amount of the focusing lens group becomes greater upon focusing from the infinity object focusing state to the short-distance object focusing state, leading to an increase in size of the lens barrel. In order to ensure the effect of the present embodiment, it is preferred that the upper limit value of the conditional expression (5) is defined to be a smaller value, for example 1.45, 1.40, 1.35, 1.30, 1.28, 1.25, 1.20, 1.18, 1.15, or 1.10.

On the other hand, when the corresponding value of the conditional expression (5) is smaller than the lower limit value 0.50, the refractive power of the focusing lens group becomes greater, whereby fluctuation of various aberrations such as a spherical aberration is less likely to be suppressed upon focusing from the infinity object focusing state to the short-distance object focusing state in the wide angle end state. In order to ensure the effect of the present embodiment, it is preferred that the lower limit value of the conditional expression (5) is defined to be a greater value, for example 0.55, 0.65, 0.68, 0.70, 0.73, 0.75, 0.78, or 0.80.

It is preferred that the first focusing lens group moves in an image surface direction upon focusing from the infinity object focusing state to the short-distance object focusing state. In this case, fluctuation of various aberrations such as a spherical aberration can be effectively suppressed upon focusing from the infinity object focusing state to the short-distance object focusing state.

It is preferred that the second focusing lens group moves in an image surface direction upon focusing from the infinity object focusing state to the short-distance object focusing state. In this case, fluctuation of various aberrations such as a spherical aberration can be effectively suppressed upon focusing from the infinity object focusing state to the short-distance object focusing state.

In addition, it is preferred that the zoom optical system further satisfies the following conditional expression (6), $$0.10 < MWF1/MWF2 < 0.80 \quad (6)$$

where

MWF1: an absolute value of a movement amount of the first focusing lens group upon focusing from the infinity object focusing state to a shortest-distance object focusing state in the wide angle end state, and MWF2: an absolute value of a movement amount of the second focusing lens group upon focusing from the infinity object focusing state to a shortest-distance object focusing state in the wide angle end state.

The conditional expression (6) defines a ratio between an absolute value of a movement amount of the first focusing lens group and an absolute value of a movement amount of the second focusing lens group, upon focusing from the infinity object focusing state to the shortest-distance object focusing state in the wide angle end state. When the conditional expression (6) is satisfied, fluctuation of various aberrations such as a spherical aberration upon focusing from the infinity object focusing state to the shortest-distance object focusing state in the wide angle end state is suppressed, whereby high optical performance can be achieved over the entire range. Note that, in the present specification, "shortest distance" means a shortest-distance end (shortest photographing distance), and "shortest-distance object focusing state" means a state in which the focus is on an object at the shortest-distance end.

When the corresponding value of the conditional expression (6) is greater than the upper limit value 0.80, the movement amount of the first focusing lens group becomes relatively greater, whereby fluctuation of various aberrations such as a spherical aberration is less likely to be suppressed upon focusing from the infinity object focusing state to the shortest-distance object focusing state in the wide angle end state. In order to ensure the effect of the present embodiment, it is preferred that the upper limit value of the conditional expression (6) is defined to be a smaller value, for example 0.78, 0.75, 0.73, 0.70, 0.68, 0.65, 0.63, 0.60, 0.58, or 0.55.

On the other hand, when the corresponding value of the conditional expression (6) is smaller than the lower limit value 0.10, the movement amount of the second focusing lens group becomes relatively greater, whereby fluctuation of various aberrations such as a spherical aberration is less likely to be suppressed upon focusing from the infinity object focusing state to the shortest-distance object focusing state in the wide angle end state. In order to ensure the effect of the present embodiment, it is preferred that the lower limit value of the conditional expression (6) is defined to be a greater value, for example 0.13, 0.18, 0.20, 0.23, 0.25, 0.28, 0.30, or 0.32.

In addition, due to the above-described configuration, the zoom optical system can satisfy the following conditional expression (7) while favorably suppressing the aberration fluctuation upon zooming from the wide angle end state to the telephoto end state, $$20.00° < 2\omega w < 30.00° \quad (7)$$

where $2\omega w$: a full angle of view of the zoom optical system in the wide angle end state.

In the above-described configuration, the upper limit value 30.00 of the conditional expression (7) can be a smaller value such as 29.00, 28.00, 27.00, 26.00, 25.00, or 24.00, by narrowing the range of the corresponding value of each conditional expression. Alternatively, the lower limit value 20.00 of the conditional expression (7) can be a greater value such as 20.60, 21.60, or 22.00, by narrowing the range of the corresponding value of each conditional expression.

In addition, due to the above-described configuration, the zoom optical system can satisfy the following conditional expression (8) while favorably suppressing the aberration fluctuation upon zooming from the wide angle end state to the telephoto end state, $$5.60° < 2\omega t < 7.00° \quad (8)$$

where $2\omega t$: a full angle of view of the zoom optical system in the telephoto end state.

In the above-described configuration, the upper limit value 7.00 of the conditional expression (8) can be a smaller value such as 6.80, 6.60, or 6.40, by narrowing the range of the corresponding value of each conditional expression. Alternatively, the lower limit value 5.60 of the conditional expression (8) can be a greater value such as 5.80, by narrowing the range of the corresponding value of each conditional expression.

In addition, it is preferred that the zoom optical system further satisfies the following conditional expression (9), $$3.30 < ft/fw < 4.00 \quad (9)$$

where ft: a focal length of the whole zoom optical system in a telephoto end state, and fw: a focal length of the whole zoom optical system in a wide angle end state.

The conditional expression (9) defines a ratio between a focal length of the whole zoom optical system in the telephoto end state and a focal length of the whole zoom optical system in the wide angle end state. When the conditional expression (9) is satisfied, high optical performance can be achieved over the entire range while fluctuation of various aberrations upon zooming from the wide angle end state to the telephoto end state is suppressed.

When the corresponding value of the conditional expression (9) is greater than the upper limit value 4.00, fluctuation of various aberrations is less likely to be suppressed upon zooming from the wide angle end state to the telephoto end state. In order to ensure the effect of the present embodiment, it is preferred that the upper limit value of the conditional expression (9) is defined to be a smaller value, for example 3.95, 3.90, 3.85, or 3.80.

On the other hand, when the corresponding value of the conditional expression (9) is smaller than the lower limit value 3.30, fluctuation of various aberrations is less likely to be suppressed upon zooming from the wide angle end state to the telephoto end state. In order to ensure the effect of the present embodiment, it is preferred that the lower limit value of the conditional expression (9) is defined to be a greater value, for example 3.35, 3.45, or 3.50.

In addition, it is preferred that the zoom optical system further satisfies the following conditional expression (10), $$1.80 < TLw/fw < 2.40 \tag{10}$$

where

TLw: an entire length of the zoom optical system in the wide angle end state, and fw: a focal length of the whole zoom optical system in the wide angle end state.

The conditional expression (10) defines a ratio between an entire length of the zoom optical system in the wide angle end state and a focal length of the whole zoom optical system in the wide angle end state. When the conditional expression (10) is satisfied, high optical performance can be achieved over the entire range while fluctuation of various aberrations upon zooming from the wide angle end state to the telephoto end state is suppressed.

When the corresponding value of the conditional expression (10) is greater than the upper limit value 2.40 fluctuation of various aberrations is less likely to be suppressed upon zooming from the wide angle end state to the telephoto end state. In order to ensure the effect of the present embodiment, it is preferred that the upper limit value of the conditional expression (10) is defined to be a smaller value, for example 2.35, 2.30, 2.25, or 2.20.

On the other hand, when the corresponding value of the conditional expression (10) is smaller than the lower limit value 1.80, fluctuation of various aberrations is less likely to be suppressed upon zooming from the wide angle end state to the telephoto end state. In order to ensure the effect of the present embodiment, it is preferred that the lower limit value of the conditional expression (10) is defined to be a greater value, for example 1.85, 1.95, or 2.00.

In addition, it is preferred that the zoom optical system further satisfies the following conditional expression (11), $$0.50 < TLt/ft < 0.90 \tag{11}$$

where

TLt: an entire length of the zoom optical system in the telephoto end state, and ft: a focal length of the whole zoom optical system in the telephoto end state.

The conditional expression (11) defines a ratio between an entire length of the zoom optical system in the telephoto end state and a focal length of the whole zoom optical system in the telephoto end state. When the conditional expression (11) is satisfied, high optical performance can be achieved over the entire range while fluctuation of various aberrations upon zooming from the wide angle end state to the telephoto end state is suppressed.

When the corresponding value of the conditional expression (11) is greater than the upper limit value 0.90 fluctuation of various aberrations is less likely to be suppressed upon zooming from the wide angle end state to the telephoto end state. In order to ensure the effect of the present embodiment, it is preferred that the upper limit value of the conditional expression (11) is defined to be a smaller value, for example 0.88, 0.85, 0.83, or 0.80.

On the other hand, when the corresponding value of the conditional expression (11) is smaller than the lower limit value 0.50, fluctuation of various aberrations is less likely to be suppressed upon zooming from the wide angle end state to the telephoto end state. In order to ensure the effect of the present embodiment, it is preferred that the lower limit value of the conditional expression (11) is defined to be a greater value, for example 0.55, 0.65, 0.70, or 0.75.

In addition, it is preferred that the zoom optical system further satisfies the following conditional expression (12), $$0.13 < BFw/TLw < 0.33 \tag{12}$$

where

BFw: a back focus (air equivalent length) of the zoom optical system in the wide angle end state, and TLw: an entire length of the zoom optical system in the wide angle end state.

The conditional expression (12) defines a ratio between a back focus of the zoom optical system in the wide angle end state and an entire length of the zoom optical system. When the conditional expression (12) is satisfied, widening of an angle of view and reduction in size of the whole optical system are enabled.

When the corresponding value of the conditional expression (12) is greater than the upper limit value 0.33, the longer back focus results in an increase in size of the zoom optical system, and when the entire length of the optical system is short, correction of a spherical aberration and a coma aberration becomes difficult. In order to ensure the effect of the present embodiment, it is preferred that the upper limit value of the conditional expression (12) is defined to be a smaller value, for example 0.32, 0.31, 0.30, 0.29, 0.28, or 0.27.

On the other hand, when the corresponding value of the conditional expression (12) is smaller than the lower limit value 0.13, correction of an off-axis aberration such as a coma aberration becomes difficult. In order to ensure the effect of the present embodiment, it is preferred that the lower limit value of the conditional expression (12) is defined to be a greater value, for example 0.14, 0.16, or 0.17.

In addition, it is preferred that the zoom optical system further satisfies the following conditional expression (13), $$0.13 < BFt/TLt < 0.33 \tag{13}$$

where

BFt: a back focus (air equivalent length) of the zoom optical system in the telephoto end state, and TLt: an entire length of the zoom optical system in the telephoto end state.

The conditional expression (13) defines a ratio between a back focus of the zoom optical system in the telephoto end state and an entire length of the zoom optical system. When the conditional expression (13) is satisfied, widening of an angle of view and reduction in size of the whole optical system are enabled.

When the corresponding value of the conditional expression (13) is greater than the upper limit value 0.33, the longer back focus results in an increase in size of the zoom optical system, and when the entire length of the optical system is short, correction of a spherical aberration and a coma aberration becomes difficult. In order to ensure the effect of the present embodiment, it is preferred that the upper limit value of the conditional expression (13) is defined to be a smaller value, for example 0.32, 0.31, 0.30, or 0.29.

On the other hand, when the corresponding value of the conditional expression (13) is smaller than the lower limit value 0.13, correction of an off-axis aberration such as a coma aberration becomes difficult. In order to ensure the effect of the present embodiment, it is preferred that the lower limit value of the conditional expression (13) is defined to be a greater value, for example 0.14, 0.16, or 0.17.

In addition, the zoom optical system comprises an aperture stop that is arranged alongside the plurality of lens groups on an optical axis, and it is preferred that at least one of the first focusing lens group and the second focusing lens group is arranged in a position closer to the image surface than the aperture stop. In this case, fluctuation of various aberrations such as a spherical aberration upon focusing from the infinity object focusing state to the short-distance object focusing state is suppressed, whereby high optical performance can be achieved over the entire range.

In addition, in the zoom optical system, it is preferred that the first focusing lens group and the second focusing lens group are arranged adjacent to each other. In this case, fluctuation of various aberrations such as a spherical aberration upon focusing from the infinity object focusing state to the short-distance object focusing state is suppressed, whereby high optical performance can be achieved over the entire range.

In addition, in the zoom optical system, it is preferred that the first focusing lens group comprises at least one positive lens and at least one negative lens. In this case, various aberrations such as a spherical aberration and a coma aberration can be favorably corrected, and aberration fluctuation upon focusing from the infinity object focusing state to the short-distance object focusing state is suppressed, whereby high optical performance can be achieved over the entire range.

In this regard, it is preferred that at least one of the negative lens included in the first focusing lens group is a negative meniscus lens having a convex surface facing an object. In this case, various aberrations such as a spherical aberration and a coma aberration can be favorably corrected, and aberration fluctuation upon focusing from the infinity object focusing state to the short-distance object focusing state is suppressed, whereby high optical performance can be achieved over the entire range.

In addition, in the zoom optical system, it is preferred that at least one of the positive lens included in the first focusing lens group satisfies the following conditional expression (14), $$23.00 < vf1p < 35.00 \quad (14)$$

where
vf1p: the Abbe number based on a d-line of the positive lens included in the first focusing lens group.

When the conditional expression (14) is satisfied, various aberrations such as a longitudinal chromatic aberration and a chromatic aberration of magnification can be favorably corrected upon focusing from the infinity object focusing state to the short-distance object focusing state in the wide angle end state.

When the corresponding value of the conditional expression (14) is greater than the upper limit value 35.00, favorable correction of a longitudinal chromatic aberration and a chromatic aberration of magnification upon focusing becomes difficult. In order to ensure the effect of the present embodiment, it is preferred that the upper limit value of the conditional expression (14) is defined to be a smaller value, for example, 34.00, 33.00, 32.00, 31.00, or 30.00.

On the other hand, when the corresponding value of the conditional expression (14) is smaller than the lower limit value 23.00, favorable correction of a longitudinal chromatic aberration and a chromatic aberration of magnification upon focusing becomes difficult. In order to ensure the effect of the present embodiment, it is preferred that the lower limit value of the conditional expression (14) is defined to be a greater value, for example 23.50, 24.50, or 25.00.

In addition, in the zoom optical system, it is preferred that at least one of the negative lens included in the first focusing lens group satisfies the following conditional expression (15), $$30.00 < vf1n < 45.00 \quad (15)$$

where
vf1n: the Abbe number based on a d-line of the negative lens included in the first focusing lens group.

When the conditional expression (15) is satisfied, various aberrations such as a longitudinal chromatic aberration and a chromatic aberration of magnification can be favorably corrected upon focusing from the infinity object focusing state to the short-distance object focusing state in the wide angle end state.

When the corresponding value of the conditional expression (15) is greater than the upper limit value 45.00, favorable correction of a longitudinal chromatic aberration and a chromatic aberration of magnification upon focusing becomes difficult. In order to ensure the effect of the present embodiment, it is preferred that the upper limit value of the conditional expression (15) is defined to be a smaller value, for example, 44.00, 43.00, 42.00, or 41.00.

On the other hand, when the corresponding value of the conditional expression (15) is smaller than the lower limit value 30.00, favorable correction of a longitudinal chromatic aberration and a chromatic aberration of magnification upon focusing becomes difficult. In order to ensure the effect of the present embodiment, it is preferred that the lower limit value of the conditional expression (15) is defined to be a greater value, for example, 31.00, 33.00, 34.00, or 35.00.

In addition, in the zoom optical system, it is preferred that the second focusing lens group comprises at least one positive lens and at least one negative lens. In this case, various aberrations such as a spherical aberration and a coma aberration can be favorably corrected, and aberration fluctuation upon focusing from the infinity object focusing state to the short-distance object focusing state is suppressed, whereby high optical performance can be achieved over the entire range.

In addition, in the zoom optical system, it is preferred that at least one of the positive lens included in the second focusing lens group satisfies the following conditional expression (16), $$23.00 < vf2p < 35.00 \quad (16)$$

where
vf2p: the Abbe number based on a d-line of the positive lens included in the second focusing lens group.

When the conditional expression (16) is satisfied, various aberrations such as a longitudinal chromatic aberration and a chromatic aberration of magnification can be favorably corrected upon focusing from the infinity object focusing state to the short-distance object focusing state in the wide angle end state.

When the corresponding value of the conditional expression (16) is greater than the upper limit value 35.00, favorable correction of a longitudinal chromatic aberration and a chromatic aberration of magnification upon focusing becomes difficult. In order to ensure the effect of the present embodiment, it is preferred that the upper limit value of the conditional expression (16) is defined to be a smaller value, for example, 34.50, 34.00, 33.50, 33.00, or 32.50.

On the other hand, when the corresponding value of the conditional expression (16) is smaller than the lower limit value 23.00, favorable correction of a longitudinal chromatic aberration and a chromatic aberration of magnification upon focusing becomes difficult. In order to ensure the effect of the present embodiment, it is preferred that the lower limit value of the conditional expression (16) is defined to be a greater value, for example, 24.00, 25.00, 25.50, 26.00, 26.50, or 27.00.

In addition, in the zoom optical system, it is preferred that at least one of the negative lens included in the second focusing lens group satisfies the following conditional expression (17), $$50.00 < vf2n < 58.00 \tag{17}$$

where $vf2n$: the Abbe number based on a d-line of the negative lens included in the second focusing lens group.

When the conditional expression (17) is satisfied, various aberrations such as a longitudinal chromatic aberration and a chromatic aberration of magnification can be favorably corrected upon focusing from the infinity object focusing state to the short-distance object focusing state in the wide angle end state.

When the corresponding value of the conditional expression (17) is greater than the upper limit value 58.00, favorable correction of a longitudinal chromatic aberration and a chromatic aberration of magnification upon focusing becomes difficult. In order to ensure the effect of the present embodiment, it is preferred that the upper limit value of the conditional expression (17) is defined to be a smaller value, for example, 57.50, 57.00, 56.50, 56.00, 55.50, or 55.00.

On the other hand, when the corresponding value of the conditional expression (17) is smaller than the lower limit value 50.00, favorable correction of a longitudinal chromatic aberration and a chromatic aberration of magnification upon focusing becomes difficult. In order to ensure the effect of the present embodiment, it is preferred that the lower limit value of the conditional expression (17) is defined to be a greater value, for example 50.50, 51.50, or 52.00.

In addition, in the zoom optical system, it is preferred that at least one of the negative lens included in the second focusing lens group is a biconcave negative lens. This enables favorable correction of various aberrations such as a spherical aberration upon focusing from the infinity object focusing state to the short-distance object focusing state, and reduction in size of the focusing lens group.

In addition, it is preferred that the zoom optical system further satisfies the following conditional expression (18), $$1.00 < 1/\beta WF1 < 2.00 \tag{18}$$

where $\beta WF1$: a lateral magnification of the first focusing lens group in a wide angle end state upon focusing on an object at infinity.

The conditional expression (18) defines a lateral magnification of the first focusing lens group in a wide angle end state upon focusing on an object at infinity. When the conditional expression (18) is satisfied, fluctuation of various aberrations such as a spherical aberration upon focusing from the infinity object focusing state to the short-distance object focusing state is suppressed, whereby high optical performance can be achieved over the entire range.

When the corresponding value of the conditional expression (18) is greater than the upper limit value 2.00, fluctuation of various aberrations is less likely to be suppressed upon focusing in the wide angle end state. In order to ensure the effect of the present embodiment, it is preferred that the upper limit value of the conditional expression (18) is defined to be a smaller value, for example 1.95, 1.90, 1.85, 1.80, 1.75, 1.70, 1.65, 1.60, or 1.55.

On the other hand, when the corresponding value of the conditional expression (18) is smaller than the lower limit value 1.00, fluctuation of various aberrations is less likely to be suppressed upon focusing in the wide angle end state. In order to ensure the effect of the present embodiment, it is preferred that the lower limit value of the conditional expression (18) is defined to be a greater value, for example, 1.02, 1.08, 1.10, 1.12, or 1.14.

In addition, it is preferred that the zoom optical system further satisfies the following conditional expression (19), $$1.00 < \beta WF2 < 2.00 \tag{19}$$

where $\beta WF2$: a lateral magnification of the second focusing lens group in a wide angle end state upon focusing on an object at infinity.

The conditional expression (19) defines a lateral magnification of the second focusing lens group in a wide angle end state upon focusing on an object at infinity.

The conditional expression (19) defines a lateral magnification of the second focusing lens group in a wide angle end state upon focusing on an object at infinity. When the conditional expression (19) is satisfied, fluctuation of various aberrations such as a spherical aberration upon focusing from the infinity object focusing state to the short-distance object focusing state is suppressed, whereby high optical performance can be achieved over the entire range.

When the corresponding value of the conditional expression (19) is greater than the upper limit value 2.00, fluctuation of various aberrations is less likely to be suppressed upon focusing in the wide angle end state. In order to ensure the effect of the present embodiment, it is preferred that the upper limit value of the conditional expression (19) is defined to be a smaller value, for example 1.95, 1.90, 1.85, 1.80, 1.75, 1.70, or 1.68.

On the other hand, when the corresponding value of the conditional expression (19) is smaller than the lower limit value 1.00, fluctuation of various aberrations is less likely to be suppressed upon focusing in the wide angle end state. In order to ensure the effect of the present embodiment, it is preferred that the lower limit value of the conditional expression (19) is defined to be a greater value, for example, 1.05, 1.15, 1.20, 1.25, 1.30, 1.35, or 1.40.

In addition, it is preferred that the zoom optical system further satisfies the following conditional expression (20), $$\{\beta WF1 + (1/\beta WF1)\}^{-2} < 0.250 \tag{20}$$

where $\beta WF1$: a lateral magnification of the first focusing lens group in a wide angle end state upon focusing on an object at infinity.

The conditional expression (20) defines a condition to be satisfied by a lateral magnification of the first focusing lens group in a wide angle end state upon focusing on an object at infinity. When the conditional expression (20) is satisfied, fluctuation of various aberrations such as a spherical aberration upon focusing from the infinity object focusing state to the short-distance object focusing state is suppressed, whereby high optical performance can be achieved over the entire range.

When the corresponding value of the conditional expression (20) is greater than the upper limit value 0.250, fluctuation of various aberrations is less likely to be suppressed upon focusing in the wide angle end state. In order to ensure the effect of the present embodiment, it is preferred that the upper limit value of the conditional expression (20) is defined to be a smaller value, for example, 0.248.

In addition, it is preferred that the zoom optical system further satisfies the following conditional expression (21), $$\{\beta WF2+(1/\beta WF2)\}^{-2}<0.250 \qquad (21)$$

where

βWF2: a lateral magnification of the second focusing lens group in a wide angle end state upon focusing on an object at infinity.

The conditional expression (21) defines a condition to be satisfied by a lateral magnification of the second focusing lens group in a wide angle end state upon focusing on an object at infinity. When the conditional expression (21) is satisfied, fluctuation of various aberrations such as a spherical aberration upon focusing from the infinity object focusing state to the short-distance object focusing state is suppressed, whereby high optical performance can be achieved over the entire range.

When the corresponding value of the conditional expression (21) is greater than the upper limit value 0.250, fluctuation of various aberrations is less likely to be suppressed upon focusing in the wide angle end state. In order to ensure the effect of the present embodiment, it is preferred that the upper limit value of the conditional expression (21) is defined to be a smaller value, for example, 0.245, 0.240, 0.235, 0.230, or 0.225.

In addition, in the zoom optical system, it is preferred that the first focusing lens group satisfies the following conditional expression (22), $$0.28<F1pos/TLt<0.38 \qquad (22)$$

where

F1pos: a position of the first focusing lens group in a telephoto end state upon focusing on an object at infinity (the position of the lens group being a distance from a surface of the lens group closest to an object to an image surface), and TLt: an entire length of the zoom optical system in the telephoto end state.

The conditional expression (22) defines a ratio between a position of the first focusing lens group in a telephoto end state upon focusing on an object at infinity and an entire length of the zoom optical system in the telephoto end state. When the conditional expression (22) is satisfied, fluctuation of various aberrations such as a spherical aberration can be suppressed upon focusing from the infinity object focusing state to the short-distance object focusing state, and furthermore, change in an angle of view (breathing) upon a focusing operation can be reduced.

When the corresponding value of the conditional expression (22) is greater than the upper limit value 0.38, the position of the first focusing group is far from an image surface, whereby it is difficult to suppress fluctuation of various aberrations such as a spherical aberration upon focusing, and to reduce the change in an angle of view upon the focusing operation. In order to ensure the effect of the present embodiment, it is preferred that the upper limit value of the conditional expression (22) is defined to be a smaller value, for example, 0.37, 0.36, or 0.35.

On the other hand, when the corresponding value of the conditional expression (22) is smaller than the lower limit value 0.28, the position of the first focusing group is too close to an image surface, whereby fluctuation of various aberrations such as a spherical aberration upon focusing is less likely to be suppressed. In order to ensure the effect of the present embodiment, it is preferred that the lower limit value of the conditional expression (22) is defined to be a greater value, for example 0.29 or 0.31.

In addition, in the zoom optical system, it is preferred that, among the lens groups constituting the plurality of lens groups, the number of lens groups arranged closer to an image surface than the first focusing lens group is not greater than two. In this case, fluctuation of various aberrations such as a spherical aberration can be suppressed upon focusing from the infinity object focusing state to the short-distance object focusing state, and furthermore, change in an angle of view upon a focusing operation can be reduced.

In addition, in the zoom optical system, it is preferred that the plurality of lens groups comprise, in order from an object: a first positive lens group having positive refractive power; a first negative lens group having negative refractive power; and a second positive lens group having positive refractive power.

As an example, a configuration is conceivable in which a first lens group having positive refractive power, a second lens group having negative refractive power, and a third lens group having positive refractive power are arranged in order from the closest position to an object. In this example, a configuration is preferred in which, upon zooming from the wide angle end state to the telephoto end state, the second lens group having negative refractive power does not move, and both the first and third lens groups having positive refractive power move in an object direction.

The above-described configuration enables effective suppression of fluctuation of various aberrations generated upon zooming from the wide angle end state to the telephoto end state without an increase in size of a lens barrel.

The plurality of lens groups may further comprise a second negative lens group having negative refractive power arranged on an image side of the second positive lens group.

As an example, a configuration is conceivable in which the first lens group having positive refractive power, the second lens group having negative refractive power, the third lens group having positive refractive power, and a fourth lens group having negative refractive power are arranged in order from the closest position to an object. In this example, a configuration is preferred in which, upon zooming from the wide angle end state to the telephoto end state, the second lens group having negative refractive power does not move, and both the first and third lens groups having positive refractive power move in an object direction. It is preferred that the fourth lens group having negative refractive power is configured not to move upon zooming, in a similar manner to the second lens group.

The above-described configuration enables effective suppression of fluctuation of various aberrations generated upon zooming from the wide angle end state to the telephoto end state without an increase in size of a lens barrel.

In the above-described configuration, it is preferred that at least one of the first positive lens group and the second positive lens group comprises a specific positive lens sp consisting of a glass material that satisfies the following conditional expressions (23) and (24), $$85.00 < vsp < 100.00 \quad (23)$$

$$\theta gFsp - (0.644 - 0.00168 vsp) > 0.01 \quad (24)$$

where vsp: the Abbe number based on a d-line of the specific positive lens sp, and θgFsp: a partial dispersion ratio of the specific positive lens sp with respect to an F-line (the partial dispersion ratio being defined as θgF=(ng−nF)/(nF−nC), where ng is a refractive index with respect to a g-line, nF is a refractive index with respect to the F-line, and nC is a refractive index with respect to a C-line).

Due to employing the specific positive lens that satisfies the conditional expressions (23) and (24) as a lens constituting the positive lens group, a color aberration can be favorably corrected, and fluctuation of a color aberration upon zooming from the wide angle end state to the telephoto end state can be effectively suppressed.

In order to ensure the effect of the present embodiment, it is preferred that the upper limit value of the conditional expression (23) is defined to be a smaller value, for example 99.00, 98.00, or 97.00, and the lower limit value of the conditional expression (23) is defined to be a greater value, for example, 87.00, 90.00, 92.00, 94.00, or 95.00. Furthermore, it is preferred that the lower limit value of the conditional expression (24) is defined to be a greater value, for example 0.02, 0.04, or 0.05.

Alternatively, the first positive lens group may be configured to comprise the specific positive lens sp consisting of the glass material that satisfies the conditional expressions (23) and (24), and the second positive lens group may be configured to comprise a specific positive lens sp' consisting of a glass material that satisfies the following conditional expressions (25) and (26), $$80.00 < vsp' < 100.00 \quad (25)$$

$$\theta gFsp' - (0.644 - 0.00168 vsp) > 0.01 \quad (26)$$

where vsp': the Abbe number based on a d-line of the specific positive lens sp', and θgFsp': a partial dispersion ratio of the specific positive lens sp' with respect to an F-line.

Due to configuring both the first positive lens group and the second positive lens group to comprise the specific positive lens, a color aberration can be more favorably corrected, and fluctuation of a color aberration upon zooming from the wide angle end state to the telephoto end state can be effectively suppressed.

In order to ensure the effect of the present embodiment, it is preferred that the upper limit value of the conditional expression (25) is defined to be a smaller value, for example 99.00, 98.00, or 97.00, and the lower limit value of the conditional expression (25) is defined to be a greater value, for example, 80.50, 81.50, or 82.00. Furthermore, it is preferred that the lower limit value of the conditional expression (26) is defined to be a greater value, for example 0.02, 0.04, or 0.05.

In addition, in the above-described configuration, it is preferred that the first positive lens group satisfies the following conditional expression (27), $$0.40 < fpr/ft < 0.60 \quad (27)$$

fpr: a focal length of the first positive lens group, and ft: a focal length of the whole zoom optical system in a telephoto end state.

The conditional expression (27) defines a ratio between a focal length of the first positive lens group and a focal length of the whole zoom optical system in a telephoto end state, indicating a power distribution of the first positive lens group in the whole system. When the conditional expression (27) is satisfied, the power distribution of the first positive lens group becomes appropriate, whereby fluctuation of various aberrations generated upon zooming from the wide angle end state to the telephoto end state can be effectively suppressed.

When the corresponding value of the conditional expression (27) is greater than the upper limit value 0.60, refractive power of the first positive lens group becomes weaker, whereby fluctuation of various aberrations generated upon zooming from the wide angle end state to the telephoto end state is less likely to be suppressed. In order to ensure the effect of the present embodiment, it is preferred that the upper limit value of the conditional expression (27) is defined to be a smaller value, for example, 0.59, 0.58, 0.57, 0.56, or 0.55.

On the other hand, when the corresponding value of the conditional expression (27) is smaller than the lower limit value 0.40, refractive power of the first positive lens group becomes greater, whereby fluctuation of various aberrations generated upon zooming from the wide angle end state to the telephoto end state is less likely to be suppressed. In order to ensure the effect of the present embodiment, it is preferred that the lower limit value of the conditional expression (27) is defined to be a greater value, for example 0.41, 0.43, or 0.44.

Figure 20:
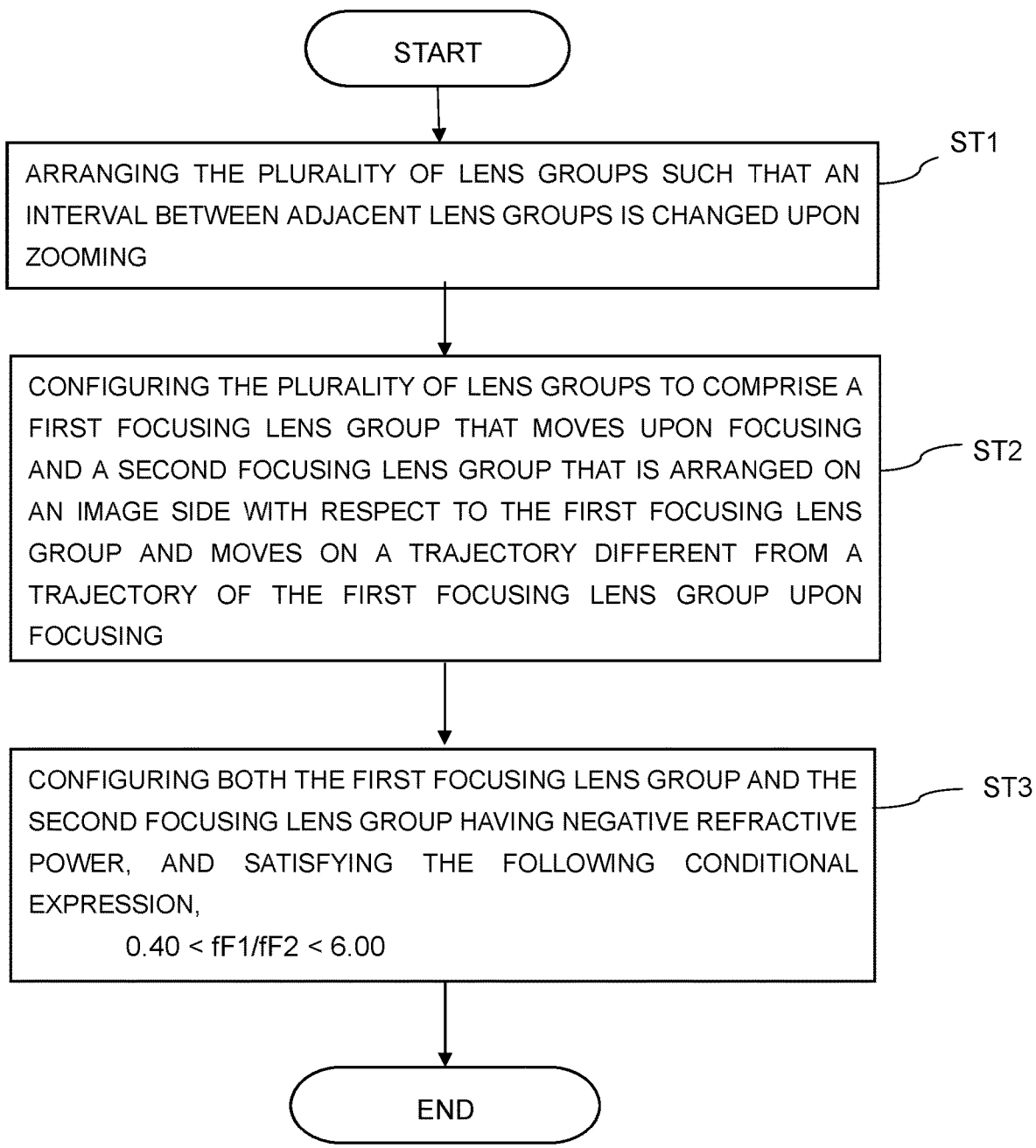
FIG. 20 is a flow chart showing a method for manufacturing the optical system.

Subsequently, a method for manufacturing the above-described zoom optical system is outlined with reference to FIG. 20. The plurality of lens groups are arranged such that an interval between adjacent lens groups is changed upon zooming (ST1). The plurality of lens groups are configured to comprise a first focusing lens group that moves upon focusing and a second focusing lens group that is arranged on an image side with respect to the first focusing lens group and moves on a trajectory different from a trajectory of the first focusing lens group upon focusing (ST2). Both the first focusing lens group and the second focusing lens group have negative refractive power, and are arranged in the lens barrel to satisfy the following conditional expression (ST3), $$0.40 < fF1/fF2 < 6.00$$

where fF1: a focal length of the first focusing lens group, and fF2: a focal length of the second focusing lens group.

The zoom optical system manufactured by the above-described procedure and an optical apparatus mounted with the zoom optical system realize high-speed and quiet automatic focus without an increase in size of a lens barrel, and enables favorable suppression of aberration fluctuation upon zooming from the wide angle end state to the telephoto end state, and aberration fluctuation upon focusing from an infinity object to a short-distance object.

EXAMPLES

Hereinafter, the above-described zoom optical system is further described while presenting six numerical examples, Example 1 to Example 6. First, explanation is given as to how to read drawings and tables referenced in the description of each Example.

FIG. 1, FIG. 4, FIG. 7, FIG. 10, FIG. 13, and FIG. 16 are diagrams showing a lens configuration and operation of the zoom optical system in each Example. In a center of each drawing, a sequence of the lens groups is shown by a cross-sectional view. In a lower part of each drawing, moving trajectories of lens groups G and an aperture stop S on an optical axis upon zooming from the wide angle end state (W) to the telephoto end state (T) are shown by arrows on a two-dimensional plane. On the two-dimensional plane, a lateral axis represents a position on the optical axis, and a vertical axis represents a state of the zoom optical system. In an upper part of each drawing, a moving trajectory (moving direction and moving amount) of a focusing lens group upon focusing from an infinity object to a shortest-distance object is shown by an arrow with texts "Focusing" and "∞".

In FIG. 1, FIG. 4, FIG. 7, FIG. 10, FIG. 13, and FIG. 16, each lens group is denoted by a combination of a symbol G and a numeral, and each lens is denoted by a combination of a symbol L and a numeral. In the present specification, numerals are assigned in each Example in order to avoid complexity due to a large number of symbols. Given this, although the same symbol-numeral combination may be used in a plurality of Examples, this does not mean that configurations denoted by the symbol-numeral combination are identical.

FIG. 2, FIG. 5, FIG. 8, FIG. 11, FIG. 14, and FIG. 17 are graphs showing various aberrations of the zoom optical system upon focusing on an object at infinity in each Example, and FIG. 3, FIG. 6, FIG. 9, FIG. 12, FIG. 15, and FIG. 18 are graphs showing various aberrations of the zoom optical system upon focusing on a shortest-distance object in each Example. In these drawings, FNO denotes the F number, NA denotes a numerical aperture, and Y denotes an image height, respectively. In a graph showing a spherical aberration, an F number or a value of a numerical aperture corresponding to the maximum diameter is indicated; in a graph showing astigmatism and a graph showing distortion, the respective maximum values of an image height are indicated; and in a graph showing a coma aberration, a value of each image height is indicated. In each graph showing an aberration, d denotes a d-line (λ=587.6 nm), g denotes a g-line (λ=435.8 nm), C denotes a C-line (λ=656.3 nm), and F denotes an F-line (λ=486.1 nm), respectively. In a graph showing astigmatism, a solid line indicates a sagittal image surface, and a dotted line indicates a meridional image surface, respectively.

Subsequently, tables used for description of each Example are explained.

In the table [General Data], f denotes a focal length of the whole lens system, F.NO denotes the F number, 2ω denotes an angle of view (in unit of ° (degree), ω denoting a half angle of view), and Ymax denotes the maximum image height. TL denotes a distance obtained by adding BF to a distance between a foremost lens surface and a rearmost lens surface on an optical axis upon focusing on an object at infinity, and BF denotes an air equivalent distance (back focus) from the rearmost lens surface to the image surface I on an optical axis upon focusing on an object at infinity. Note that these values are shown for each of zooming states: wide angle end (W); intermediate focal length (M); and telephoto end (T).

In the table [Lens Data], Surface Number indicates an order of optical surfaces along a traveling direction of a ray of light in order from an object, R denotes curvature radius of each optical face (positive value is for a surface on which a center of curvature is positioned on an image surface side), D denotes a surface distance, which is a distance between optical surface and an adjacent optical surface (or an image surface) on an optical axis, nd denotes a refractive index of a material of an optical member with respect to the d-line, vd denotes the Abbe number based on the d-line of the material of the optical member, and θgF denotes a partial dispersion ratio with respect to the F-line, respectively. The partial dispersion ratio θgF is defined as θgF=(ng−nF)/(nF−nC), where ng is a refractive index with respect to the g-line, nF is a refractive index with respect to the F-line, and nC is a refractive index with respect to the C-line. A reference to a refractive index of air, nd=1.00000, is omitted. (S) denotes an aperture stop, and "∞" of the curvature radius denotes a plane or an aperture, respectively. In a column of curvature radius R, a paraxial radius of curvature is indicated.

The table [Lens Group Data] shows a first surface (surface closest to an object) and a focal length of each lens group.

The table [Variable Distance Data] shows a distance between a surface, a surface distance of which is indicated as "(Dx)" (x being the surface number) in the table showing [Lens Data], and an adjacent surface. Here, surface distances are respectively shown for focusing on an object at infinity and on a shortest-distance object, in each of zooming states: wide angle end (W); intermediate focal length (M); and telephoto end (T).

The table [Conditional Expression Corresponding Value] shows values corresponding to each conditional expression.

Note that, since a length unit "mm" is typically used for the focal length f, the curvature radius R, the surface distance D, and the like, the length unit "mm" is used also in each table in the present specification. Note that the length unit is not necessarily limited to "mm", since the optical system is capable of providing similar optical performance even with a proportional enlargement or a proportional reduction.

The above explanation of the drawings and the tables is common to all Examples, and repeated explanation thereof is omitted hereinafter.

Example 1

Figure 1:
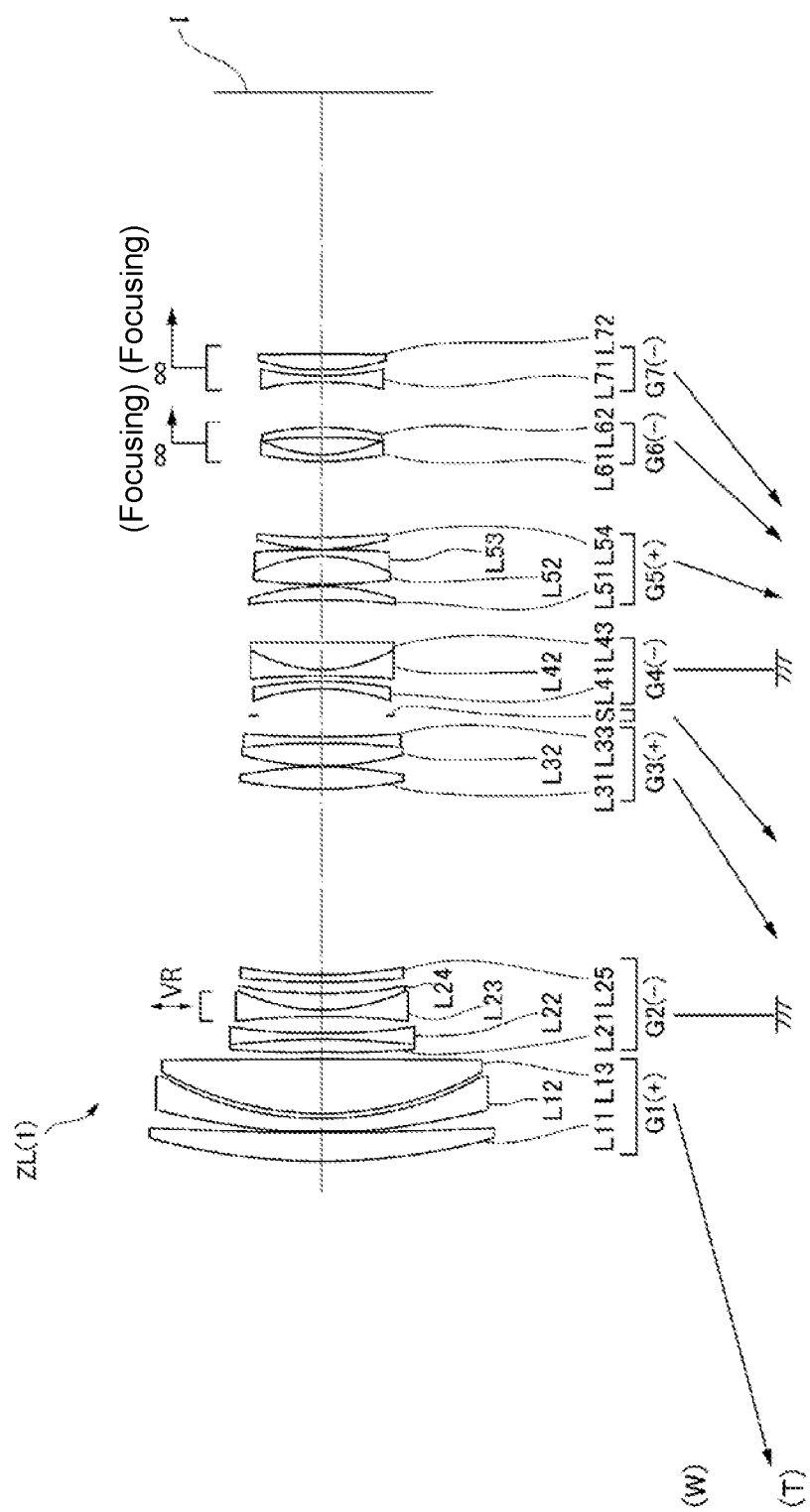
FIG. 1 is a diagram showing a lens configuration of a zoom optical system according to Example 1.

Example 1 is described with reference to FIG. 1, FIG. 2, FIG. 3, and Table 1. FIG. 1 is a diagram showing a lens configuration of a zoom optical system according to Example 1. A zoom optical system ZL (1) according to Example 1 is configured with: a first lens group G1 having positive refractive power; a second lens group G2 having negative refractive power; a third lens group G3 having positive refractive power; an aperture stop S; a fourth lens group G4 having negative refractive power; a fifth lens group G5 having positive refractive power; a sixth lens group G6 having negative refractive power; and a seventh lens group G7 having negative refractive power, arranged in order from an object. The image surface I is positioned behind the seventh lens group G7.

The first lens group G1, the third lens group G3, the aperture stop S, and the fifth to seventh lens groups G5 to G7 move along a trajectory shown by an arrow in the lower part of FIG. 1 when the zoom optical system zooms from the wide angle end state (W) to the telephoto end state (T). As an interval between adjacent lens groups changes, a focal length of the whole optical system changes, whereby a photographing magnification is changed (zooming is realized). Upon focusing, the sixth lens group G6 and the seventh lens group G7 move on respectively different trajectories (independently from each other). In addition, as shown by an arrow in an upper part of FIG. 1, both the sixth lens group G6 and the seventh lens group G7 move in an image surface direction upon focusing from the infinity object focusing state to the short-distance object focusing state.

The first lens group G1 is configured with: a positive meniscus lens L11 having a convex surface facing an object; a negative meniscus lens L12 having a convex surface facing an object; and a biconvex positive lens L13, arranged in order from an object. The positive lens L13 is a specific lens consisting of a glass material having high anomalous dispersion characteristics, for example fluorite.

The second lens group G2 is configured with: a cemented negative lens with a biconvex positive lens L21 and a biconcave negative lens L22; a cemented negative lens with a biconcave negative lens L23 and a positive meniscus lens L24 having a convex surface facing an object; and a negative meniscus lens L25 having a convex surface facing an object, arranged in order from an object. The cemented negative lens with the negative lens L23 and the positive meniscus lens L24 is a vibration proof lens, and moves to have a component in a direction perpendicular to the optical axis, or rotationally moves (swings) in an in-plane direction including the optical axis, to thereby correct an image blur caused by camera shake.

The third lens group G3 is configured with: a biconvex positive lens L31; and a cemented positive lens with a biconvex positive lens L32 and a biconcave negative lens L33, arranged in order from an object. The positive lens L31 is a specific lens consisting of a glass material having high anomalous dispersion characteristics. The aperture stop S is arranged on an image side of the third lens group G3 in an independently movable state.

The fourth lens group G4 is configured with: a negative meniscus lens L41 having a concave surface facing an object; and a cemented negative lens with a biconcave negative lens L42 and a biconvex positive lens L43, arranged in order from an object.

The fifth lens group G5 is configured with: a positive meniscus lens L51 having a concave surface facing an object; a cemented positive lens with a biconvex positive lens L52 and a negative meniscus lens L53 having a concave surface facing an object; and a positive meniscus lens L54 having a convex surface facing an object, arranged in order from an object.

The sixth lens group G6 is configured with: a negative meniscus lens L61 having a convex surface facing an object; and a positive meniscus lens L62 having a concave surface facing an object, arranged in order from an object.

The seventh lens group G7 is configured with: a biconcave negative lens L71; and a biconvex positive lens L72, arranged in order from an object.

In Table 1 below, data values of the zoom optical system according to Example 1 are shown.

TABLE 1

[General Data]
Zooming ratio = 3.767
MWF1 = 1.5889
MWF2 = 4.9353

|   | W | M | T |
|---|---|---|---|
| f | 103.00 | 199.99 | 388.01 |
| F.NO | 4.62 | 4.93 | 5.83 |
| ω | 11.82 | 6.02 | 3.10 |
| Ymax | 21.63 | 21.63 | 21.63 |

TABLE 1-continued

[General Data]
Zooming ratio = 3.767
MWF1 = 1.5889
MWF2 = 4.9353

|    |         |         |         |
|----|---------|---------|---------|
| TL | 221.000 | 269.958 | 300.954 |
| BF | 54.09   | 64.60   | 82.79   |

[Lens Data]

| Surface Number | R | D | nd | νd | θgF |
|---|---|---|---|---|---|
| Object Surface | ∞ | | | | |
| 1 | 136.3738 | 5.902 | 1.59349 | 67.00 | |
| 2 | 684.8851 | 0.100 | | | |
| 3 | 133.5429 | 2.700 | 1.65412 | 39.68 | |
| 4 | 67.4672 | 1.053 | | | |
| 5 | 67.2959 | 11.160 | 1.43385 | 95.23 | 0.539 |
| 6 | −5760.2693 | (D6) | | | |
| 7 | 292.6765 | 2.683 | 1.75575 | 24.71 | |
| 8 | −198.8463 | 1.400 | 1.80440 | 39.61 | |
| 9 | 151.5821 | 3.436 | | | |
| 10 | −163.8339 | 1.400 | 1.71300 | 53.96 | |
| 11 | 41.9292 | 3.317 | 1.90366 | 31.27 | |
| 12 | 90.8103 | 2.468 | | | |
| 13 | 206.9706 | 1.400 | 1.48749 | 70.32 | |
| 14 | 88.4713 | (D14) | | | |
| 15 | 89.7023 | 4.580 | 1.43384 | 95.16 | 0.539 |
| 16 | −90.0386 | 0.154 | | | |
| 17 | 64.6593 | 4.630 | 1.51680 | 64.13 | |
| 18 | −174.8323 | 1.300 | 1.83400 | 37.18 | |
| 19 | 179.5428 | (D19) | | | |
| 20 (S) | 0.0000 | (D20) | | | |
| 21 | −43.0275 | 1.594 | 1.80518 | 25.45 | |
| 22 | −80.2192 | 1.110 | | | |
| 23 | −200.2428 | 1.300 | 1.60300 | 65.44 | |
| 24 | 28.6704 | 5.593 | 1.72342 | 38.03 | |
| 25 | −1035.5903 | (D25) | | | |
| 26 | −122.1352 | 2.796 | 1.95375 | 32.32 | |
| 27 | −46.5904 | 0.311 | | | |
| 28 | 102.1311 | 5.924 | 1.51860 | 69.89 | |
| 29 | −30.4307 | 1.300 | 1.85478 | 24.80 | |
| 30 | −199.0978 | 0.150 | | | |
| 31 | 52.2786 | 2.363 | 1.80100 | 34.92 | |
| 32 | 124.6585 | (D32) | | | |
| 33 | 62.2062 | 1.300 | 1.88300 | 40.69 | |
| 34 | 27.0561 | 3.577 | | | |
| 35 | −116.3208 | 2.165 | 1.78472 | 25.64 | |
| 36 | −50.9400 | (D36) | | | |
| 37 | −56.7574 | 1.300 | 1.75500 | 52.33 | |
| 38 | 62.6511 | 1.197 | | | |
| 39 | 46.7150 | 3.286 | 1.67270 | 32.18 | |
| 40 | −651.0844 | (D40) | | | |
| Image Surface | ∞ | | | | |

[Lens Group Data]

| Group | First surface | Focal length |
|---|---|---|
| 1 | 1 | 190.713 |
| 2 | 7 | −61.840 |
| 3 | 15 | 87.083 |
| 4 | 21 | −153.583 |
| 5 | 26 | 49.643 |
| 6 | 33 | −117.445 |
| 7 | 37 | −106.442 |

[Variable Distance Data]

| | Infinity | | | shortest-distance | | |
|---|---|---|---|---|---|---|
| | W | M | T | W | M | T |
| F/β | 103.000 | 199.994 | 388.014 | −0.1241 | −0.2159 | −0.3407 |
| D0 | 0.000 | 0.000 | 0.000 | 759.000 | 710.000 | 679.000 |
| D6 | 1.500 | 50.500 | 81.500 | 1.500 | 50.500 | 81.500 |

TABLE 1-continued

[General Data]
Zooming ratio = 3.767
MWF1 = 1.5889
MWF2 = 4.9353

| D14 | 38.436 | 20.665 | 1.500 | 38.436 | 20.665 | 1.500 |
|-----|--------|--------|-------|--------|--------|-------|
| D19 | 4.467 | 15.688 | 15.011 | 4.467 | 15.688 | 15.011 |
| D20 | 5.500 | 12.051 | 31.892 | 5.500 | 12.051 | 31.892 |
| D25 | 8.903 | 5.697 | 2.476 | 8.903 | 5.697 | 2.476 |
| D32 | 15.818 | 12.443 | 1.500 | 17.680 | 20.231 | 23.224 |
| D36 | 9.332 | 5.366 | 1.339 | 12.679 | 9.724 | 11.216 |
| D40 | 9.604 | 20.156 | 38.339 | 4.415 | 8.026 | 6.772 |

Figure 2A:
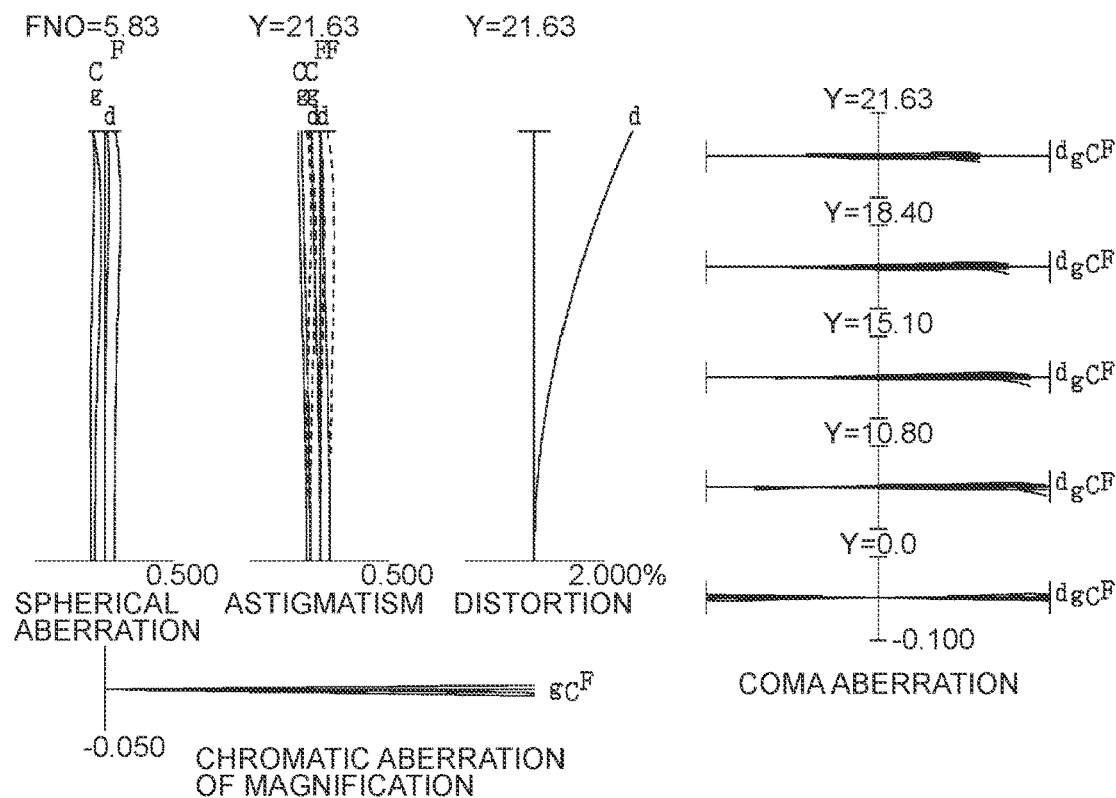
FIGS. 2A and 2B are graphs showing various aberrations of the optical system according to Example 1 in a telephoto end state, FIG. 2A showing various aberrations upon focusing on an object at infinity, and FIG. 2B showing various aberrations upon focusing on a shortest-distance object.
Figure 2B:
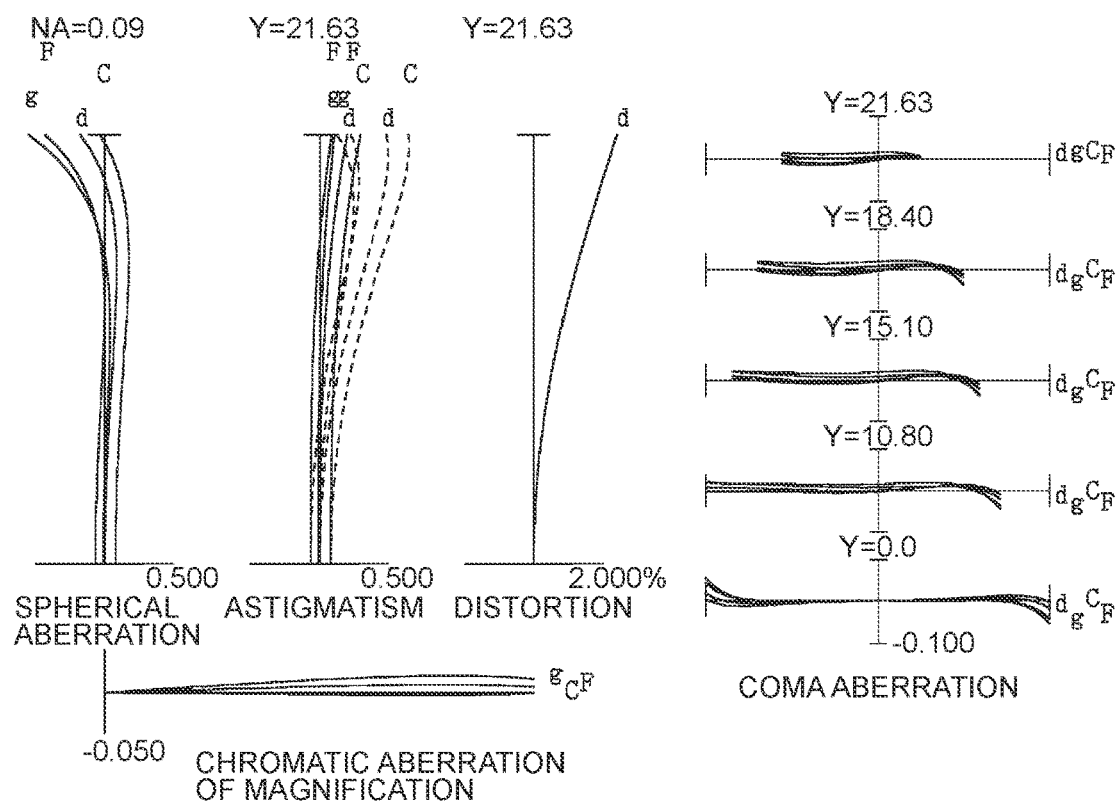
Figure 3A:
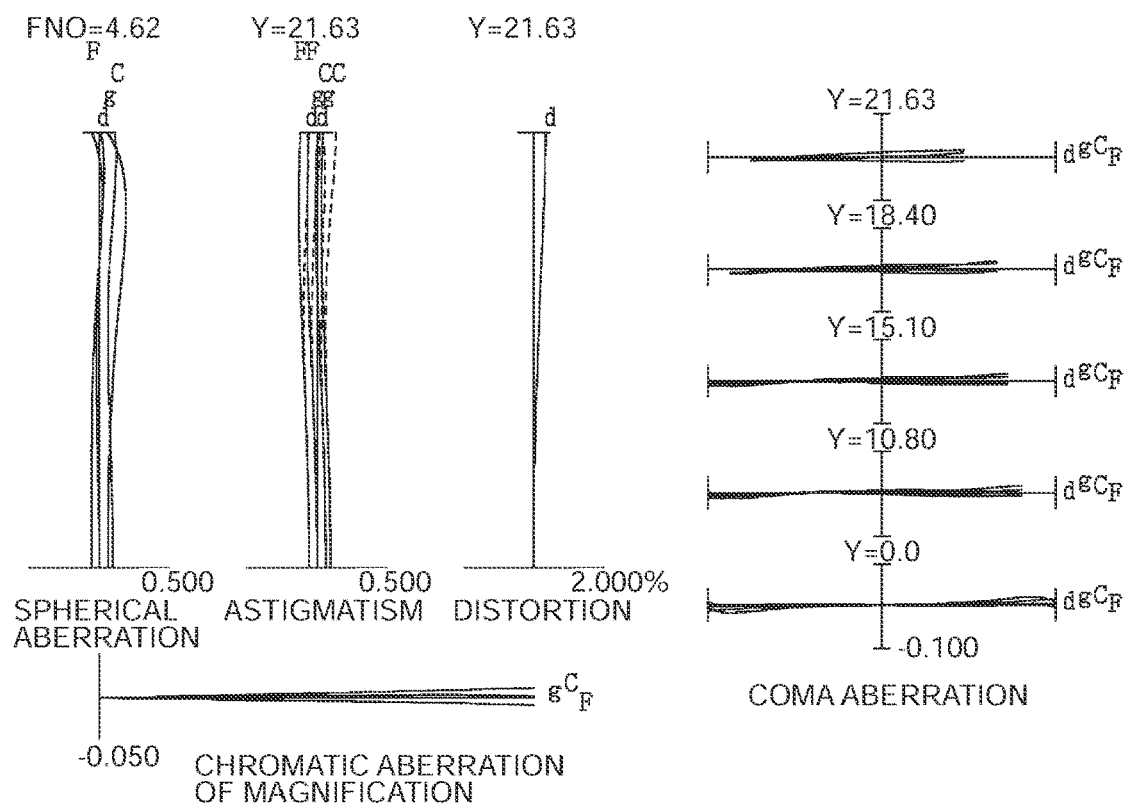
FIGS. 3A and 3B are graphs showing various aberrations of the optical system according to Example 1 in a wide angle end state, FIG. 3A showing various aberrations upon focusing on an object at infinity, and FIG. 3B showing various aberrations upon focusing on a shortest-distance object.
Figure 3B:
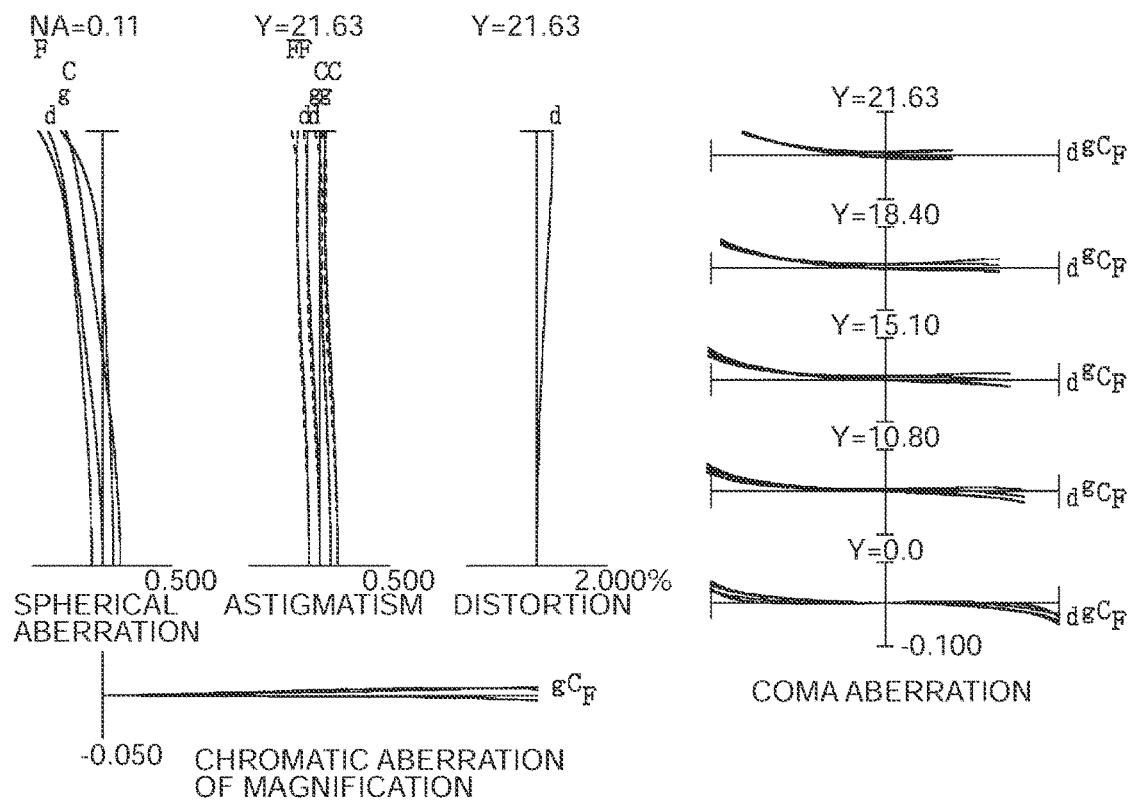

FIGS. 2A and 2B show values of various aberrations of the optical system according to Example 1 in the telephoto end state, upon focusing on an object at infinity (FIG. 2A) and upon focusing on a shortest-distance object (FIG. 2B). In addition, FIGS. 3A and 3B show values of various aberrations of the optical system according to Example 1 in the wide angle end state, upon focusing on an object at infinity (FIG. 3A) and upon focusing on a shortest-distance object (FIG. 3B). It is observed from the graphs showing various aberrations that the optical system according to Example 1 favorably corrects various aberrations and has superior imaging performance, and furthermore, has superior imaging performance also upon focusing on a short-distance object.

Example 2

Figure 4:
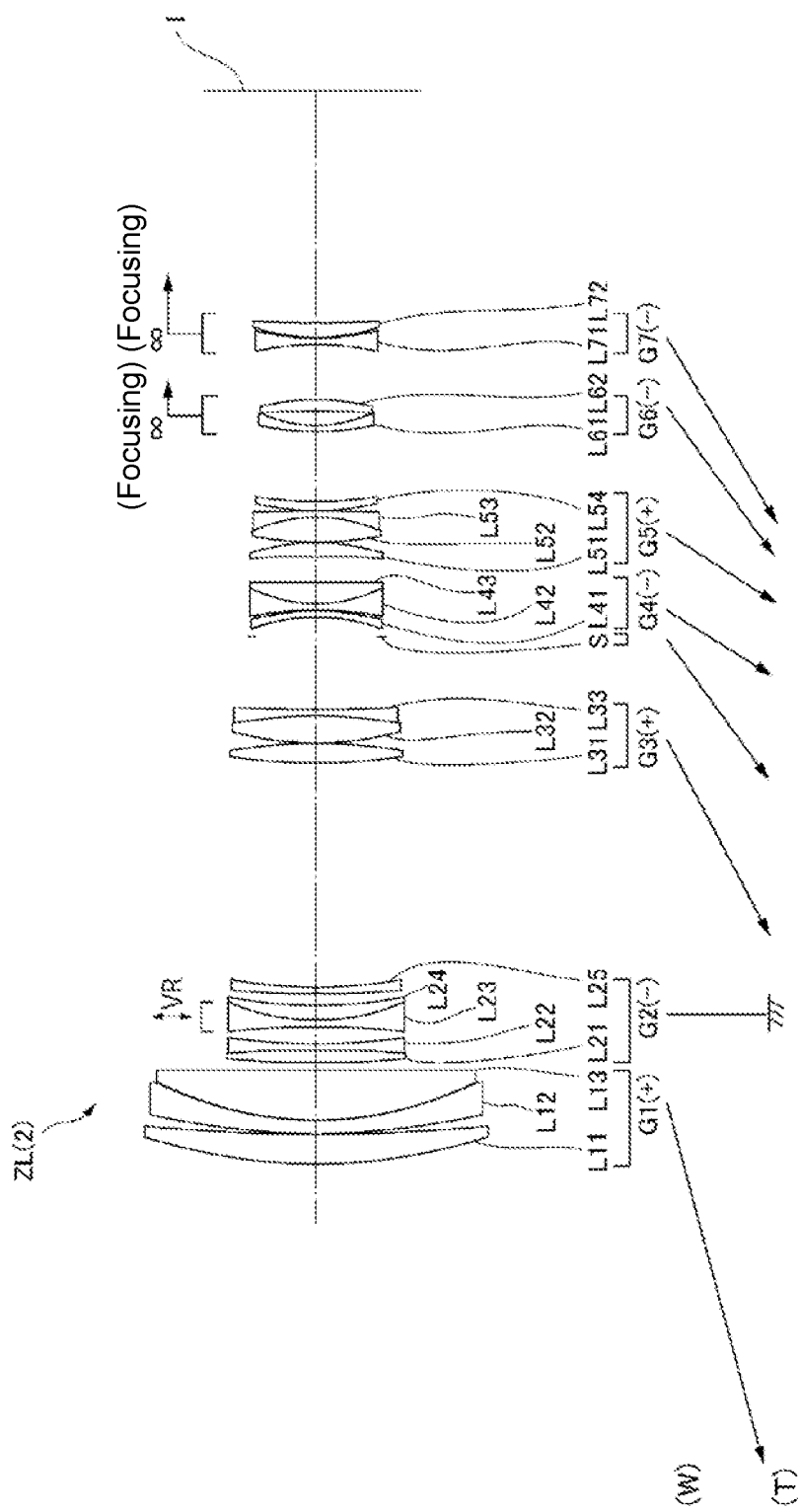
FIG. 4 is a diagram showing a lens configuration of a zoom optical system according to Example 2.

Example 2 is described with reference to FIG. 4, FIG. 5, FIG. 6, and Table 2. FIG. 4 is a diagram showing a lens configuration of a zoom optical system according to Example 2. A zoom optical system ZL (2) according to Example 2 is configured with: a first lens group G1 having positive refractive power; a second lens group G2 having negative refractive power; a third lens group G3 having positive refractive power; an aperture stop S; a fourth lens group G4 having negative refractive power; a fifth lens group G5 having positive refractive power; a sixth lens group G6 having negative refractive power; and a seventh lens group G7 having negative refractive power, arranged in order from an object. The image surface I is positioned behind the seventh lens group G7.

The first lens group G1, the third lens group G3, the aperture stop S, and the fourth to seventh lens groups G4 to G7 move along a trajectory shown by an arrow in the lower part of FIG. 4 when the zoom optical system zooms from the wide angle end state (W) to the telephoto end state (T). As an interval between adjacent lens groups changes, a focal length of the whole optical system changes, whereby a photographing magnification is changed (zooming is realized). Upon focusing, the sixth lens group G6 and the seventh lens group G7 move on respectively different trajectories (independently from each other). In addition, as shown by an arrow in an upper part of FIG. 4, both the sixth lens group G6 and the seventh lens group G7 move in an image surface direction upon focusing from the infinity object focusing state to the short-distance object focusing state.

The first lens group G1 is configured with: a positive meniscus lens L11 having a convex surface facing an object; a negative meniscus lens L12 having a convex surface facing an object; and a positive meniscus lens L13 having a convex surface facing an object, arranged in order from an object. The positive meniscus lens L13 is a specific lens consisting of a glass material having high anomalous dispersion characteristics.

The second lens group G2 is configured with: a cemented negative lens with a biconvex positive lens L21 and a biconcave negative lens L22; a cemented negative lens with a biconcave negative lens L23 and a positive meniscus lens L24 having a convex surface facing an object; and a negative meniscus lens L25 having a convex surface facing an object, arranged in order from an object. The negative lens L23 is a vibration proof lens, and moves to have a component in a direction perpendicular to the optical axis, or rotationally moves (swings) in an in-plane direction including the optical axis, to thereby correct an image blur caused by camera shake.

The third lens group G3 is configured with: a biconvex positive lens L31; and a cemented positive lens with a biconvex positive lens L32 and a biconcave negative lens L33, arranged in order from an object. The positive lens L31 is a specific lens consisting of a glass material having high anomalous dispersion characteristics. The aperture stop S is arranged on an image side of the third lens group G3 in an independently movable state.

The fourth lens group G4 is configured with: a negative meniscus lens L41 having a concave surface facing an object; and a cemented negative lens with a biconcave negative lens L42 and a positive meniscus lens L43 having a convex surface facing an object, arranged in order from an object.

The fifth lens group G5 is configured with: a positive meniscus lens L51 having a concave surface facing an object; a cemented positive lens with a biconvex positive lens L52 and a negative meniscus lens L53 having a concave surface facing an object; and a positive meniscus lens L54 having a convex surface facing an object, arranged in order from an object.

The sixth lens group G6 is configured with: a negative meniscus lens L61 having a convex surface facing an object; and a positive meniscus lens L62 having a concave surface facing an object, arranged in order from an object.

The seventh lens group G7 is configured with: a biconcave negative lens L71; and a positive meniscus lens L72 having a convex surface facing an object, arranged in order from an object.

In Table 2 below, data values of the zoom optical system according to Example 2 are shown.

TABLE 2

[General Data]
Zooming ratio = 3.768
MWF1 = 2.1055
MWF2 = 5.5112

| | W | M | T |
|---|---|---|---|
| f | 103.00 | 199.97 | 388.02 |
| F.NO | 4.62 | 4.93 | 5.83 |
| ω | 11.82 | 6.02 | 3.10 |
| Ymax | 21.63 | 21.63 | 21.63 |
| TL | 222.733 | 276.728 | 303.038 |
| BF | 47.90 | 63.78 | 86.81 |

TABLE 2-continued

[General Data]
Zooming ratio = 3.768
MWF1 = 2.1055
MWF2 = 5.5112

[Lens Data]

| Surface Number | R | D | nd | vd | θgF |
|---|---|---|---|---|---|
| Object Surface | ∞ | | | | |
| 1 | 117.0819 | 6.148 | 1.59349 | 67.00 | |
| 2 | 365.5294 | 0.100 | | | |
| 3 | 150.4892 | 2.700 | 1.65412 | 39.68 | |
| 4 | 74.8985 | 0.184 | | | |
| 5 | 75.5510 | 10.418 | 1.43385 | 95.23 | 0.539 |
| 6 | 62240.1620 | (D6) | | | |
| 7 | 203.4913 | 2.481 | 1.75575 | 24.71 | |
| 8 | −283.1835 | 1.400 | 1.80100 | 34.92 | |
| 9 | 143.1063 | 3.532 | | | |
| 10 | −181.9974 | 1.400 | 1.74100 | 52.76 | |
| 11 | 45.8632 | 3.064 | 1.95000 | 29.37 | |
| 12 | 92.4439 | 2.411 | | | |
| 13 | 176.3940 | 1.400 | 1.75500 | 52.33 | |
| 14 | 113.7780 | (D14) | | | |
| 15 | 115.0409 | 4.065 | 1.49782 | 82.57 | 0.538 |
| 16 | −112.5159 | 0.100 | | | |
| 17 | 68.2845 | 5.556 | 1.51680 | 64.13 | |
| 18 | −108.3363 | 1.400 | 1.90265 | 35.77 | |
| 19 | 421.1558 | (D19) | | | |
| 20 (S) | 0.0000 | (D20) | | | |
| 21 | −41.5981 | 1.400 | 1.94594 | 17.98 | |
| 22 | −50.5660 | 0.100 | | | |
| 23 | −76.3622 | 1.300 | 1.58144 | 40.75 | |
| 24 | 30.1854 | 4.410 | 1.74077 | 27.74 | |
| 25 | 1070.2033 | (D25) | | | |
| 26 | −224.0073 | 2.866 | 1.95000 | 29.37 | |
| 27 | −48.5843 | 0.100 | | | |
| 28 | 74.2943 | 5.215 | 1.48749 | 70.32 | |
| 29 | −32.1540 | 1.300 | 1.84666 | 23.88 | |
| 30 | −425.6638 | 0.100 | | | |
| 31 | 57.3899 | 1.986 | 1.80100 | 34.92 | |
| 32 | 101.9980 | (D32) | | | |
| 33 | 57.3583 | 1.300 | 1.90265 | 35.77 | |
| 34 | 27.5241 | 3.049 | | | |
| 35 | −196.2416 | 2.311 | 1.71736 | 29.52 | |
| 36 | −51.3377 | (D36) | | | |
| 37 | −57.0496 | 1.300 | 1.74100 | 52.76 | |
| 38 | 50.2631 | 0.100 | | | |
| 39 | 40.9983 | 3.145 | 1.74077 | 27.74 | |
| 40 | 303.4325 | (D40) | | | |
| Image Surface | ∞ | | | | |

[Lens Group Data]

| Group | First surface | Focal length |
|---|---|---|
| 1 | 1 | 206.704 |
| 2 | 7 | −69.893 |
| 3 | 15 | 91.760 |
| 4 | 21 | −147.646 |
| 5 | 26 | 51.744 |
| 6 | 33 | −178.981 |
| 7 | 37 | −82.684 |

[Variable Distance Data]

| | Infinity | | | shortest-distance | | |
|---|---|---|---|---|---|---|
| | W | M | T | W | M | T |
| F/β | 102.990 | 199.95 | 388.019 | −0.122 | −0.213 | −0.355 |
| D0 | 0.000 | 0.000 | 0.000 | 757.259 | 703.147 | 677.000 |
| D1 | 1.500 | 55.612 | 81.759 | 1.500 | 55.612 | 81.759 |
| D6 | 46.593 | 31.949 | 1.500 | 46.593 | 31.949 | 1.500 |
| D14 | 15.159 | 26.204 | 30.746 | 15.159 | 26.204 | 30.746 |
| D19 | 4.000 | 4.086 | 20.914 | 4.000 | 4.086 | 20.914 |
| D20 | 5.383 | 1.988 | 1.988 | 5.383 | 1.988 | 1.988 |
| D25 | 14.372 | 8.720 | 1.500 | 16.623 | 16.278 | 23.996 |
| D32 | 11.484 | 8.052 | 1.477 | 14.923 | 13.441 | 10.427 |
| D36 | 7.645 | 23.648 | 46.498 | 1.926 | 10.642 | 15.117 |
| D40 | 40.255 | 40.128 | 40.315 | 40.431 | 40.465 | 40.087 |

Figure 5A:
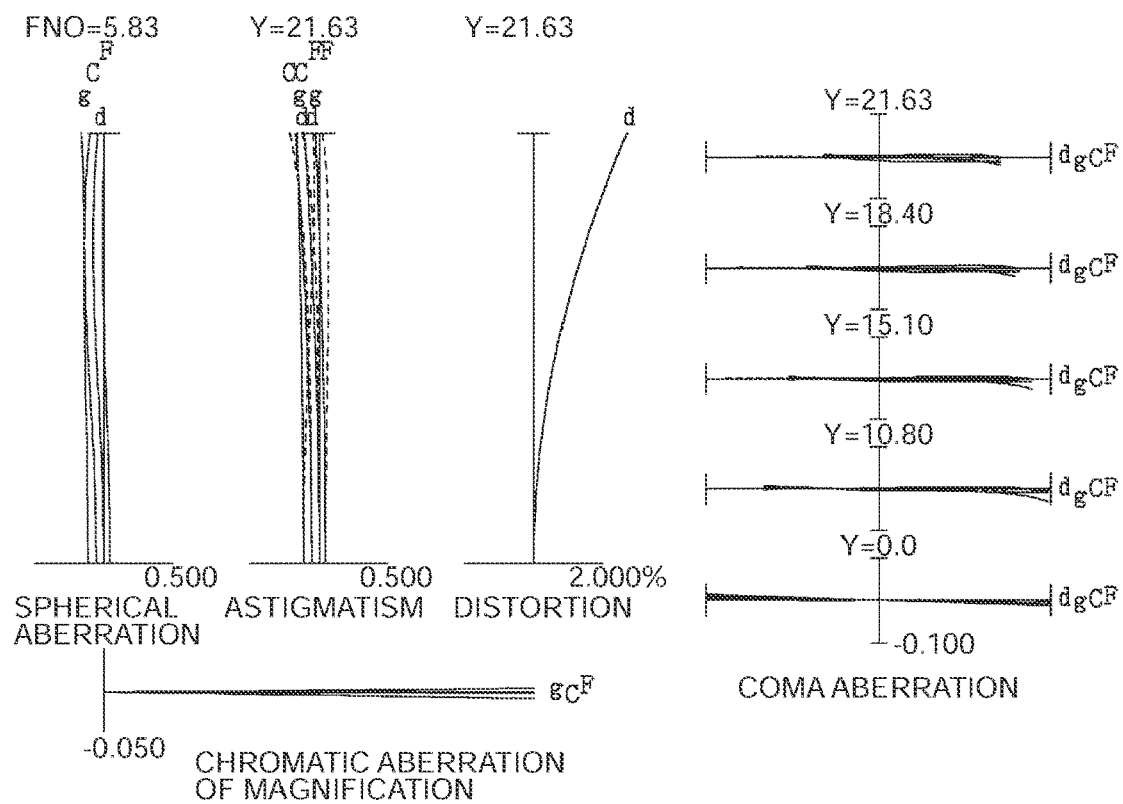
FIGS. 5A and 5B are graphs showing various aberrations of the optical system according to Example 2 in a telephoto end state, FIG. 5A showing various aberrations upon focusing on an object at infinity, and FIG. 5B showing various aberrations upon focusing on a shortest-distance object.
Figure 5B:
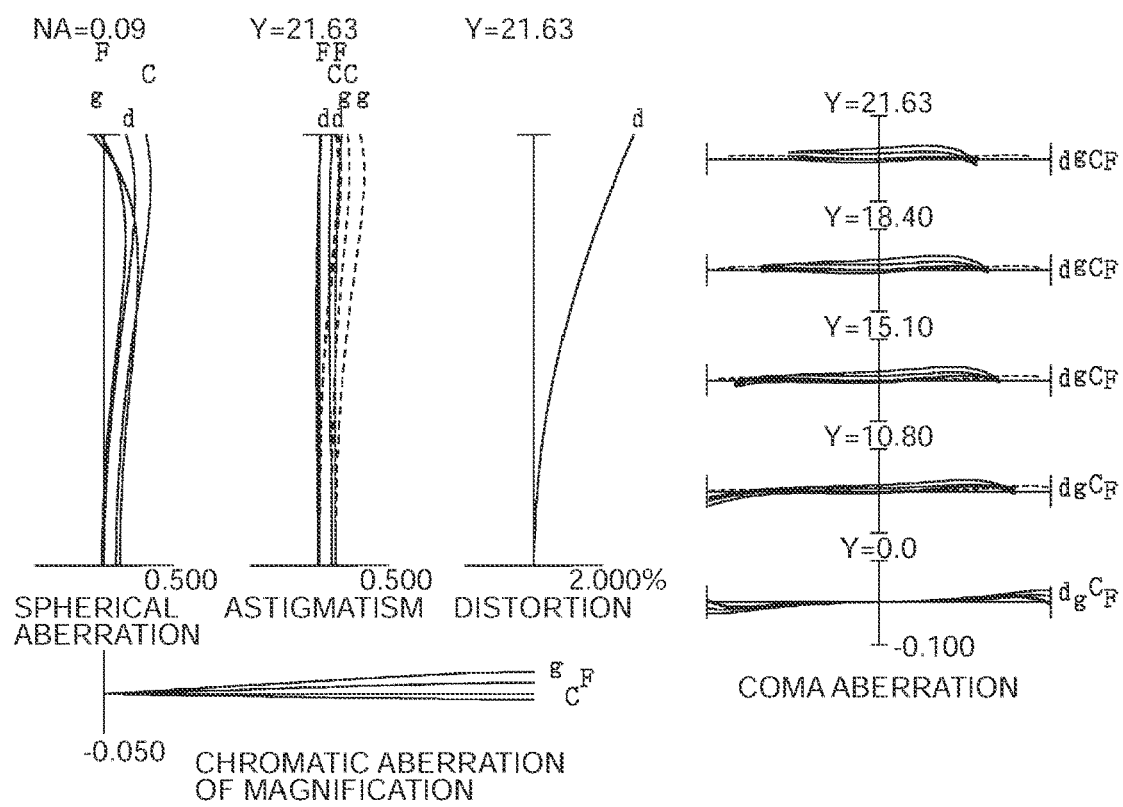
Figure 6A:
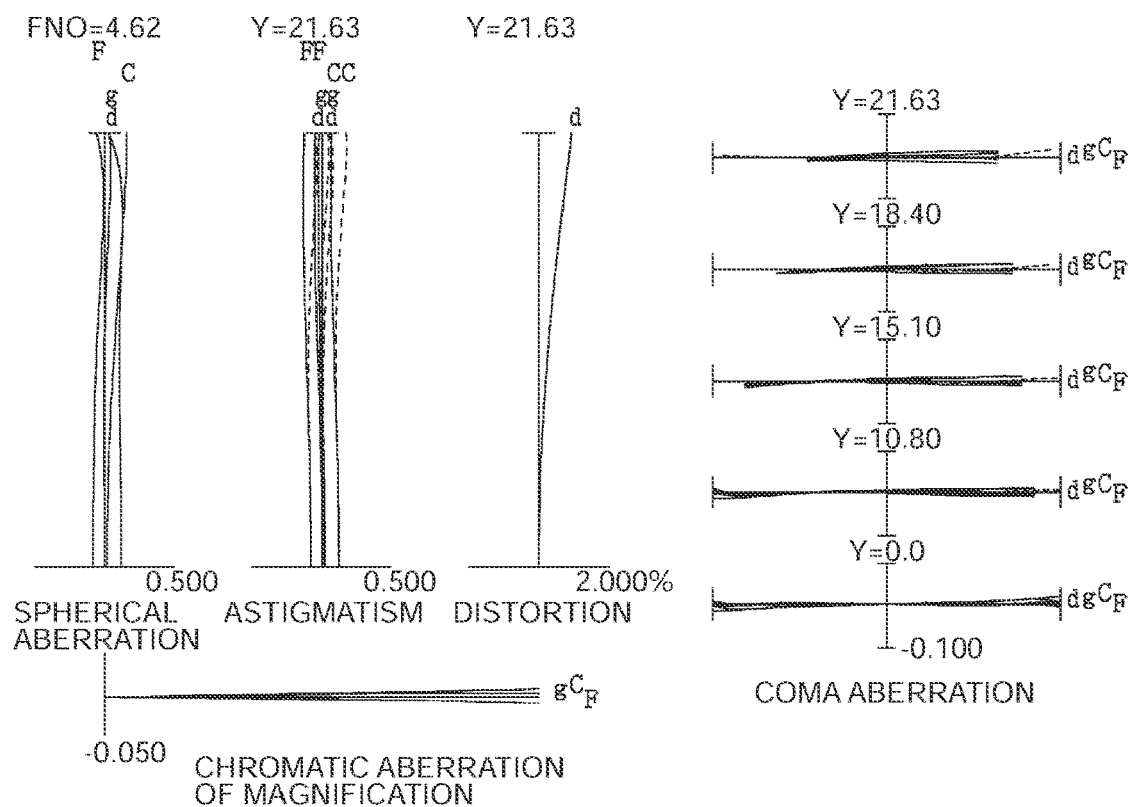
FIGS. 6A and 6B are graphs showing various aberrations of the optical system according to Example 2 in a wide angle end state, FIG. 6A showing various aberrations upon focusing on an object at infinity, and FIG. 6B showing various aberrations upon focusing on a shortest-distance object.
Figure 6B:
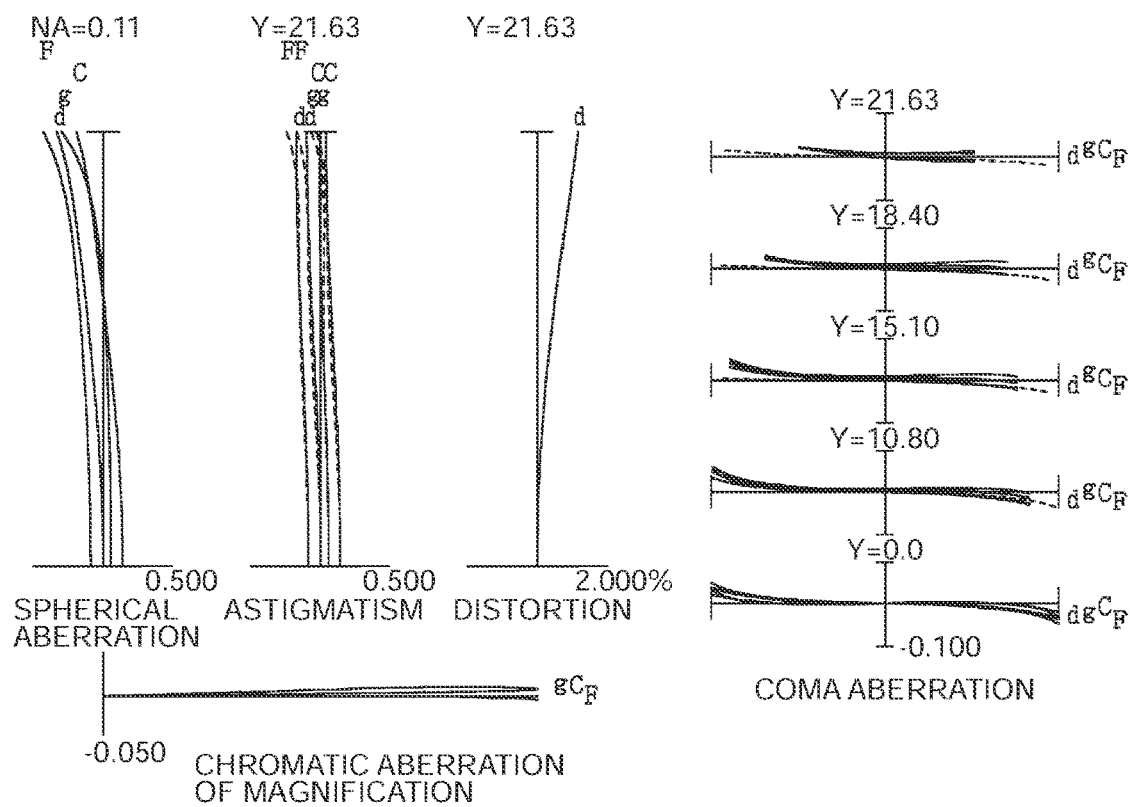

FIGS. 5A and 5B show values of various aberrations of the optical system according to Example 2 in the telephoto end state, upon focusing on an object at infinity (FIG. 5A) and upon focusing on a shortest-distance object (FIG. 5B). In addition, FIGS. 6A and 6B show values of various aberrations of the optical system according to Example 2 in the wide angle end state, upon focusing on an object at infinity (FIG. 6A) and upon focusing on a shortest-distance object (FIG. 6B). It is observed from the graphs showing various aberrations that the optical system according to Example 2 favorably corrects various aberrations and has superior imaging performance, and furthermore, has superior imaging performance also upon focusing on a short-distance object.

Example 3

Example 3 is described with reference to FIG. 7, FIG. 8, FIG. 9, and Table 3. FIG. 7 is a diagram showing a lens configuration of a zoom optical system according to Example 3. A zoom optical system ZL (3) according to Example 3 is configured with: a first lens group G1 having positive refractive power; a second lens group G2 having negative refractive power; a third lens group G3 having positive refractive power; an aperture stop S; a fourth lens group G4 having negative refractive power; a fifth lens group G5 having positive refractive power; a sixth lens group G6 having negative refractive power; and a seventh lens group G7 having negative refractive power, arranged in order from an object. The image surface I is positioned behind the seventh lens group G7.

The first lens group G1, the third lens group G3, the aperture stop S, and the fourth to seventh lens groups G4 to G7 move along a trajectory shown by an arrow in the lower part of FIG. 7 when the zoom optical system zooms from the wide angle end state (W) to the telephoto end state (T). As an interval between adjacent lens groups changes, a focal length of the whole optical system changes, whereby a photographing magnification is changed (zooming is realized). Upon focusing, the sixth lens group G6 and the seventh lens group G7 move on respectively different trajectories (independently from each other). In addition, as shown by an arrow in an upper part of FIG. 7, both the sixth lens group G6 and the seventh lens group G7 move in an image surface direction upon focusing from the infinity object focusing state to the short-distance object focusing state.

The first lens group G1 is configured with: a positive meniscus lens L11 having a convex surface facing an object; a negative meniscus lens L12 having a convex surface facing an object; and a positive meniscus lens L13 having a convex surface facing an object, arranged in order from an object. The positive meniscus lens L13 is a specific lens consisting of a glass material having high anomalous dispersion characteristics.

The second lens group G2 is configured with: a cemented negative lens with a biconvex positive lens L21 and a biconcave negative lens L22; a cemented negative lens with a biconcave negative lens L23 and a positive meniscus lens L24 having a convex surface facing an object; and a negative meniscus lens L25 having a convex surface facing an object, arranged in order from an object. The negative lens L23 is a vibration proof lens, and moves to have a component in a direction perpendicular to the optical axis, or rotationally moves (swings) in an in-plane direction including the optical axis, to thereby correct an image blur caused by camera shake.

The third lens group G3 is configured with: a biconvex positive lens L31; and a cemented positive lens with a biconvex positive lens L32 and a biconcave negative lens L33, arranged in order from an object. The positive lens L31 is a specific lens consisting of a glass material having high anomalous dispersion characteristics. The aperture stop S is arranged on an image side of the third lens group G3 in an independently movable state.

The fourth lens group G4 is configured with: a negative meniscus lens L41 having a concave surface facing an object; and a cemented negative lens with a biconcave negative lens L42 and a positive meniscus lens L43 having a convex surface facing an object, arranged in order from an object.

The fifth lens group G5 is configured with: a positive meniscus lens L51 having a concave surface facing an object; a cemented positive lens with a biconvex positive lens L52 and a negative meniscus lens L53 having a concave surface facing an object; and a positive meniscus lens L54 having a convex surface facing an object, arranged in order from an object.

The sixth lens group G6 is configured with: a negative meniscus lens L61 having a convex surface facing an object; and a positive meniscus lens L62 having a concave surface facing an object, arranged in order from an object.

The seventh lens group G7 is configured with: a biconcave negative lens L71; and a positive meniscus lens L72 having a convex surface facing an object, arranged in order from an object.

In Table 3 below, data values of the zoom optical system according to Example 3 are shown.

TABLE 3

[General Data]
Zooming ratio = 3.767
MWF1 = 2.6815
MWF2 = 6.8186

|   | W | M | T |
|---|---|---|---|
| f | 103.00 | 200.00 | 388.04 |
| F.NO | 4.62 | 4.93 | 5.83 |
| ω | 11.82 | 6.02 | 3.10 |
| Ymax | 21.63 | 21.63 | 21.63 |
| TL | 220.000 | 272.881 | 300.017 |
| BF | 39.91 | 60.88 | 82.57 |

[Lens Data]

| Surface Number | R | D | nd | νd | θgF |
|---|---|---|---|---|---|
| Object Surface | ∞ | | | | |
| 1 | 114.7306 | 6.020 | 1.59349 | 67.00 | |
| 2 | 328.7987 | 8.000 | | | |
| 3 | 134.2907 | 2.700 | 1.65412 | 39.68 | |
| 4 | 68.5106 | 0.400 | | | |

TABLE 3-continued

[General Data]
Zooming ratio = 3.767
MWF1 = 2.6815
MWF2 = 6.8186

| 5 | 68.4850 | 10.473 | 1.43385 | 95.23 | 0.539 |
|---|---|---|---|---|---|
| 6 | 2324.1739 | (D6) | | | |
| 7 | 323.8481 | 2.841 | 1.75575 | 24.71 | |
| 8 | −129.6662 | 1.400 | 1.80100 | 34.92 | |
| 9 | 155.4044 | 3.304 | | | |
| 10 | −195.8610 | 1.400 | 1.74100 | 52.76 | |
| 11 | 45.3342 | 2.982 | 1.95000 | 29.37 | |
| 12 | 89.5106 | 1.864 | | | |
| 13 | 103.6818 | 1.400 | 1.75500 | 52.33 | |
| 14 | 84.0486 | (D14) | | | |
| 15 | 108.2974 | 4.023 | 1.49782 | 82.57 | 0.538 |
| 16 | −112.3609 | 0.100 | | | |
| 17 | 71.6226 | 5.604 | 1.51680 | 64.13 | |
| 18 | −96.4853 | 1.400 | 1.90265 | 35.77 | |
| 19 | 866.0985 | (D19) | | | |
| 20 (S) | 0.0000 | (D20) | | | |
| 21 | −48.6340 | 1.400 | 1.94594 | 17.98 | |
| 22 | −61.5868 | 0.100 | | | |
| 23 | −86.2958 | 1.300 | 1.58144 | 40.75 | |
| 24 | 30.0588 | 3.766 | 1.74077 | 27.74 | |
| 25 | 233.8020 | (D25) | | | |
| 26 | −1417.5127 | 2.930 | 1.95000 | 29.37 | |
| 27 | −52.0872 | 0.100 | | | |
| 28 | 75.8091 | 4.852 | 1.48749 | 70.32 | |
| 29 | −33.5749 | 1.300 | 1.84666 | 23.88 | |
| 30 | −568.4074 | 0.100 | | | |
| 31 | 52.7691 | 1.961 | 1.80100 | 34.92 | |
| 32 | 87.4282 | (D32) | | | |
| 33 | 64.2901 | 1.300 | 1.90265 | 35.77 | |
| 34 | 27.5581 | 3.197 | | | |
| 35 | −131.8480 | 2.204 | 1.71736 | 29.52 | |
| 36 | −49.6017 | (D36) | | | |
| 37 | −58.2336 | 1.300 | 1.74100 | 52.76 | |
| 38 | 50.5745 | 0.100 | | | |
| 39 | 41.9718 | 3.372 | 1.74077 | 27.74 | |
| 40 | 3274.1766 | (D40) | | | |
| Image Surface | ∞ | | | | |

[Lens Group Data]

| Group | First surface | Focal length |
|---|---|---|
| 1 | 1 | 205.777 |
| 2 | 7 | −67.326 |
| 3 | 15 | 87.509 |
| 4 | 21 | −116.754 |
| 5 | 26 | 46.987 |
| 6 | 33 | −117.830 |
| 7 | 37 | −101.181 |

[Variable Distance Data]

| | Infinity | | | shortest-distance | | |
|---|---|---|---|---|---|---|
| | W | M | T | W | M | T |
| F/β | 103.000 | 200.000 | 388.036 | −0.120 | −0.211 | −0.350 |
| D0 | 0.000 | 0.000 | 0.000 | 760.000 | 707.028 | 680.000 |
| D6 | 1.500 | 54.472 | 81.500 | 1.500 | 54.472 | 81.500 |
| D14 | 40.113 | 28.747 | 1.500 | 40.113 | 28.747 | 1.500 |
| D19 | 15.131 | 19.545 | 28.671 | 15.131 | 19.545 | 28.671 |
| D20 | 4.000 | 4.000 | 17.800 | 4.000 | 4.000 | 17.800 |
| D25 | 7.071 | 3.711 | 1.890 | 7.071 | 3.711 | 1.890 |
| D32 | 16.596 | 10.398 | 1.500 | 19.366 | 17.617 | 23.607 |
| D36 | 12.489 | 7.935 | 1.392 | 16.626 | 15.227 | 14.700 |
| D40 | 6.907 | 27.991 | 49.555 | 0.000 | 13.461 | 14.139 |

Figure 8A:
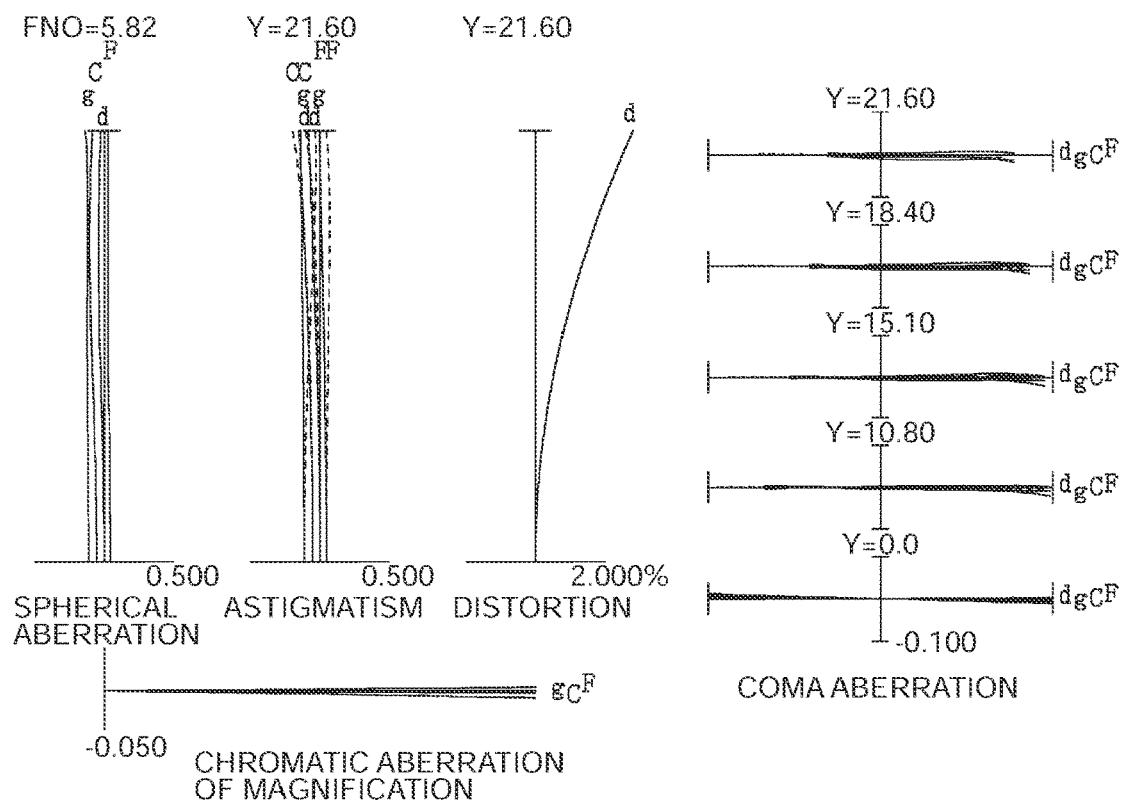
FIGS. 8A and 8B are graphs showing various aberrations of the optical system according to Example 3 in a telephoto end state, FIG. 8A showing various aberrations upon focusing on an object at infinity, and FIG. 8B showing various aberrations upon focusing on a shortest-distance object.
Figure 8B:
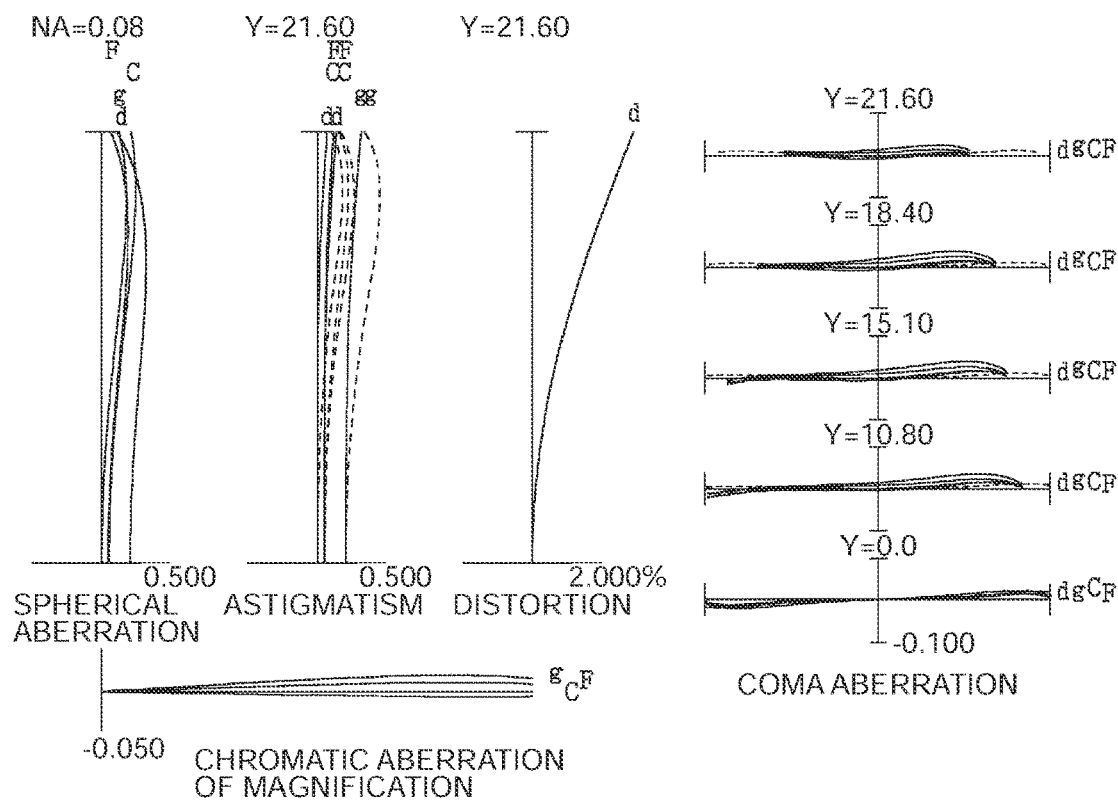
Figure 9A:
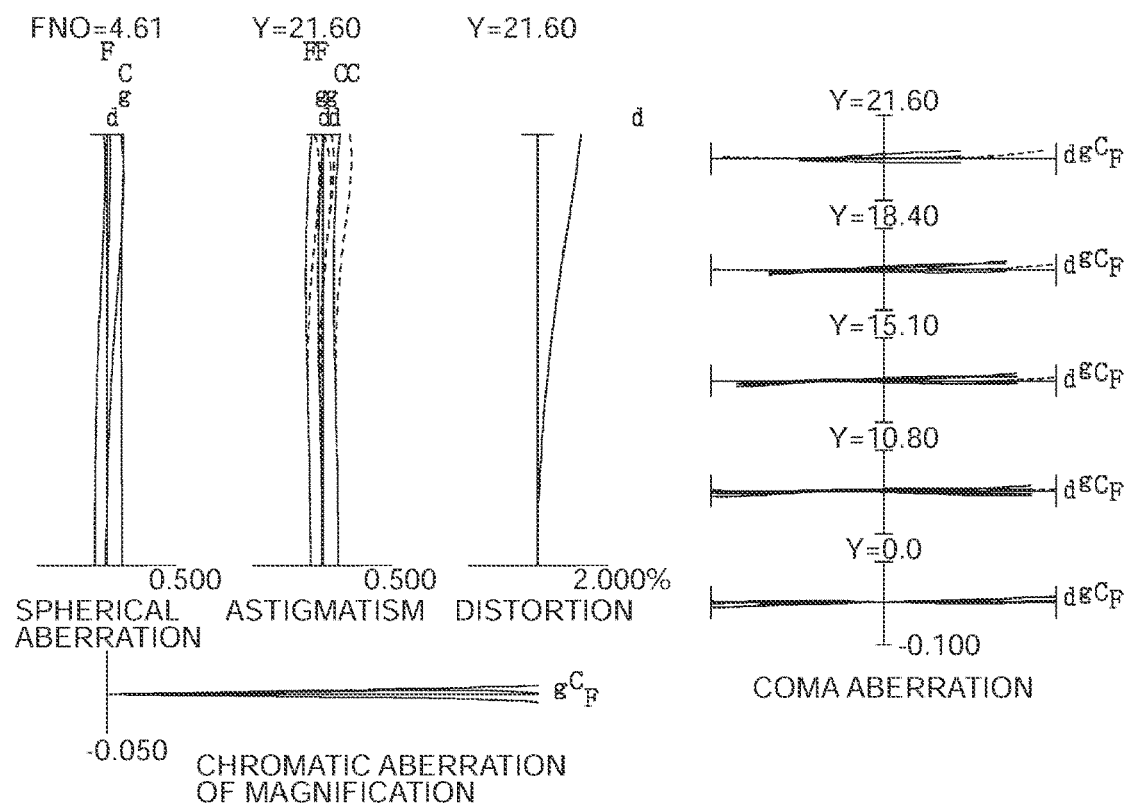
FIGS. 9A and 9B are graphs showing various aberrations of the optical system according to Example 3 in a wide angle end state, FIG. 9A showing various aberrations upon focusing on an object at infinity, and FIG. 9B showing various aberrations upon focusing on a shortest-distance object.
Figure 9B:
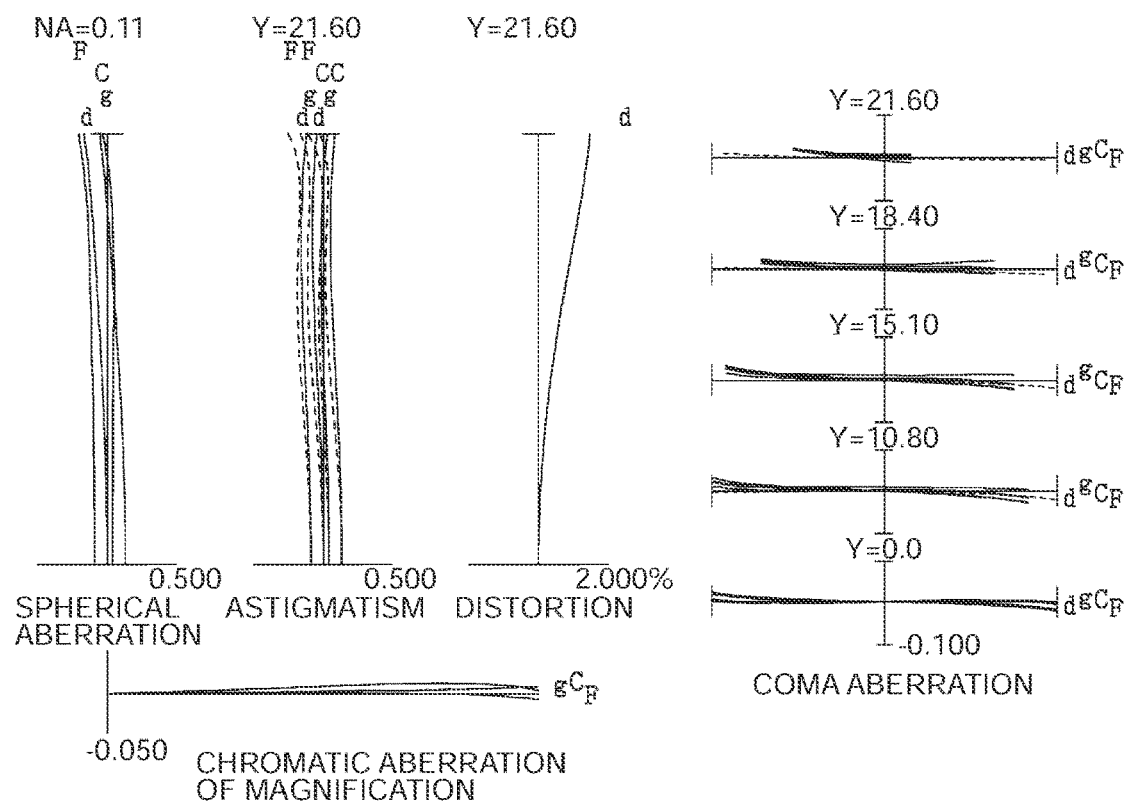

FIGS. 8A and 8B show values of various aberrations of the optical system according to Example 3 in the telephoto end state, upon focusing on an object at infinity (FIG. 8A) and upon focusing on a shortest-distance object (FIG. 8B). In addition, FIGS. 9A and 9B show values of various aberrations of the optical system according to Example 3 in the wide angle end state, upon focusing on an object at infinity (FIG. 9A) and upon focusing on a shortest-distance object (FIG. 9B). It is observed from the graphs showing various aberrations that the optical system according to Example 3 favorably corrects various aberrations and has superior imaging performance, and furthermore, has superior imaging performance also upon focusing on a short-distance object.

Example 4

Figure 10:
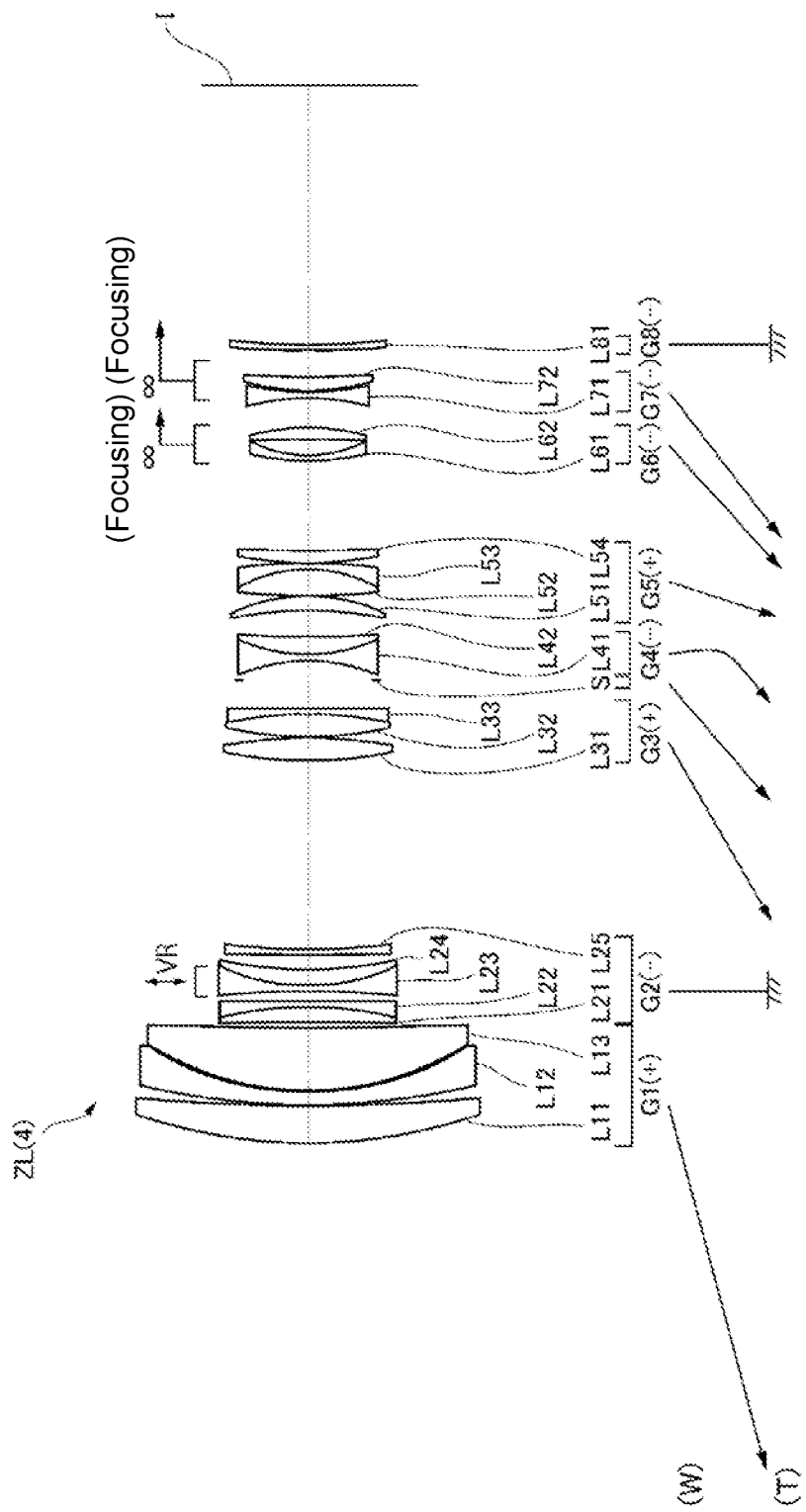
FIG. 10 is a diagram showing a lens configuration of a zoom optical system according to Example 4.

Example 4 is described with reference to FIG. 10, FIG. 11, FIG. 12, and Table 4. FIG. 10 is a diagram showing a lens configuration of a zoom optical system according to Example 4. A zoom optical system ZL (4) according to Example 4 is configured with: a first lens group G1 having positive refractive power; a second lens group G2 having negative refractive power; a third lens group G3 having positive refractive power; an aperture stop S; a fourth lens group G4 having negative refractive power; a fifth lens group G5 having positive refractive power; a sixth lens group G6 having negative refractive power; a seventh lens group G7 having negative refractive power; and a eighth lens group G8 having negative refractive power, arranged in order from an object. The image surface I is positioned behind the eighth lens group G8.

The first lens group G1, the third lens group G3, the aperture stop S, and the fourth to seventh lens groups G4 to G7 move along a trajectory shown by an arrow in the lower part of FIG. 10 when the zoom optical system zooms from the wide angle end state (W) to the telephoto end state (T). As an interval between adjacent lens groups changes, a focal length of the whole optical system changes, whereby a photographing magnification is changed (zooming is realized). Upon focusing, the sixth lens group G6 and the seventh lens group G7 move on respectively different trajectories (independently from each other). As shown by an arrow in an upper part of FIG. 10, both the sixth lens group G6 and the seventh lens group G7 move in an image surface direction upon focusing from the infinity object focusing state to the short-distance object focusing state.

The first lens group G1 is configured with: a positive meniscus lens L11 having a convex surface facing an object; a negative meniscus lens L12 having a convex surface facing an object; and a positive meniscus lens L13 having a convex surface facing an object, arranged in order from an object. The positive meniscus lens L13 is a specific lens consisting of a glass material having high anomalous dispersion characteristics.

The second lens group G2 is configured with: a cemented negative lens with a positive meniscus lens L21 having a concave surface facing an object and a negative meniscus lens L22 having a concave surface facing an object; a cemented negative lens with a biconcave negative lens L23 and a positive meniscus lens L24 having a convex surface facing an object; and a negative meniscus lens L25 having a convex surface facing an object, arranged in order from an object. The negative lens L23 is a vibration proof lens, and moves to have a component in a direction perpendicular to the optical axis, or rotationally moves (swings) in an in-plane direction including the optical axis, to thereby correct an image blur caused by camera shake.

The third lens group G3 is configured with: a biconvex positive lens L31; and a cemented positive lens with a biconvex positive lens L32 and a biconcave negative lens L33, arranged in order from an object. The positive lens L31 is a specific lens consisting of a glass material having high anomalous dispersion characteristics. The aperture stop S is arranged on an image side of the third lens group G3 in an independently movable state.

The fourth lens group G4 is configured with a cemented negative lens with a biconcave negative lens L41 and a positive meniscus lens L42 having a convex surface facing an object.

The fifth lens group G5 is configured with: a positive meniscus lens L51 having a concave surface facing an object; a cemented positive lens with a biconvex positive lens L52 and a negative meniscus lens L53 having a concave surface facing an object; and a biconvex positive lens L54, arranged in order from an object.

The sixth lens group G6 is configured with: a negative meniscus lens L61 having a convex surface facing an object; and a positive meniscus lens L62 having a concave surface facing an object, arranged in order from an object.

The seventh lens group G7 is configured with: a biconcave negative lens L71; and a positive meniscus lens L72 having a convex surface facing an object, arranged in order from an object.

The eighth lens group G8 is configured with a negative meniscus lens L81 having a convex surface facing an object.

In Table 4 below, data values of the zoom optical system according to Example 4 are shown.

TABLE 4

[General Data]
Zooming ratio = 3.695
MWF1 = 88.7810
MWF2 = 387.9989

| | W | M | T |
|---|---|---|---|
| f | 105.00 | 200.00 | 388.00 |
| F.NO | 4.60 | 4.77 | 5.78 |
| ω | 11.63 | 6.04 | 3.11 |
| Ymax | 21.63 | 21.63 | 21.63 |
| TL | 219.756 | 281.111 | 304.049 |
| BF | 54.01 | 53.99 | 54.05 |

[Lens Data]

| Surface Number | R | D | nd | vd | θgF |
|---|---|---|---|---|---|
| Object Surface | ∞ | | | | |
| 1 | 107.6827 | 7.892 | 1.61720 | 53.97 | |
| 2 | 394.9933 | 0.100 | | | |
| 3 | 159.0936 | 2.700 | 1.65412 | 39.68 | |
| 4 | 63.4813 | 0.400 | | | |
| 5 | 63.2835 | 13.010 | 1.43385 | 95.23 | 0.539 |
| 6 | 2117.9666 | (D6) | | | |
| 7 | −497.9468 | 3.142 | 1.75211 | 25.05 | |
| 8 | −77.2150 | 1.200 | 1.80100 | 34.92 | |
| 9 | −1507.8397 | 2.012 | | | |
| 10 | −227.5884 | 1.200 | 1.74100 | 52.76 | |
| 11 | 44.1738 | 3.305 | 1.95000 | 29.37 | |
| 12 | 88.1580 | 3.000 | | | |
| 13 | 856.2252 | 1.200 | 1.75500 | 52.33 | |
| 14 | 154.4691 | (D14) | | | |
| 15 | 90.7956 | 4.667 | 1.49782 | 82.57 | 0.538 |
| 16 | −91.3253 | 0.100 | | | |
| 17 | 82.4837 | 4.664 | 1.51680 | 64.13 | |
| 18 | −91.7339 | 1.273 | 1.90265 | 35.77 | |
| 19 | 3838.7049 | (D19) | | | |
| 20 (S) | 0.0000 | (D20) | | | |
| 21 | −38.3095 | 1.201 | 1.59270 | 35.31 | |
| 22 | 34.8427 | 3.809 | 1.78472 | 25.64 | |
| 23 | 248.9195 | (D23) | | | |
| 24 | −79.5459 | 2.986 | 1.95000 | 29.37 | |
| 25 | −37.2045 | 0.100 | | | |

TABLE 4-continued

[General Data]
Zooming ratio = 3.695
MWF1 = 88.7810
MWF2 = 387.9989

| | | | | |
|---|---|---|---|---|
| 26 | 132.6307 | 5.482 | 1.48749 | 70.32 |
| 27 | -29.3373 | 1.200 | 1.84666 | 23.88 |
| 28 | -127.7351 | 0.100 | | |
| 29 | 76.9312 | 2.621 | 1.80100 | 34.92 |
| 30 | -4278.2232 | (D30) | | |
| 31 | 53.5368 | 1.200 | 1.90265 | 35.77 |
| 32 | 27.4706 | 3.171 | | |
| 33 | -253.7258 | 2.603 | 1.71736 | 29.52 |
| 34 | -46.3667 | (D34) | | |
| 35 | -48.6736 | 1.200 | 1.72916 | 54.09 |
| 36 | 65.5991 | 0.100 | | |
| 37 | 41.6441 | 3.079 | 1.71736 | 29.52 |
| 38 | 294.9036 | (D38) | | |
| 39 | 236.2290 | 1.200 | 2.00272 | 19.32 |
| 40 | 166.7882 | (D40) | | |
| Image Surface | ∞ | | | |

[Lens Group Data]

| Group | First surface | Focal length |
|---|---|---|
| 1 | 1 | 211.841 |
| 2 | 7 | -65.706 |
| 3 | 15 | 77.725 |
| 4 | 21 | -76.034 |
| 5 | 24 | 44.543 |
| 6 | 31 | -481.690 |
| 7 | 35 | -88.781 |
| 8 | 39 | -570.790 |

[Variable Distance Data]

| | Infinity | | | shortest-distance | | |
|---|---|---|---|---|---|---|
| | W | M | T | W | M | T |
| F/β | 105.000 | 199.999 | 387.999 | -0.123 | -0.205 | -0.348 |
| D0 | 0.000 | 0.000 | 0.000 | 780.308 | 718.929 | 696.050 |
| D6 | 1.133 | 62.513 | 85.391 | 1.133 | 62.513 | 85.391 |
| D14 | 39.278 | 30.026 | 0.500 | 39.278 | 30.026 | 0.500 |
| D19 | 5.889 | 12.667 | 20.088 | 5.889 | 12.667 | 20.088 |
| D20 | 4.004 | 9.867 | 24.000 | 4.004 | 9.867 | 24.000 |
| D23 | 5.408 | 2.828 | 2.080 | 5.408 | 2.828 | 2.080 |
| D30 | 18.534 | 11.163 | 0.500 | 21.297 | 21.414 | 30.980 |
| D34 | 6.127 | 3.992 | 0.500 | 8.319 | 7.392 | 6.546 |
| D38 | 5.455 | 14.150 | 37.026 | 0.500 | 0.500 | 0.500 |
| D40 | 54.014 | 53.990 | 54.049 | 54.284 | 54.170 | 53.632 |

Figure 11A:
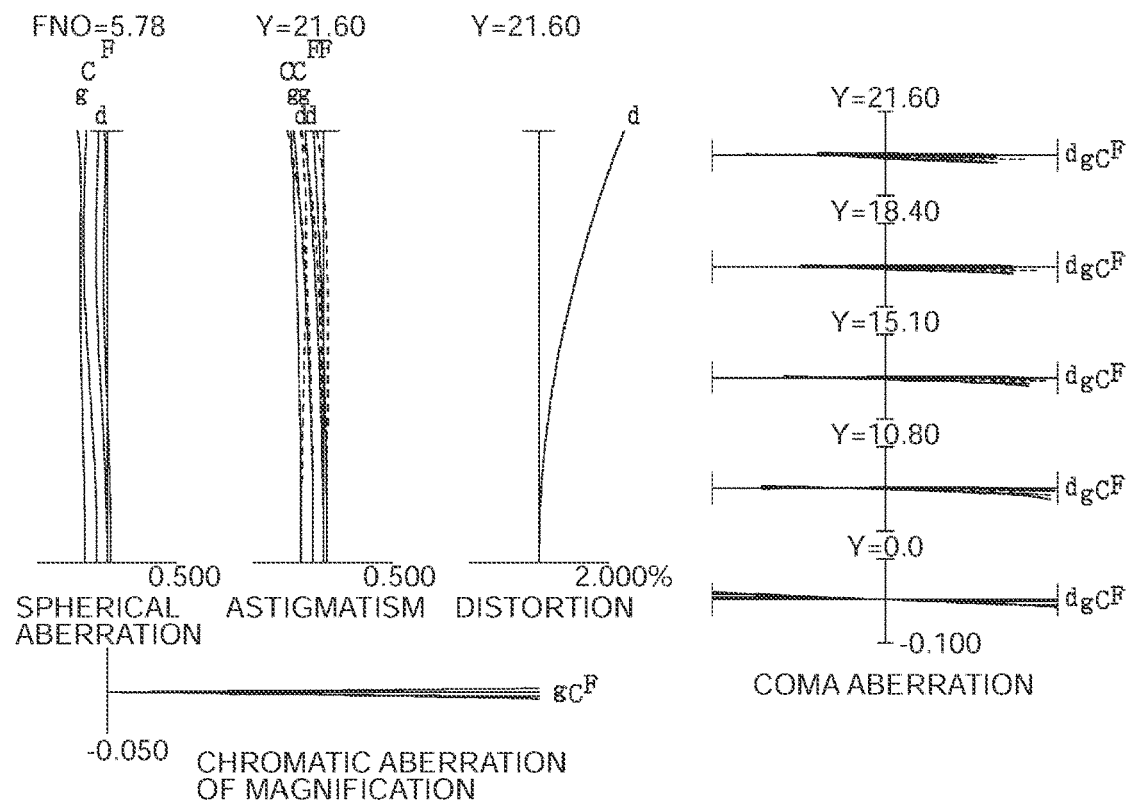
FIGS. 11A and 11B are graphs showing various aberrations of the optical system according to Example 4 in a telephoto end state, FIG. 11A showing various aberrations upon focusing on an object at infinity, and FIG. 11B showing various aberrations upon focusing on a shortest-distance object.
Figure 11B:
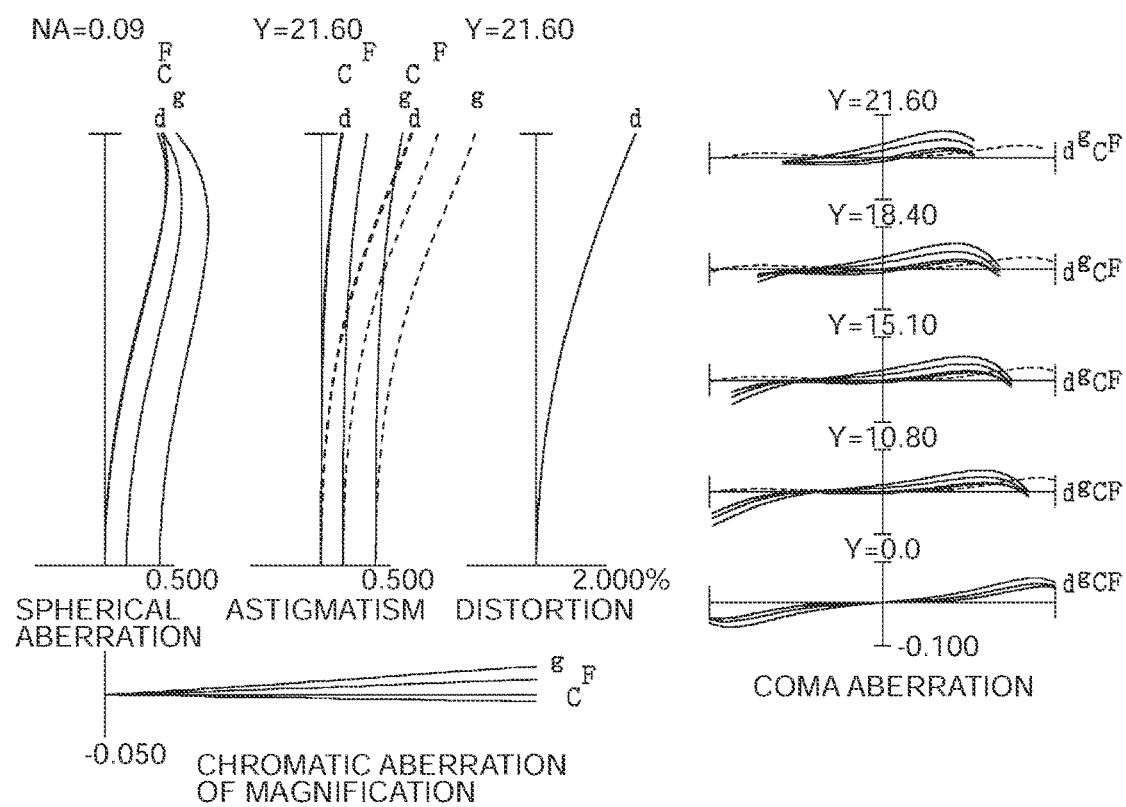
Figure 12A:
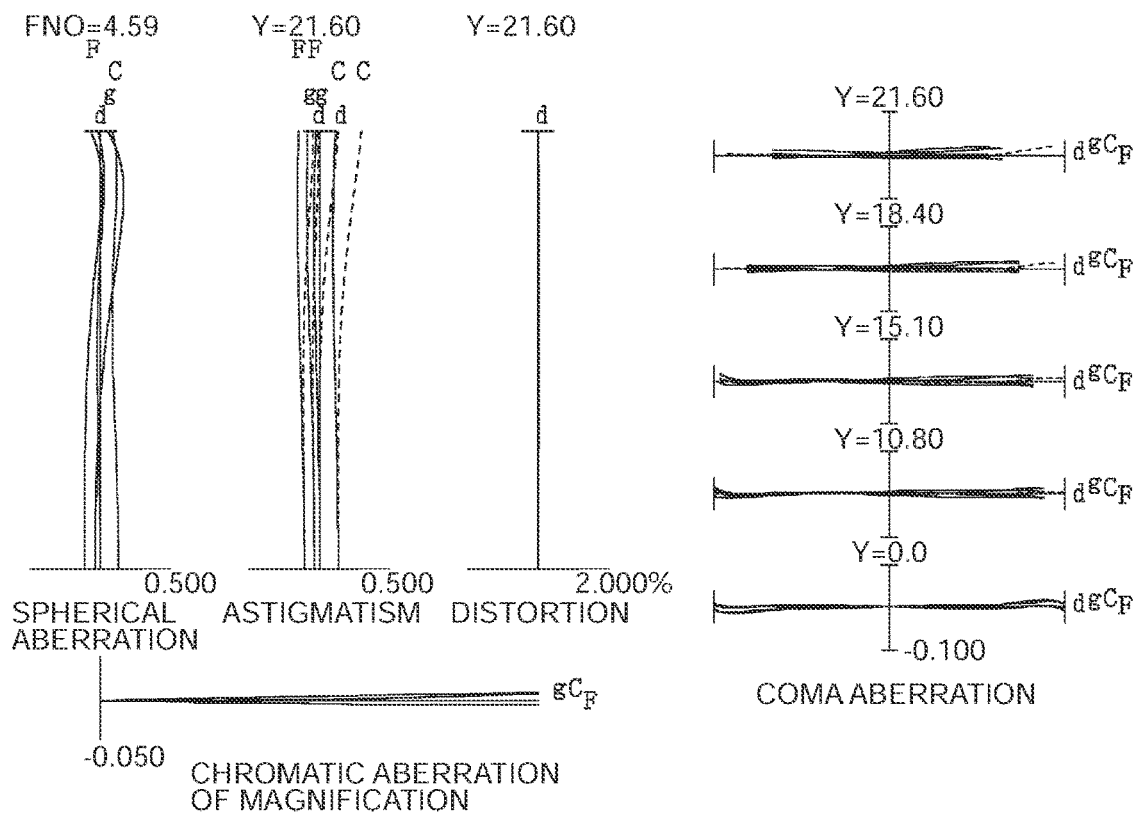
FIGS. 12A and 12B are graphs showing various aberrations of the optical system according to Example 4 in a wide angle end state, FIG. 12A showing various aberrations upon focusing on an object at infinity, and FIG. 12B showing various aberrations upon focusing on a shortest-distance object.
Figure 12B:
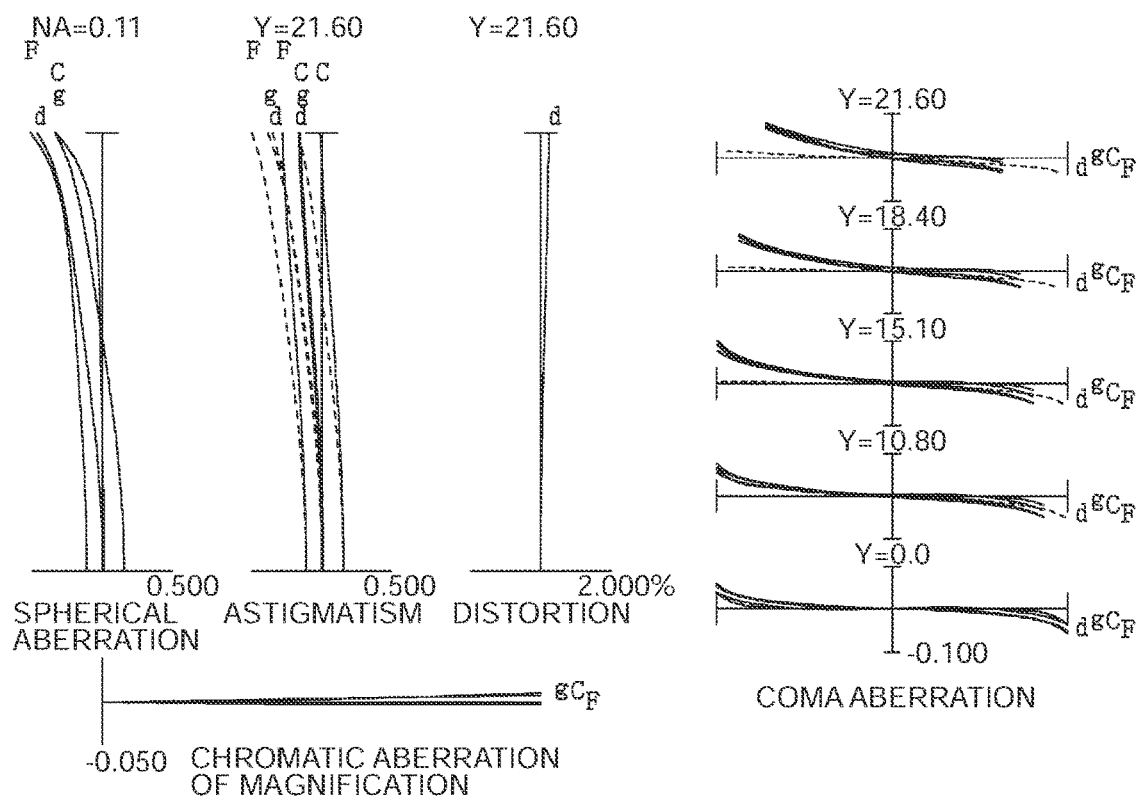

FIGS. 11A and 11B show values of various aberrations of the optical system according to Example 4 in the telephoto end state, upon focusing on an object at infinity (FIG. 11A) and upon focusing on a shortest-distance object (FIG. 11B). In addition, FIGS. 12A and 12B show values of various aberrations of the optical system according to Example 4 in the wide angle end state, upon focusing on an object at infinity (FIG. 12A) and upon focusing on a shortest-distance object (FIG. 12B). It is observed from the graphs showing various aberrations that the optical system according to Example 4 favorably corrects various aberrations and has superior imaging performance, and furthermore, has superior imaging performance also upon focusing on a short-distance object.

Example 5

Figure 13:
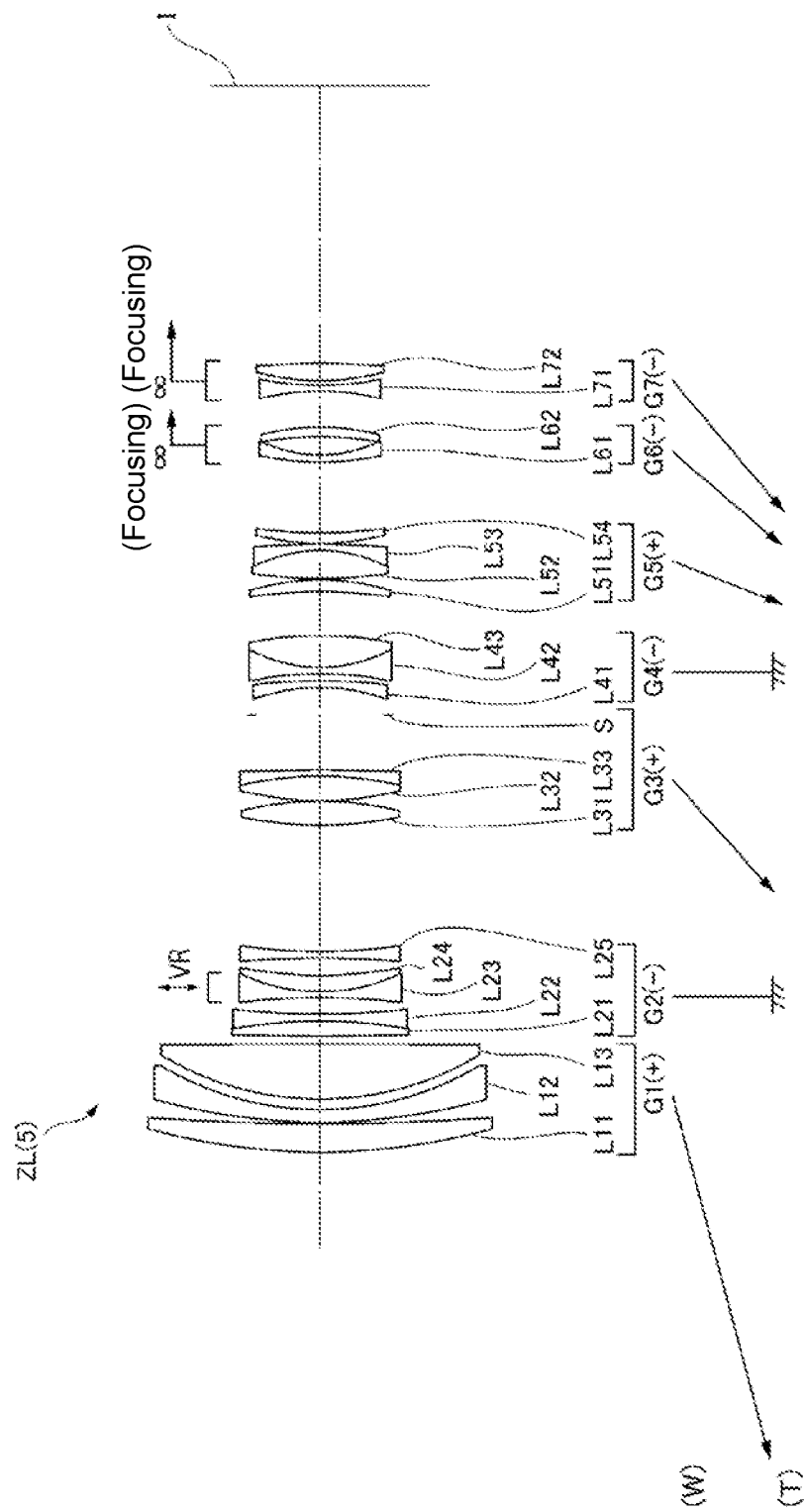
FIG. 13 is a diagram showing a lens configuration of a zoom optical system according to Example 5.

Example 5 is described with reference to FIG. 13, FIG. 14, FIG. 15, and Table 5. FIG. 13 is a diagram showing a lens configuration of a zoom optical system according to Example 5. A zoom optical system ZL (5) according to Example 5 is configured with: a first lens group G1 having positive refractive power; a second lens group G2 having negative refractive power; a third lens group G3 having positive refractive power; an aperture stop S arranged in a position closest to the image surface in the third lens group G3; a fourth lens group G4 having negative refractive power; a fifth lens group G5 having positive refractive power; a sixth lens group G6 having negative refractive power; and a seventh lens group G7 having negative refractive power, arranged in order from an object. The image surface I is positioned behind the seventh lens group G7.

The first lens group G1, the third lens group G3 including the aperture stop S, and the fifth to seventh lens groups G5 to G7 move along a trajectory shown by an arrow in the lower part of FIG. 13 when the zoom optical system zooms from the wide angle end state (W) to the telephoto end state (T). As an interval between adjacent lens groups changes, a focal length of the whole optical system changes, whereby a photographing magnification is changed (zooming is realized). Upon focusing, the sixth lens group G6 and the seventh lens group G7 move on respectively different trajectories (independently from each other). As shown by an arrow in an upper part of FIG. 13, both the sixth lens group G6 and the seventh lens group G7 move in an image surface direction upon focusing from the infinity object focusing state to the short-distance object focusing state.

The first lens group G1 is configured with: a positive meniscus lens L11 having a convex surface facing an object; a negative meniscus lens L12 having a convex surface facing an object; and a biconvex positive lens L13, arranged in order from an object. The positive lens L13 is a specific lens consisting of a glass material having high anomalous dispersion characteristics.

The second lens group G2 is configured with: a cemented negative lens with a biconvex positive lens L21 and a biconcave negative lens L22; a cemented negative lens with a biconcave negative lens L23 and a positive meniscus lens L24 having a convex surface facing an object; and a biconcave negative lens L25, arranged in order from an object. The negative lens L23 is a vibration proof lens, and moves to have a component in a direction perpendicular to the optical axis, or rotationally moves (swings) in an in-plane direction including the optical axis, to thereby correct an image blur caused by camera shake.

The third lens group G3 is configured with: a biconvex positive lens L31; and a cemented positive lens with a biconvex positive lens L32 and a negative meniscus lens L33 having a concave surface facing an object, arranged in order from an object. The positive lens L31 is a specific lens consisting of a glass material having high anomalous dispersion characteristics. The aperture stop S is arranged in a position closest to the image surface in the third lens group G3.

The fourth lens group G4 is configured with: a negative meniscus lens L41 having a concave surface facing an object; and a cemented negative lens with a biconcave negative lens L42 and a biconvex positive lens L43.

The fifth lens group G5 is configured with: a positive meniscus lens L51 having a concave surface facing an object; a cemented positive lens with a biconvex positive lens L52 and a negative meniscus lens L53 having a concave surface facing an object; and a positive meniscus lens L54 having a convex surface facing an object, arranged in order from an object.

The sixth lens group G6 is configured with: a negative meniscus lens L61 having a convex surface facing an object;

and a positive meniscus lens L62 having a concave surface facing an object, arranged in order from an object.

The seventh lens group G7 is configured with: a biconcave negative lens L71; and a biconvex positive lens L72, arranged in order from an object.

In Table 5 below, data values of the zoom optical system according to Example 5 are shown.

TABLE 5

[General Data]
Zooming ratio = 3.770
MWF1 = 1.6314
MWF2 = 4.9350

| | W | M | T |
|---|---|---|---|
| f | 103.00 | 200.00 | 388.00 |
| F.NO | 4.59 | 5.12 | 5.83 |
| ω | 11.82 | 6.02 | 3.10 |
| Ymax | 21.63 | 21.63 | 21.63 |
| TL | 221.000 | 269.990 | 300.946 |
| BF | 57.55 | 67.48 | 84.11 |

[Lens Data]

| Surface Number | R | D | nd | vd | θgF |
|---|---|---|---|---|---|
| Object Surface | ∞ | | | | |
| 1 | 129.5995 | 6.062 | 1.59349 | 67.00 | |
| 2 | 614.9271 | 0.100 | | | |
| 3 | 127.5358 | 2.700 | 1.65412 | 39.68 | |
| 4 | 64.1007 | 2.128 | | | |
| 5 | 64.0911 | 11.515 | 1.43385 | 95.23 | 0.539 |
| 6 | −2299.1104 | (D6) | | | |
| 7 | 558.7848 | 3.286 | 1.75575 | 24.71 | |
| 8 | −100.1309 | 1.400 | 1.80440 | 39.61 | |
| 9 | 157.1701 | 3.331 | | | |
| 10 | −153.6457 | 1.400 | 1.71300 | 53.96 | |
| 11 | 39.9817 | 3.229 | 1.90366 | 31.27 | |
| 12 | 87.8619 | 3.616 | | | |
| 13 | −196.6060 | 1.400 | 1.49782 | 82.57 | |
| 14 | 122.6029 | (D14) | | | |
| 15 | 85.8569 | 4.906 | 1.43384 | 95.16 | 0.539 |
| 16 | −69.5367 | 0.100 | | | |
| 17 | 71.1870 | 5.093 | 1.51860 | 69.89 | |
| 18 | −75.5884 | 1.300 | 1.83400 | 37.18 | |
| 19 | −510.2295 | 11.417 | | | |
| 20 (S) | 0.0000 | (D20) | | | |
| 21 | −45.2131 | 1.400 | 1.80518 | 25.45 | |
| 22 | −121.6262 | 1.550 | | | |
| 23 | −74.4310 | 1.300 | 1.60300 | 65.44 | |
| 24 | 31.5335 | 6.569 | 1.72342 | 38.03 | |
| 25 | −79.1164 | (D25) | | | |
| 26 | −104.2422 | 2.504 | 1.95375 | 32.32 | |
| 27 | −49.0857 | 0.100 | | | |
| 28 | 90.0325 | 5.941 | 1.51860 | 69.89 | |
| 29 | −30.7008 | 1.300 | 1.85478 | 24.80 | |
| 30 | −177.1216 | 0.150 | | | |
| 31 | 52.9732 | 2.238 | 1.80100 | 34.92 | |
| 32 | 111.5019 | (D32) | | | |
| 33 | 62.1432 | 1.300 | 1.88300 | 40.69 | |
| 34 | 27.1976 | 3.783 | | | |
| 35 | −86.2972 | 2.081 | 1.78472 | 25.64 | |
| 36 | −47.3129 | (D36) | | | |
| 37 | −49.8370 | 1.300 | 1.75500 | 52.33 | |
| 38 | 69.3637 | 0.933 | | | |
| 39 | 50.8477 | 3.544 | 1.67270 | 32.18 | |
| 40 | −166.1967 | (D40) | | | |
| Image Surface | ∞ | | | | |

TABLE 5-continued

[General Data]
Zooming ratio = 3.770
MWF1 = 1.6314
MWF2 = 4.9350

[Lens Group Data]

| Group | First surface | Focal length |
|---|---|---|
| 1 | 1 | 180.647 |
| 2 | 7 | −45.904 |
| 3 | 15 | 62.566 |
| 4 | 21 | −187.190 |
| 5 | 26 | 54.940 |
| 6 | 33 | −105.507 |
| 7 | 37 | −122.604 |

[Variable Distance Data]

| | Infinity | | | shortest-distance | | |
|---|---|---|---|---|---|---|
| | W | M | T | W | M | T |
| F/β | 103.000 | 200.000 | 388.000 | −0.125 | −0.217 | −0.342 |
| D0 | 0.000 | 0.000 | 0.000 | 759.000 | 710.000 | 679.000 |
| D6 | 1.500 | 50.500 | 81.500 | 1.500 | 50.500 | 81.500 |
| D14 | 26.202 | 14.386 | 1.500 | 26.202 | 14.386 | 1.500 |
| D19 | 11.417 | 11.417 | 11.417 | 11.417 | 11.417 | 11.417 |
| D20 | 5.500 | 17.316 | 30.202 | 5.500 | 17.316 | 30.202 |
| D25 | 9.179 | 4.963 | 1.500 | 9.179 | 4.963 | 1.500 |
| D32 | 14.731 | 11.709 | 1.743 | 16.640 | 19.501 | 23.911 |
| D36 | 7.360 | 4.659 | 1.413 | 10.664 | 8.750 | 10.755 |
| D40 | 12.080 | 22.019 | 38.693 | 6.877 | 10.144 | 7.203 |

Figure 14A:
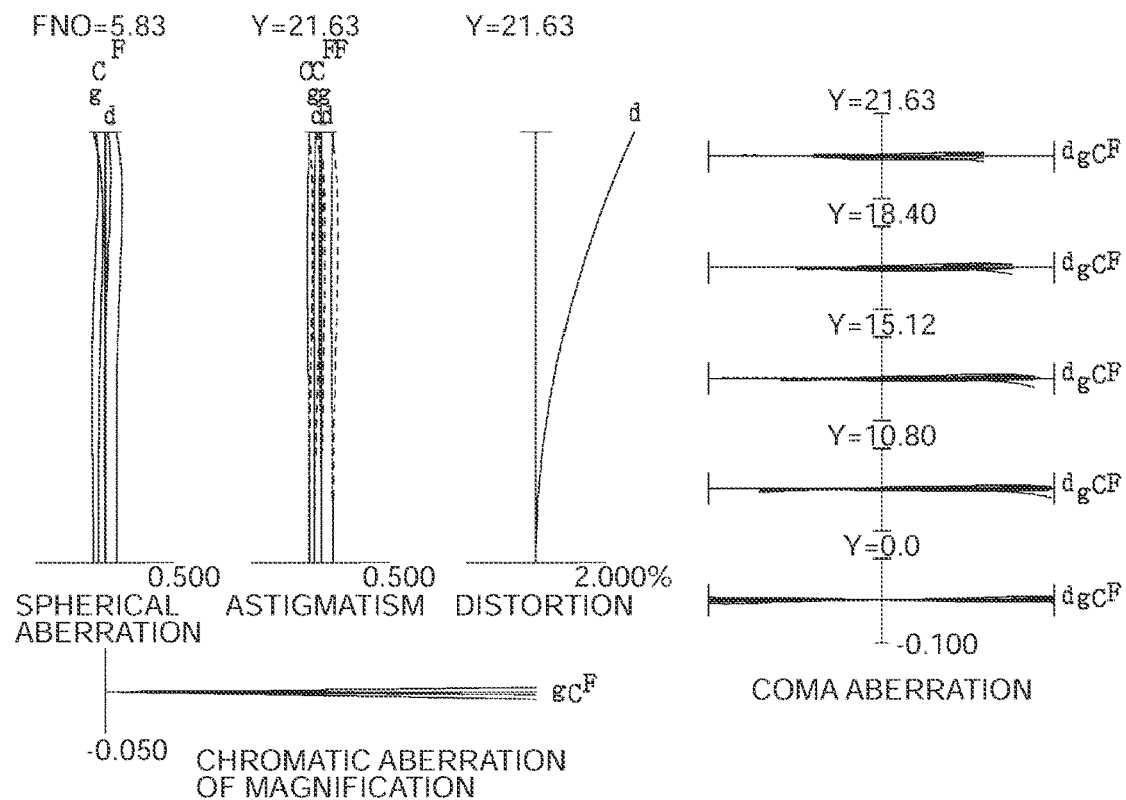
FIGS. 14A and 14B are graphs showing various aberrations of the optical system according to Example 5 in a telephoto end state, FIG. 14A showing various aberrations upon focusing on an object at infinity, and FIG. 14B showing various aberrations upon focusing on a shortest-distance object.
Figure 14B:
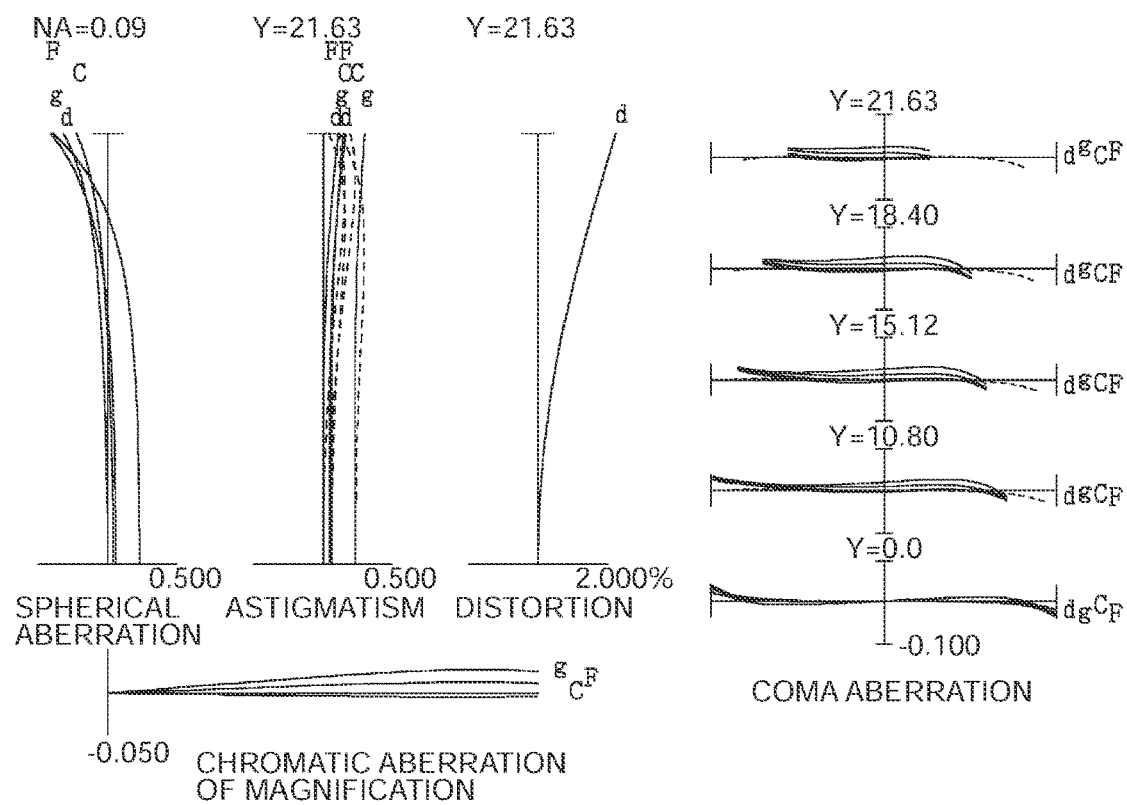
Figure 15A:
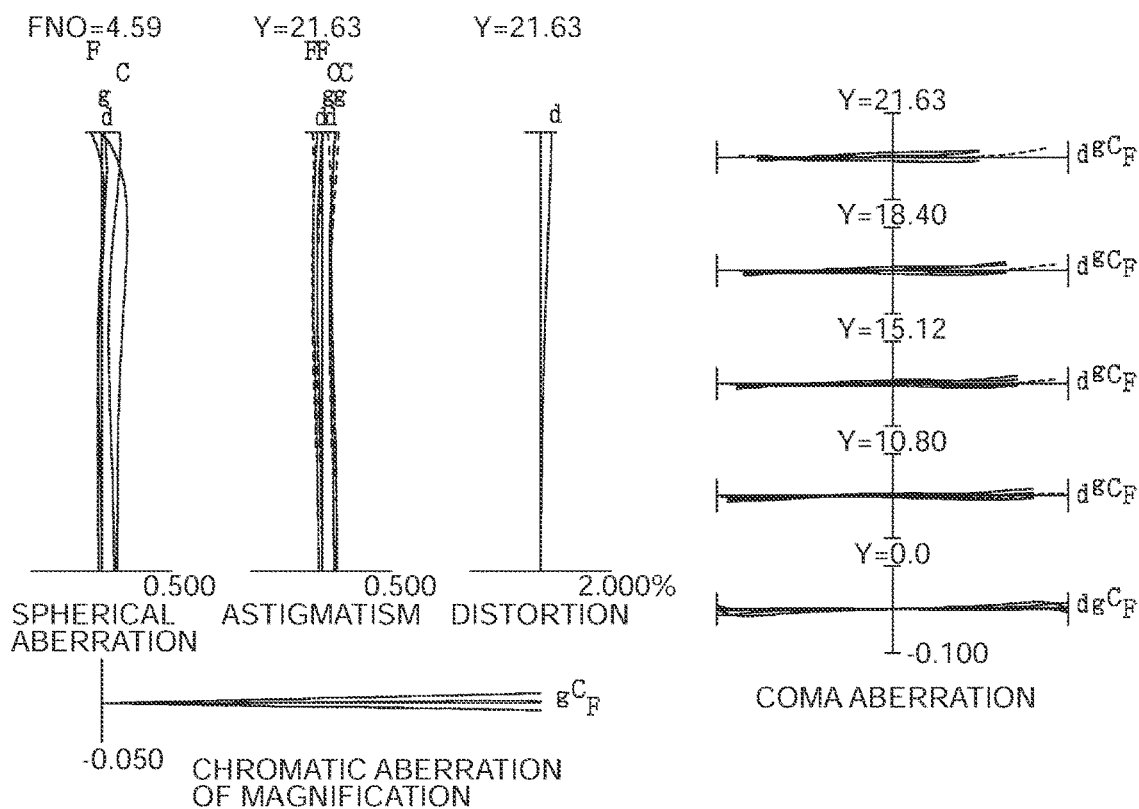
FIGS. 15A and 15B are graphs showing various aberrations of the optical system according to Example 5 in a wide angle end state, FIG. 15A showing various aberrations upon focusing on an object at infinity, and FIG. 15B showing various aberrations upon focusing on a shortest-distance object.
Figure 15B:
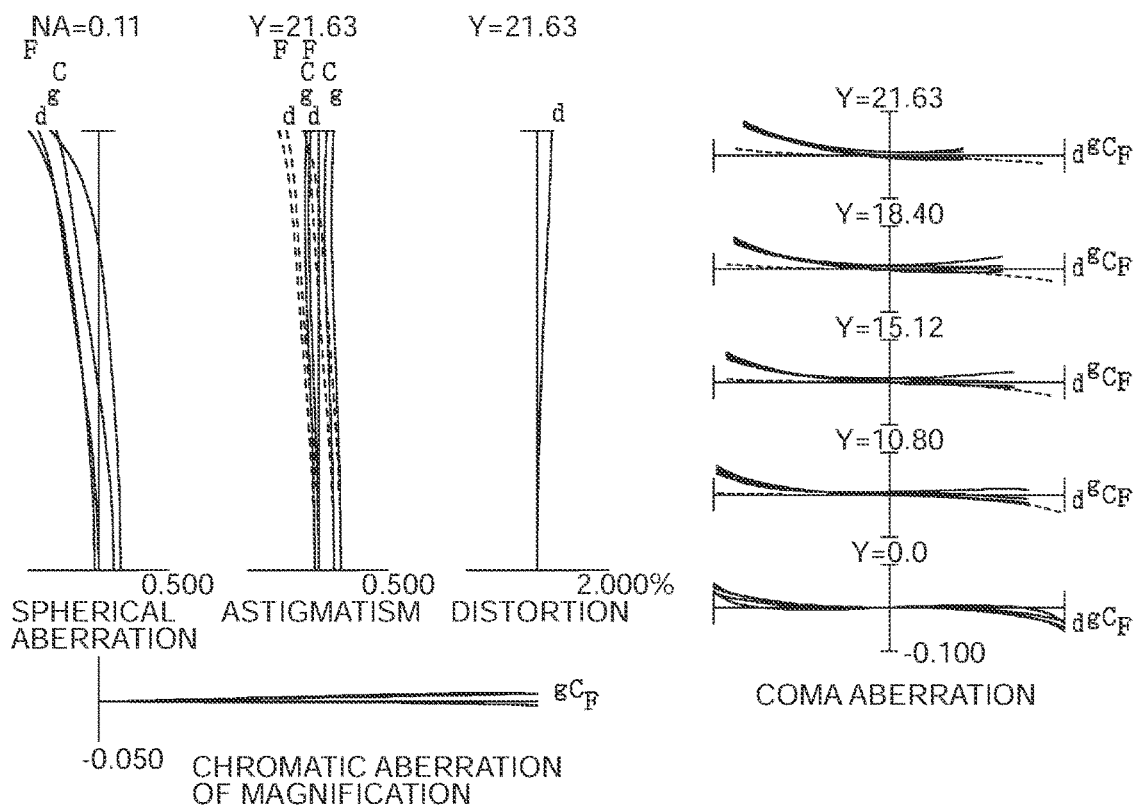

FIGS. 14A and 14B show values of various aberrations of the optical system according to Example 5 in the telephoto end state, upon focusing on an object at infinity (FIG. 14A) and upon focusing on a shortest-distance object (FIG. 14B). In addition, FIGS. 15A and 15B show values of various aberrations of the optical system according to Example 5 in the wide angle end state, upon focusing on an object at infinity (FIG. 15A) and upon focusing on a shortest-distance object (FIG. 15B). It is observed from the graphs showing various aberrations that the optical system according to Example 5 favorably corrects various aberrations and has superior imaging performance, and furthermore, has superior imaging performance also upon focusing on a short-distance object.

Example 6

Figure 16:
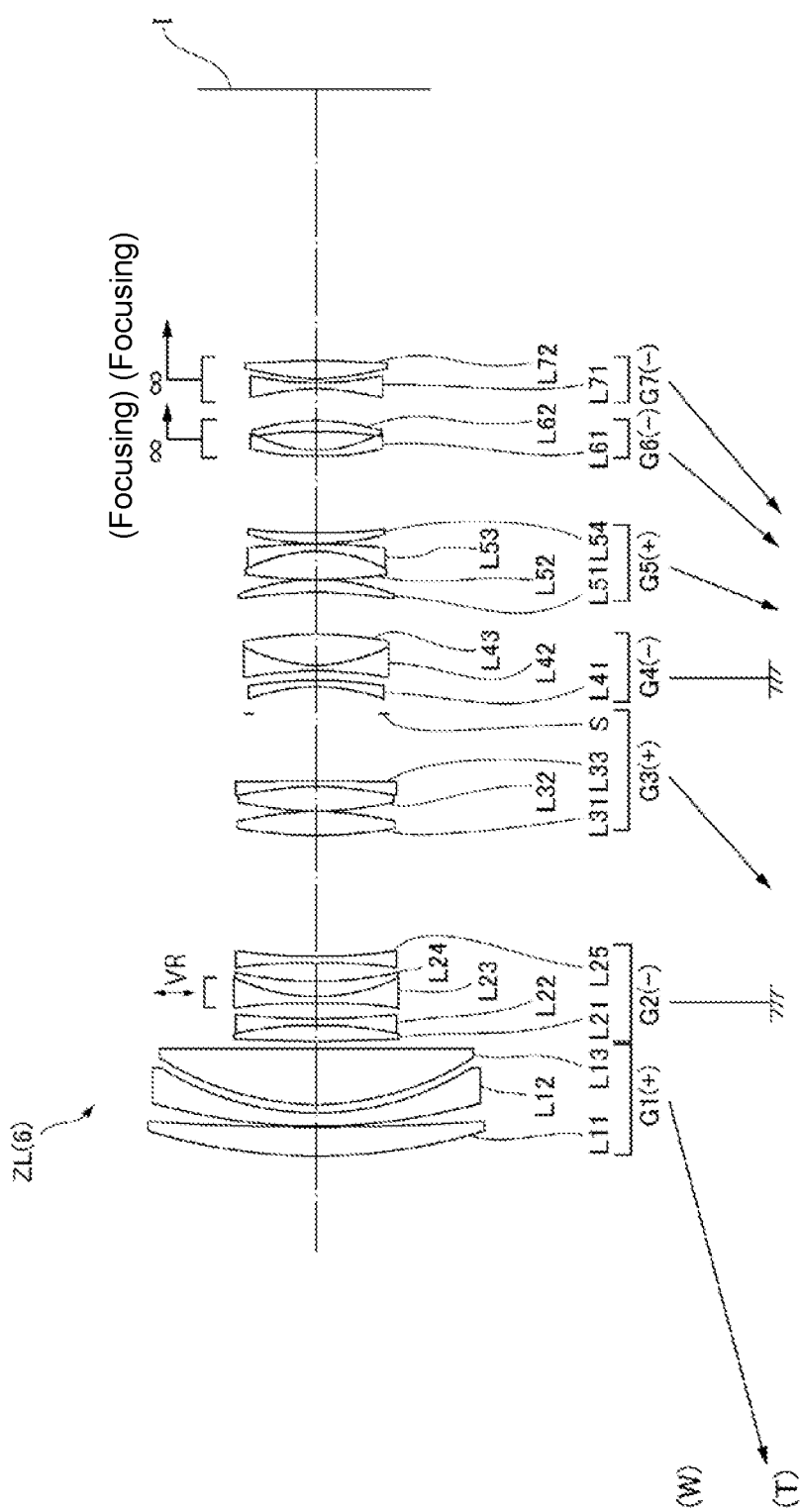
FIG. 16 is a diagram showing a lens configuration of a zoom optical system according to Example 6.

Example 6 is described with reference to FIG. 16, FIG. 17, FIG. 18, and Table 6. FIG. 16 is a diagram showing a lens configuration of a zoom optical system according to Example 6. A zoom optical system ZL (6) according to Example 6 is configured with: a first lens group G1 having positive refractive power; a second lens group G2 having negative refractive power; a third lens group G3 having positive refractive power; an aperture stop S arranged in a position closest to the image surface in the third lens group G3; a fourth lens group G4 having negative refractive power; a fifth lens group G5 having positive refractive power; a sixth lens group G6 having negative refractive power; and a seventh lens group G7 having negative refractive power, arranged in order from an object. The image surface I is positioned behind the seventh lens group G7.

The first lens group G1, the third lens group G3 including the aperture stop S, and the fifth to seventh lens groups G5 to G7 move along a trajectory shown by an arrow in the lower part of FIG. 16 when the zoom optical system zooms from the wide angle end state (W) to the telephoto end state (T). As an interval between adjacent lens groups changes, a focal length of the whole optical system changes, whereby a photographing magnification is changed (zooming is realized). Upon focusing, the sixth lens group G6 and the seventh lens group G7 move on respectively different trajectories (independently from each other). As shown by an arrow in an upper part of FIG. 16, both the sixth lens group G6 and the seventh lens group G7 move in an image surface direction upon focusing from the infinity object focusing state to the short-distance object focusing state.

The first lens group G1 is configured with: a positive meniscus lens L11 having a convex surface facing an object; a negative meniscus lens L12 having a convex surface facing an object; and a biconvex positive lens L13, arranged in order from an object. The positive lens L13 is a specific lens consisting of a glass material having high anomalous dispersion characteristics.

The second lens group G2 is configured with: a cemented positive lens with a biconvex positive lens L21 and a biconcave negative lens L22; a cemented negative lens with a biconcave negative lens L23 and a positive meniscus lens L24 having a convex surface facing an object; and a biconcave negative lens L25, arranged in order from an object. The negative lens L23 is a vibration proof lens, and moves to have a component in a direction perpendicular to the optical axis, or rotationally moves (swings) in an in-plane direction including the optical axis, to thereby correct an image blur caused by camera shake.

The third lens group G3 is configured with: a biconvex positive lens L31; and a cemented positive lens with a biconvex positive lens L32 and a negative meniscus lens L33 having a concave surface facing an object, arranged in order from an object. The positive lens L31 is a specific lens consisting of a glass material having high anomalous dispersion characteristics. The aperture stop S is arranged in a position closest to the image surface in the third lens group G3.

The fourth lens group G4 is configured with: a negative meniscus lens L41 having a concave surface facing an object; and a cemented positive lens with a biconcave negative lens L42 and a biconvex positive lens L43.

The fifth lens group G5 is configured with: a positive meniscus lens L51 having a concave surface facing an object; a cemented positive lens with a biconvex positive lens L52 and a negative meniscus lens L53 having a concave surface facing an object; and a positive meniscus lens L54 having a convex surface facing an object, arranged in order from an object.

The sixth lens group G6 is configured with: a negative meniscus lens L61 having a convex surface facing an object; and a positive meniscus lens L62 having a concave surface facing an object, arranged in order from an object.

The seventh lens group G7 is configured with: a biconcave negative lens L71; and a biconvex positive lens L72, arranged in order from an object.

In Table 6 below, data values of the zoom optical system according to Example 6 are shown.

TABLE 6

[General Data]
Zooming ratio = 3.767
MWF1 = 1.8279
MWF2 = 4.7540

|  | W | M | T |
|---|---|---|---|
| f | 103.00 | 200.00 | 388.00 |
| F.NO | 4.59 | 5.12 | 5.83 |
| ω | 11.82 | 6.03 | 3.10 |
| Ymax | 21.63 | 21.63 | 21.63 |
| TL | 221.000 | 269.835 | 295.956 |
| BF | 56.22 | 67.50 | 83.01 |

[Lens Data]

| Surface Number | R | D | nd | vd | θgF |
|---|---|---|---|---|---|
| Object Surface | ∞ | | | | |
| 1 | 119.0802 | 6.150 | 1.59349 | 67.00 | |
| 2 | 542.9407 | 0.100 | | | |
| 3 | 120.2830 | 2.700 | 1.65412 | 39.68 | |
| 4 | 60.0833 | 1.853 | | | |
| 5 | 60.0909 | 11.686 | 1.43385 | 95.23 | 0.539 |
| 6 | −3805.1851 | (D6) | | | |
| 7 | 584.8588 | 3.104 | 1.75575 | 24.71 | |
| 8 | −92.1798 | 1.400 | 1.80440 | 39.61 | |
| 9 | 150.1185 | 3.197 | | | |
| 10 | −163.5441 | 1.400 | 1.71300 | 53.96 | |
| 11 | 38.9835 | 3.215 | 1.90366 | 31.27 | |
| 12 | 84.1892 | 3.786 | | | |
| 13 | −158.5654 | 1.400 | 1.49782 | 82.57 | |
| 14 | 133.4273 | (D14) | | | |
| 15 | 99.6474 | 4.799 | 1.43384 | 95.16 | 0.539 |
| 16 | −65.0870 | 0.100 | | | |
| 17 | 72.2025 | 5.004 | 1.51860 | 69.89 | |
| 18 | −77.9165 | 1.300 | 1.83400 | 37.18 | |
| 19 | −450.5174 | 13.848 | | | |
| 20 (S) | 0.0000 | (D20) | | | |
| 21 | −41.1692 | 1.400 | 1.80518 | 25.45 | |
| 22 | −100.7844 | 1.930 | | | |
| 23 | −89.0545 | 1.300 | 1.60300 | 65.44 | |
| 24 | 30.9408 | 6.311 | 1.72342 | 38.03 | |
| 25 | −90.7192 | (D25) | | | |
| 26 | −90.4151 | 2.545 | 1.95375 | 32.32 | |
| 27 | −45.0429 | 0.100 | | | |
| 28 | 104.6509 | 5.921 | 1.51860 | 69.89 | |
| 29 | −29.5380 | 1.300 | 1.85478 | 24.80 | |
| 30 | −149.5017 | 0.150 | | | |
| 31 | 57.7812 | 2.251 | 1.80100 | 34.92 | |
| 32 | 138.6201 | (D32) | | | |
| 33 | 65.6462 | 1.300 | 1.88300 | 40.69 | |
| 34 | 27.7530 | 3.793 | | | |
| 35 | −103.8907 | 2.242 | 1.78472 | 25.64 | |
| 36 | −48.1743 | (D36) | | | |
| 37 | −49.6311 | 1.300 | 1.75500 | 52.33 | |
| 38 | 72.6218 | 0.761 | | | |
| 39 | 50.3990 | 3.700 | 1.67270 | 32.18 | |
| 40 | −238.7796 | (D40) | | | |
| Image Surface | ∞ | | | | |

[Lens Group Data]

| Group | First surface | Focal length |
|---|---|---|
| 1 | 1 | 171.657 |
| 2 | 7 | −44.408 |
| 3 | 15 | 62.730 |
| 4 | 21 | −179.694 |
| 5 | 26 | 54.514 |
| 6 | 33 | −120.729 |
| 7 | 37 | −111.264 |

TABLE 6-continued

[General Data]
Zooming ratio = 3.767
MWF1 = 1.8279
MWF2 = 4.7540

[Variable Distance Data]

|  | Infinity | | | shortest-distance | | |
| --- | --- | --- | --- | --- | --- | --- |
|  | W | M | T | W | M | T |
| F/β | 103.000 | 200.000 | 388.000 | −0.125 | −0.214 | −0.337 |
| D0 | 0.000 | 0.000 | 0.000 | 759.000 | 710.145 | 684.000 |
| D6 | 1.500 | 50.355 | 76.500 | 1.500 | 50.355 | 76.500 |
| D14 | 25.137 | 16.313 | 1.500 | 25.137 | 16.313 | 1.500 |
| D19 | 13.848 | 13.848 | 13.848 | 13.848 | 13.848 | 13.848 |
| D20 | 5.500 | 14.324 | 29.137 | 5.500 | 14.324 | 29.137 |
| D25 | 8.775 | 4.694 | 1.500 | 8.775 | 4.694 | 1.500 |
| D32 | 15.869 | 10.956 | 1.500 | 17.963 | 18.935 | 24.560 |
| D36 | 6.649 | 4.350 | 1.469 | 9.575 | 7.890 | 9.814 |
| D40 | 12.546 | 23.839 | 39.365 | 7.531 | 12.325 | 7.976 |

Figure 17A:
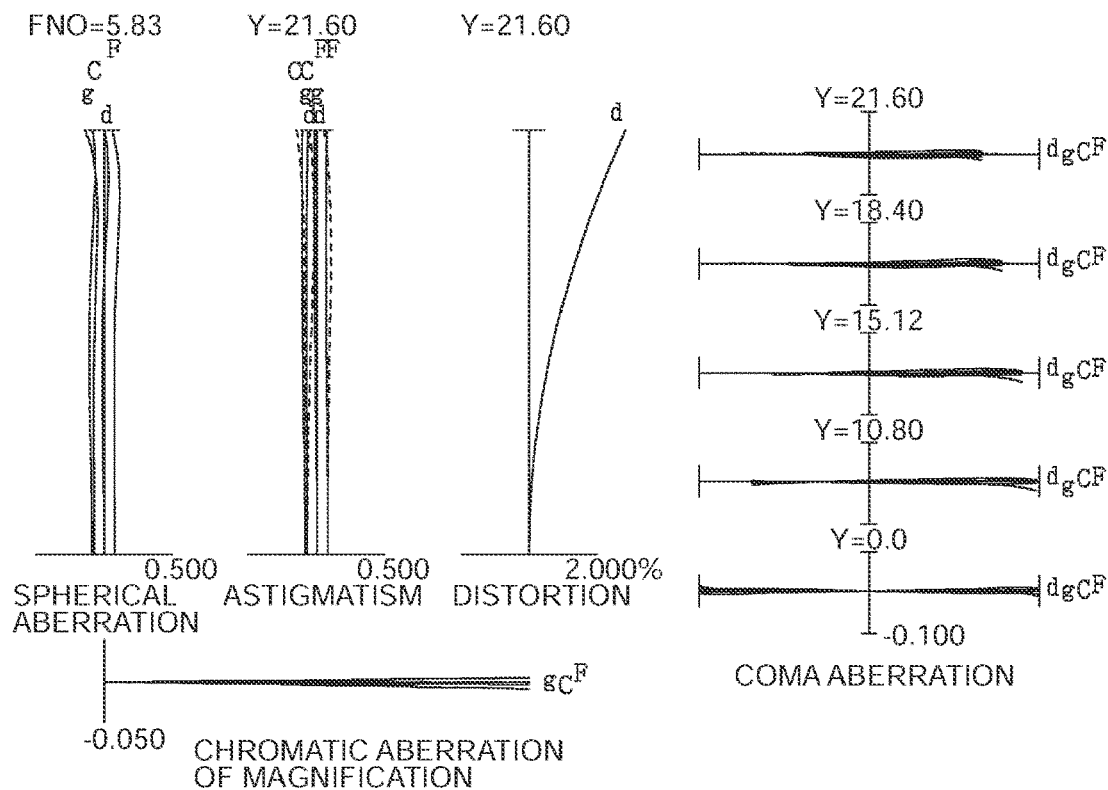
FIGS. 17A and 17B are graphs showing various aberrations of the optical system according to Example 6 in a telephoto end state, FIG. 17A showing various aberrations upon focusing on an object at infinity, and FIG. 17B showing various aberrations upon focusing on a shortest-distance object.
Figure 17B:
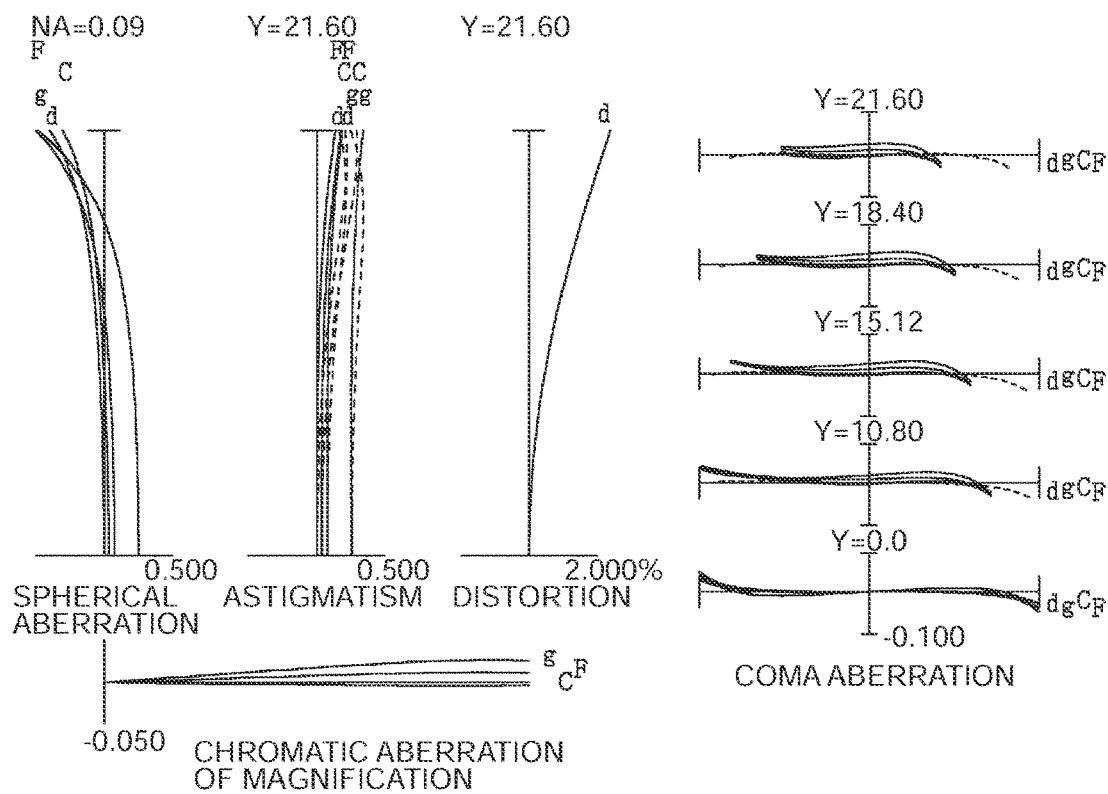
Figure 18A:
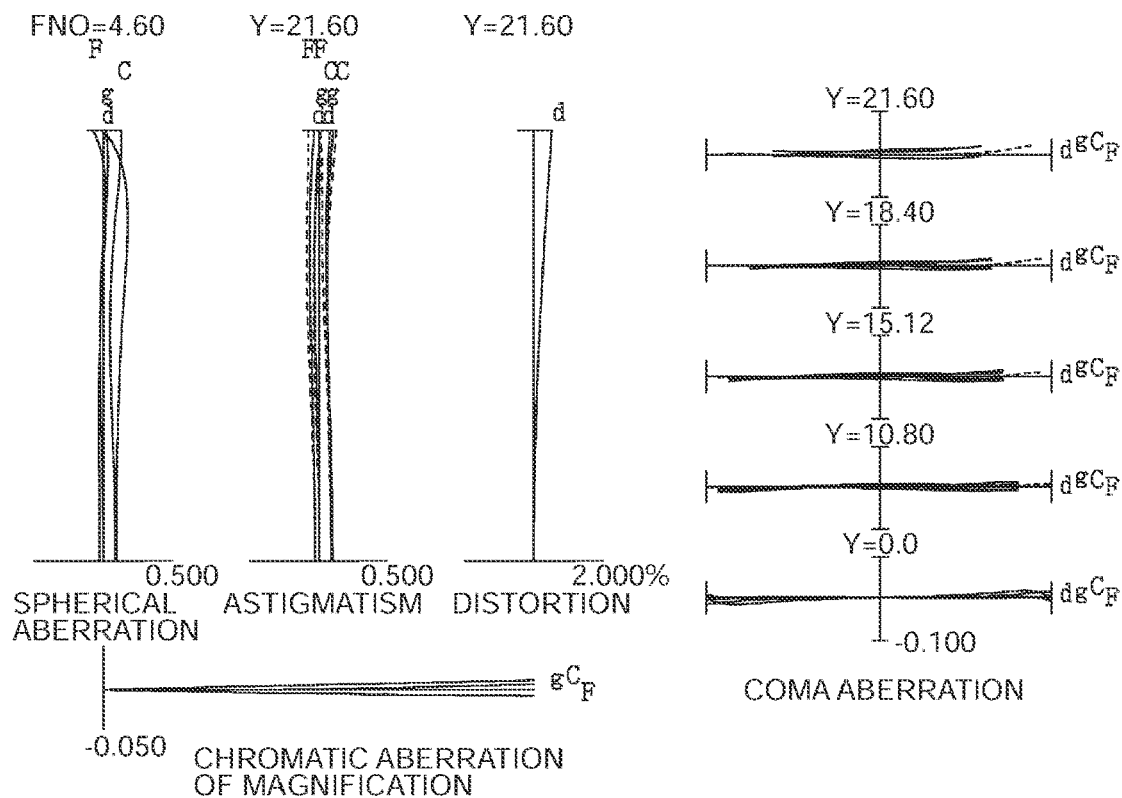
FIGS. 18A and 18B are graphs showing various aberrations of the optical system according to Example 6 in a wide angle end state, FIG. 18A showing various aberrations upon focusing on an object at infinity, and FIG. 18B showing various aberrations upon focusing on a shortest-distance object.
Figure 18B:
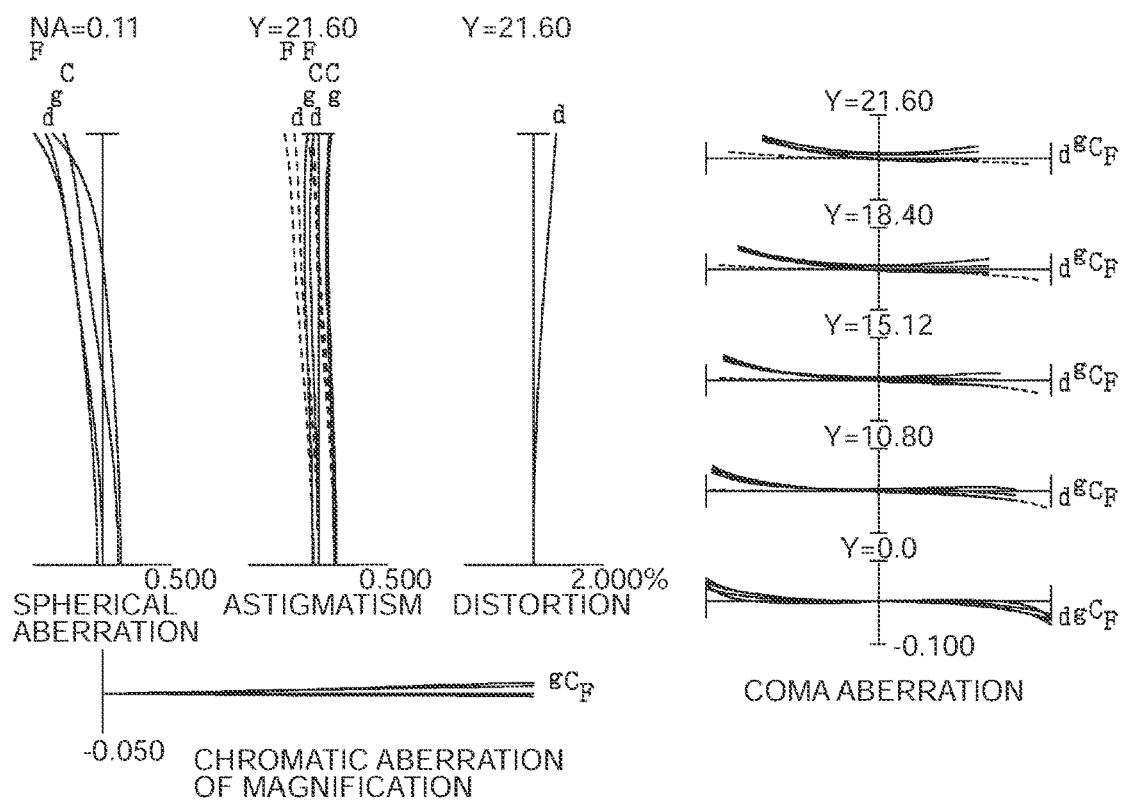

FIGS. 17A and 17B show values of various aberrations of the optical system according to Example 6 in the telephoto end state, upon focusing on an object at infinity (FIG. 17A) and upon focusing on a shortest-distance object (FIG. 17B). In addition, FIGS. 18A and 18B show values of various aberrations of the optical system according to Example 6 in the wide angle end state, upon focusing on an object at infinity (FIG. 18A) and upon focusing on a shortest-distance object (FIG. 18B). It is observed from the graphs showing various aberrations that the optical system according to Example 6 favorably corrects various aberrations and has superior imaging performance, and furthermore, has superior imaging performance also upon focusing on a short-distance object.

A list of conditional expressions, and conditional expression corresponding values for each Example are shown below.

A List of Conditional Expressions (1) fF1/fF2
(2) βWf1/βWF2
(3) βTF1/βTF2
(4) −fFs/ft
(5) −fFs/fw
(6) MWF1/MWF2
(7) 2ωw(°)
(8) 2ωt(°)
(9) ft/fw
(10) TLw/fw
(11) TLt/ft
(12) BFw/TLw
(13) BFt/TLt
(14) vf1p
(15) vf1n
(16) vf2p
(17) vf2n
(18) 1/βWF1
(19) βWF2
(20) {βWF1+(1/βWF1)}$^{-2}$
(21) {βWF2+(1/βWF2)}$^{-2}$
(22) F1pos/TLt
(23) vsp1
(24) θgFsp1−(0.644−0.00168vsp1)
(25) vsp2
(26) θgFsp2−(0.644−0.00168vsp2)
(27) fpr/ft

[Conditional Expression Corresponding Value]

|  | Example1 | Example2 | Example3 | Example4 | Example5 | Example6 |
| --- | --- | --- | --- | --- | --- | --- |
| (1) | 1.1036 | 2.1646 | 1.1645 | 5.4256 | 0.8605 | 1.0851 |
| (2) | 0.9380 | 0.8128 | 1.0097 | 0.6964 | 0.9984 | 0.9330 |
| (3) | 0.8103 | 0.6332 | 0.8028 | 0.5772 | 0.8961 | 0.8283 |
| (4) | 0.2743 | 0.2131 | 0.2608 | 0.2288 | 0.2719 | 0.2868 |
| (5) | 1.0334 | 0.8028 | 0.9823 | 0.8455 | 1.0243 | 1.0802 |
| (6) | 0.3220 | 0.3798 | 0.3933 | 0.5321 | 0.3306 | 0.3845 |
| (7) | 23.6395 | 23.5107 | 23.4048 | 23.2826 | 23.6479 | 23.6479 |
| (8) | 6.2056 | 6.2137 | 6.1975 | 6.2289 | 6.2059 | 6.2059 |
| (9) | 3.7671 | 3.7675 | 3.7673 | 3.6952 | 3.7699 | 3.7670 |
| (10) | 2.1456 | 2.1627 | 2.1359 | 2.0929 | 2.1456 | 2.1456 |
| (11) | 0.7756 | 0.7810 | 0.7732 | 0.7836 | 0.7756 | 0.7628 |
| (12) | 0.2448 | 0.2151 | 0.1814 | 0.2458 | 0.2604 | 0.2544 |
| (13) | 0.2752 | 0.2865 | 0.2752 | 0.1778 | 0.2795 | 0.2805 |
| (14) | 25.64 | 29.52 | 29.52 | 29.52 | 25.64 | 25.64 |
| (15) | 40.69 | 35.77 | 35.77 | 35.77 | 40.69 | 40.69 |
| (16) | 32.18 | 27.74 | 27.74 | 29.52 | 32.18 | 32.18 |
| (17) | 52.33 | 52.76 | 52.76 | 54.09 | 52.33 | 52.33 |
| (18) | 1.4719 | 1.3078 | 1.4395 | 1.1529 | 1.5290 | 1.4579 |
| (19) | 1.5691 | 1.6091 | 1.4256 | 1.6555 | 1.5315 | 1.5627 |
| (20) | 0.2161 | 0.2328 | 0.2196 | 0.2450 | 0.2098 | 0.2176 |
| (21) | 0.2054 | 0.2010 | 0.2210 | 0.1959 | 0.2096 | 0.2061 |
| (22) | 0.32 | 0.33 | 0.32 | 0.34 | 0.33 | 0.33 |
| (23) | 95.23 | 95.23 | 95.23 | 95.23 | 95.23 | 95.23 |
| (24) | 0.055 | 0.055 | 0.055 | 0.055 | 0.055 | 0.055 |
| (25) | 95.23 | 82.57 | 82.57 | 82.57 | 95.23 | 95.23 |
| (26) | 0.055 | 0.033 | 0.033 | 0.033 | 0.055 | 0.055 |
| (27) | 0.4915 | 0.5327 | 0.5303 | 0.5460 | 0.4656 | 0.4424 |

According to each of Examples described in the foregoing, a zoom optical system that realizes high-speed AF and quietness upon AF without an increase in size of a lens barrel, and furthermore enables favorable suppression of aberration fluctuation upon zooming from the wide angle end state to the telephoto end state, and aberration fluctuation upon focusing from an infinity object to a short-distance object can be realized by reducing size and weight of the focusing lens group.

Note that the present invention is not limited to the above embodiment, and may be modified accordingly within a range not impairing the optical performance specified by the recitation in each claim.

In addition, although zoom optical systems of a seven-group configuration and an eight-group configuration have been described in the above-described Examples, the present invention may also be a zoom optical system of a different group configuration (for example, a configuration with an additional lens or lens group in a position closest to an object or a position closest to an image surface in the zoom optical system, and the like). As used herein, the term "lens group" refers to a portion with at least one lens separated by an air distance that is changed upon zooming.

As for an aperture stop, although the aperture stop is arranged in the third lens group or the fourth lens group in each of the above-described Examples, a mode in which a lens frame serves as an aperture stop without a member as an aperture stop being provided is also conceivable.

As a lens surface, any of a spherical surface, a planar surface, and an aspherical surface may be employed. A spherical or planar lens surface has an advantage that: lens machining and assembly/adjustment are facilitated, and consequently deterioration of optical performance due to errors in lens machining and assembly/adjustment can be prevented; and deterioration of depiction performance is minor even when an image surface is misaligned. An aspherical lens surface may be any of: an aspherical surface obtained by a grinding process; a glass-molded aspherical surface obtained by molding glass into an aspherical shape by means of a die; and a composite type aspherical surface obtained by forming a resin provided on a glass surface into an aspherical shape. Alternatively, the lens surface may also be a diffractive surface, and the lens may be a gradient index lens (GRIN lens) or a plastic lens. Each lens surface may be provided with an antireflective film having a high transmittance over a broad wavelength range, in order to reduce flare and ghost to achieve high-contrast optical performance.

EXPLANATION OF NUMERALS AND CHARACTERS

G1 First lens group
G2 Second lens group
G3 Third lens group
G4 Fourth lens group
G5 Fifth lens group
G6 Sixth lens group
G7 Seventh lens group
G8 Eighth lens group
I Image surface
S Aperture stop

The invention claimed is:

1. A zoom optical system comprising a plurality of lens groups, wherein:
   in the plurality of lens groups, an interval between adjacent lens groups is changed upon zooming;
   the plurality of lens groups comprise a first focusing lens group that moves upon focusing and a second focusing lens group that is arranged on an image side with respect to the first focusing lens group and moves on a trajectory different from a trajectory of the first focusing lens group upon focusing;
   both the first focusing lens group and the second focusing lens group have negative refractive power;
   the first focusing lens group and the second focusing lens group are arranged adjacent to each other;
   the first focusing lens group comprises at least one positive lens and at least one negative lens; and
   the following conditional expression is satisfied, $0.40 < fF1/fF2 < 6.00$ where
   fF1: a focal length of the first focusing lens group, and
   fF2: a focal length of the second focusing lens group.

2. The zoom optical system according to claim 1, wherein the following conditional expression is satisfied, $0.50 < \beta WF1/\beta WF2 < 1.20$ where
   βWF1: a lateral magnification of the first focusing lens group in a wide angle end state upon focusing on an object at infinity, and
   βWF2: a lateral magnification of the second focusing lens group in the wide angle end state upon focusing on the object at infinity.

3. The zoom optical system according to claim 1, wherein the following conditional expression is satisfied, $0.40 < \beta TF1/\beta TF2 < 1.00$ where
   βTF1: a lateral magnification of the first focusing lens group in a telephoto end state upon focusing on an object at infinity, and
   βTF2: a lateral magnification of the second focusing lens group in the telephoto end state upon focusing on the object at infinity.

4. The zoom optical system according to claim 1, wherein the following conditional expression is satisfied, $0.10 < -fFs/ft < 0.50$ where
   fFs: a focal length of one of the first focusing lens group and the second focusing lens group having greater refractive power, and
   ft: a focal length of the whole zoom optical system in a telephoto end state.

5. The zoom optical system according to claim 1, wherein the following conditional expression is satisfied, $0.50 < -fFs/fw < 1.50$ where
   fFs: a focal length of one of the first focusing lens group and the second focusing lens group having greater refractive power, and
   fw: a focal length of the whole zoom optical system in a wide angle end state.

6. The zoom optical system according to claim 1, wherein the first focusing lens group moves toward an image surface upon focusing from an infinity object focusing state to a short-distance object focusing state.

7. The zoom optical system according to claim 1, wherein the second focusing lens group moves toward an image surface upon focusing from an infinity object focusing state to a short-distance object focusing state.

8. The zoom optical system according to claim 1, wherein the following conditional expression is satisfied, $0.10 < MWF1/MWF2 < 0.80$ where
   MWF1: an absolute value of a movement amount of the first focusing lens group upon focusing from an infinity object focusing state to a shortest-distance object focusing state in a wide angle end state, and
   MWF2: an absolute value of a movement amount of the second focusing lens group upon focusing from the infinity object focusing state to the shortest-distance object focusing state in the wide angle end state.

9. The zoom optical system according to claim 1, wherein the following conditional expression is satisfied, $20.00° < 2\omega w < 30.00°$ where
   2ωw: a full angle of view of the zoom optical system in a wide angle end state.

10. The zoom optical system according to claim 1, wherein the following conditional expression is satisfied, $5.60° < 2\omega t < 7.00°$ where
    2ωt: a full angle of view of the zoom optical system in a telephoto end state.

11. The zoom optical system according to claim 1, wherein the following conditional expression is satisfied, $3.30 < ft/fw < 4.00$ where
    ft: a focal length of the whole zoom optical system in a telephoto end state, and
    fw: a focal length of the whole zoom optical system in a wide angle end state.

12. The zoom optical system according to claim 1, wherein the following conditional expression is satisfied, $$1.80 < TLw/fw < 2.40 \qquad (10)$$

where
TLw: an entire length of the zoom optical system in a wide angle end state, and
fw: a focal length of the whole zoom optical system in the wide angle end state.

13. The zoom optical system according to claim 1, wherein the following conditional expression is satisfied, $$0.50 < TLt/ft < 0.90 \qquad (11)$$

where
TLt: an entire length of the zoom optical system in a telephoto end state, and
ft: a focal length of the whole zoom optical system in the telephoto end state.

14. The zoom optical system according to claim 1, wherein the following conditional expression is satisfied, $$0.13 < BFw/TLw < 0.33$$

where
BFw: a back focus (air equivalent length) of the zoom optical system in a wide angle end state, and
TLw: an entire length of the zoom optical system in the wide angle end state.

15. The zoom optical system according to claim 1, wherein the following conditional expression is satisfied, $$0.13 < BFw/TLw < 0.33 \qquad (12)$$

where
BFt: a back focus (air equivalent length) of the zoom optical system in a telephoto end state, and
TLt: an entire length of the zoom optical system in the telephoto end state.

16. The zoom optical system according to claim 1, further comprising an aperture stop that is arranged alongside the plurality of lens groups on an optical axis, wherein
at least one of the first focusing lens group and the second focusing lens group is arranged in a position closer to an image surface than the aperture stop.

17. The zoom optical system according to claim 1, wherein at least one negative lens included in the first focusing lens group is a negative meniscus lens having a convex surface facing an object.

18. The zoom optical system according to claim 1, wherein at least one positive lens included in the first focusing lens group satisfies the following conditional expression, $$23.00 < vf1p < 35.00$$

where
vf1p: the Abbe number based on a d-line.

19. The zoom optical system according to claim 1, wherein at least one negative lens included in the first focusing lens group satisfies the following conditional expression, $$30.00 < vf1n < 45.00$$

where
vf1n: the Abbe number based on a d-line.

20. The zoom optical system according to claim 1, wherein the second focusing lens group comprises at least one positive lens and at least one negative lens.

21. The zoom optical system according to claim 20, wherein at least one positive lens included in the second focusing lens group satisfies the following conditional expression, $$23.00 < vf1p < 35.00$$

where
vf2p: the Abbe number based on a d-line.

22. The zoom optical system according to claim 20, wherein at least one negative lens included in the second focusing lens group satisfies the following conditional expression, $$50.00 < vf2n < 58.00$$

where
vf2n: the Abbe number based on a d-line.

23. The zoom optical system according to claim 20, wherein at least one negative lens included in the second focusing lens group is a biconcave negative lens.

24. The zoom optical system according to claim 1, wherein the following conditional expression is satisfied, $$1.00 < 1/\beta WF1 < 2.00$$

where
$\beta WF1$: a lateral magnification of the first focusing lens group in a wide angle end state upon focusing on an object at infinity.

25. The zoom optical system according to claim 1, wherein the following conditional expression is satisfied, $$1.00 < 1/\beta WF1 < 2.00$$

where
$\beta WF2$: a lateral magnification of the second focusing lens group in a wide angle end state upon focusing on an object at infinity.

26. The zoom optical system according to claim 1, wherein the following conditional expression is satisfied, $$1.00 < 1/\beta WF1 < 2.00$$

where
$\beta WF1$: a lateral magnification of the first focusing lens group in a wide angle end state upon focusing on an object at infinity.

27. The zoom optical system according to claim 1, wherein the following conditional expression is satisfied, $$\{\beta WF1 + (1/\beta WF1)\}^{-2} < 0.250$$

where
$\beta WF2$: a lateral magnification of the second focusing lens group in a wide angle end state upon focusing on an object at infinity.

28. The zoom optical system according to claim 1, wherein the first focusing lens group satisfies the following conditional expression, $$0.28 < F1pos/TLt < 0.38$$

where
F1pos: a position of the first focusing lens group in a telephoto end state upon focusing on an object at infinity, the position of the lens group being a distance from a surface of the lens group closest to an object to an image surface, and
TLt: an entire length of the zoom optical system in the telephoto end state.

29. The zoom optical system according to claim 1, wherein, among the lens groups constituting the plurality of lens groups, the number of lens groups arranged closer to an image surface than the first focusing lens group is not greater than two.

30. The zoom optical system according to claim 1, wherein the plurality of lens groups comprise, in order from an object: a first positive lens group having positive refractive power; a first negative lens group having negative refractive power; and a second positive lens group having positive refractive power.

31. The zoom optical system according to claim 30, wherein the plurality of lens groups further comprise a second negative lens group having negative refractive power arranged on an image side of the second positive lens group.

32. The zoom optical system according to claim 30, wherein at least one of the first positive lens group and the second positive lens group comprises a specific positive lens made of glass material that satisfies the following conditional expressions, $$85.00 < vsp < 100.00$$

$$\theta gFsp - (0.644 - 0.00168 vsp) > 0.01$$

where vsp: the Abbe number based on a d-line of the specific positive lens, and

θgFsp: a partial dispersion ratio of the specific positive lens, the partial dispersion ratio being defined as θgF=(ng−nF)/(nF−nC), where ng is a refractive index with respect to a g-line, nF is a refractive index with respect to an F-line, and nC is a refractive index with respect to a C-line.

33. The zoom optical system according to claim 30, wherein the first positive lens group satisfies the following conditional expression, $$0.40 < fF1/fF2 < 6.00$$

fpr: a focal length of the first positive lens group, and ft: a focal length of the whole zoom optical system in a telephoto end state.

34. An optical apparatus comprising the zoom optical system according to claim 1.

35. A method for manufacturing a zoom optical system comprising a plurality of lens groups, the method comprising one of the following features A and B:

the feature A comprising:
disposing the plurality of lens groups in a lens barrel so that:
intervals between adjacent lens groups in the plurality of lens groups are changed upon zooming;
the plurality of lens groups comprise a first focusing lens group that moves upon focusing and a second focusing lens group that is arranged on an image side with respect to the first focusing lens group and moves on a trajectory different from a 1 trajectory of the first focusing lens group upon focusing;
both the first focusing lens group and the second focusing lens group have negative refractive power;
the first focusing lens group and the second focusing lens group are arranged adjacent to each other;
the first focusing lens group comprises at least one positive lens and at least one negative lens; and
the following conditional expression is satisfied, $$0.40 < fF1/fF2 < 6.00$$

where fF1: a focal length of the first focusing lens group, and fF2: a focal length of the second focusing lens group; and the feature B comprising:
disposing the plurality of lens groups in a lens barrel so that:
intervals between adjacent lens groups in the plurality of lens groups are changed upon zooming;
the plurality of lens groups comprise a first lens group having positive refractive power, a second lens group having negative refractive power, and a third lens group having positive refractive power, in order from an object;
the plurality of lens groups further comprise a final lens group having negative refractive power and provided closest to an image;
the plurality of lens groups comprise a first focusing lens group that moves upon focusing and a second focusing lens group that is arranged on an image side with respect to the first focusing lens group and moves on a trajectory different from a trajectory of the first focusing lens group upon focusing;
the first focusing lens group has negative refractive power;
the first focusing lens group and the second focusing lens group are arranged adjacent to each other;
the first focusing lens group consists of one positive lens and one negative lens;
lens groups moved upon focusing consists of the first focusing lens group and the second focusing lens group;
the plurality of lens groups comprise two lens groups which are fixed during zooming and are provided on an object side of the first focusing lens group;
the second lens group comprises a positive lens closest to an object;
the second lens group comprises a negative lens closest to an image; and
the final lens group consists of one negative lens and one positive lens.

36. A zoom optical system comprising a plurality of lens groups, wherein:
in the plurality of lens groups, an interval between adjacent lens groups is changed upon zooming;
the plurality of lens groups comprise a first lens group having positive refractive power, a second lens group having negative refractive power, and a third lens group having positive refractive power, in order from an object;
the plurality of lens groups further comprise a final lens group having negative refractive power and provided closest to an image;
the plurality of lens groups comprise a first focusing lens group that moves upon focusing and a second focusing lens group that is arranged on an image side with respect to the first focusing lens group and moves on a trajectory different from a trajectory of the first focusing lens group upon focusing;
the first focusing lens group has negative refractive power;
the first focusing lens group and the second focusing lens group are arranged adjacent to each other;
the first focusing lens group consists of one positive lens and one negative lens;
lens groups moved upon focusing consists of the first focusing lens group and the second focusing lens group;
the plurality of lens groups comprise two lens groups which are fixed during zooming and are provided on an object side of the first focusing lens group;

the second lens group comprises a positive lens closest to an object;

the second lens group comprises a negative lens closest to an image; and the final lens group consists of one negative lens and one positive lens.

37. The zoom optical system according to claim 36, wherein the second lens group comprises a cemented lens disposed on an object side of the negative lens closest to an image, and the cemented lens consists of a negative lens and a positive lens disposed and cemented in order from the object.

38. The zoom optical system according to claim 36, wherein the second lens group consists of, in order from the object, the positive lens closest to an object, a negative lens, a negative lens, a positive lens, and the negative lens closest to an image.

* * * * *